(12) United States Patent
Sugiura et al.

(10) Patent No.: US 7,089,149 B2
(45) Date of Patent: Aug. 8, 2006

(54) METHOD AND APPARATUS FOR DETECTING AN ANGLE OF A ROTATING SHAFT

(75) Inventors: Junji Sugiura, Hekinan (JP); Soichiro Arai, Okazaki (JP); Takayoshi Honda, Kariya (JP)

(73) Assignee: Denso Corporation, Aichi-Pref. (JP)

( * ) Notice: Subject to any disclaimer, the term of this patent is extended or adjusted under 35 U.S.C. 154(b) by 0 days.

(21) Appl. No.: 10/975,477

(22) Filed: Oct. 29, 2004

(65) Prior Publication Data

US 2005/0096865 A1     May 5, 2005

(30) Foreign Application Priority Data

Oct. 29, 2003   (JP)   ............................. 2003-369365

(51) Int. Cl.
*G01C 9/00*   (2006.01)
*G01C 17/00*  (2006.01)
*G01C 19/00*  (2006.01)
*G06F 15/00*  (2006.01)

(52) U.S. Cl. ................................... 702/151
(58) Field of Classification Search ................ 702/151
See application file for complete search history.

(56) References Cited

U.S. PATENT DOCUMENTS 4,604,575 A * 8/1986 Shimizu et al. ........ 324/207.18
6,341,253 B1   1/2002 Honda
6,493,628 B1  12/2002 Ando
6,914,953 B1 * 7/2005 Boerstler .................... 375/373

FOREIGN PATENT DOCUMENTS

| JP | 50-66619   | 6/1975  |
| JP | 53-59140   | 5/1978  |
| JP | 62-103515  | 5/1987  |
| JP | 8-218932   | 8/1996  |
| JP | 2001-214794 | 8/2001 |
| JP | 2001-271700 | 10/2001 |

* cited by examiner

*Primary Examiner*—John Barlow
*Assistant Examiner*—Sujoy Kundu
(74) *Attorney, Agent, or Firm*—Nixon & Vanderhye P.C.

(57) ABSTRACT

An apparatus aims at detecting an angle of a rotating shaft as a train of bits. A first signal including a train of pulses corresponding to angle intervals of a rotation of the rotating shaft is inputted to the apparatus, and a second signal including a train of clock pulses whose clock cycle is a positive integer submultiple of a pulse cycle of the first signal is inputted to the apparatus. In the apparatus, a first counter is indicative of a higher-order of the train of bits, and counts up or down in synchronization with the pulse cycle of the first signal. A second counter is indicative of a lower-order of the train of bits, and counts either up or down in synchronization with the clock cycle of the second signal. The second counter is cleared in synchronization with the pulse cycle of the first signal.

32 Claims, 31 Drawing Sheets

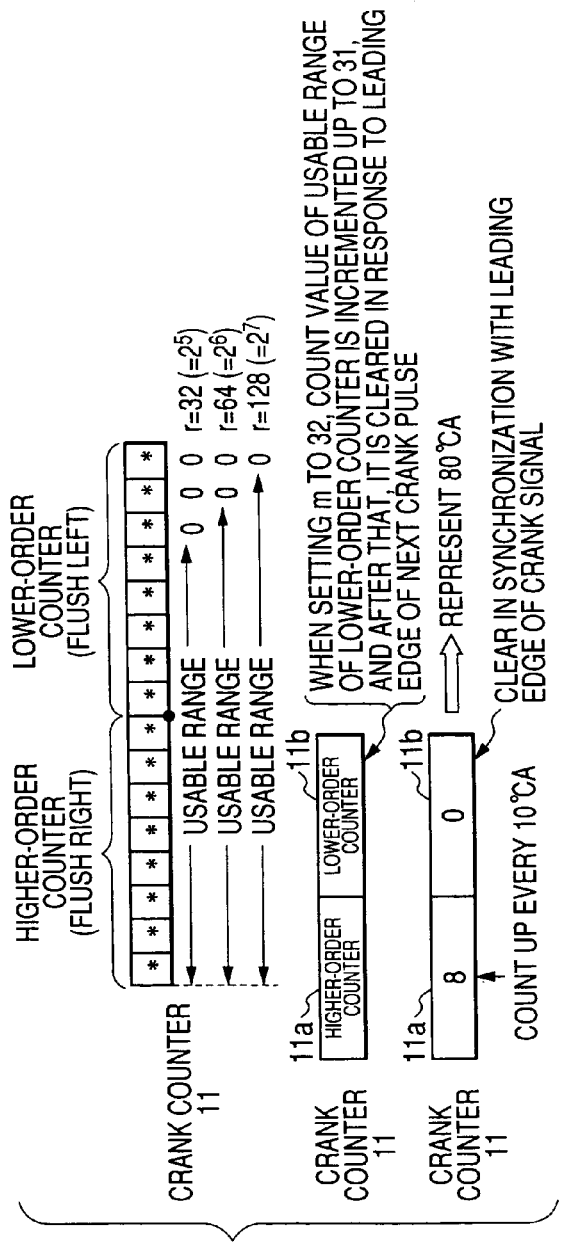
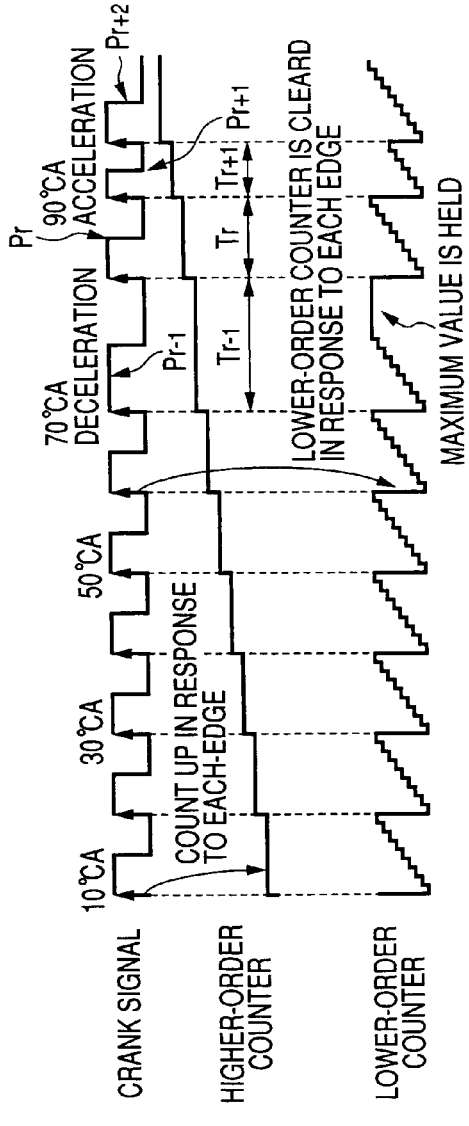
FIG. 4A
FIG. 4B

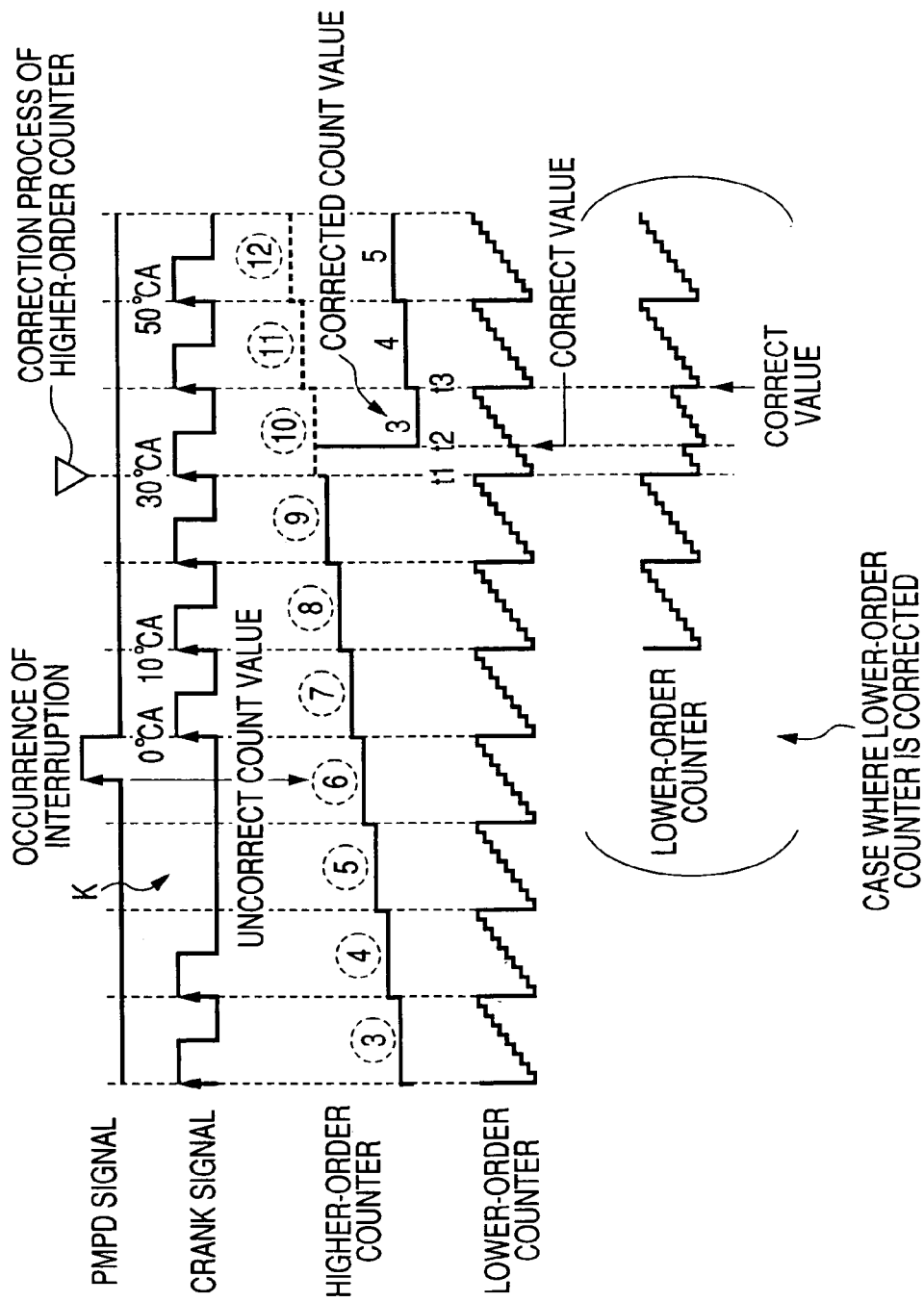

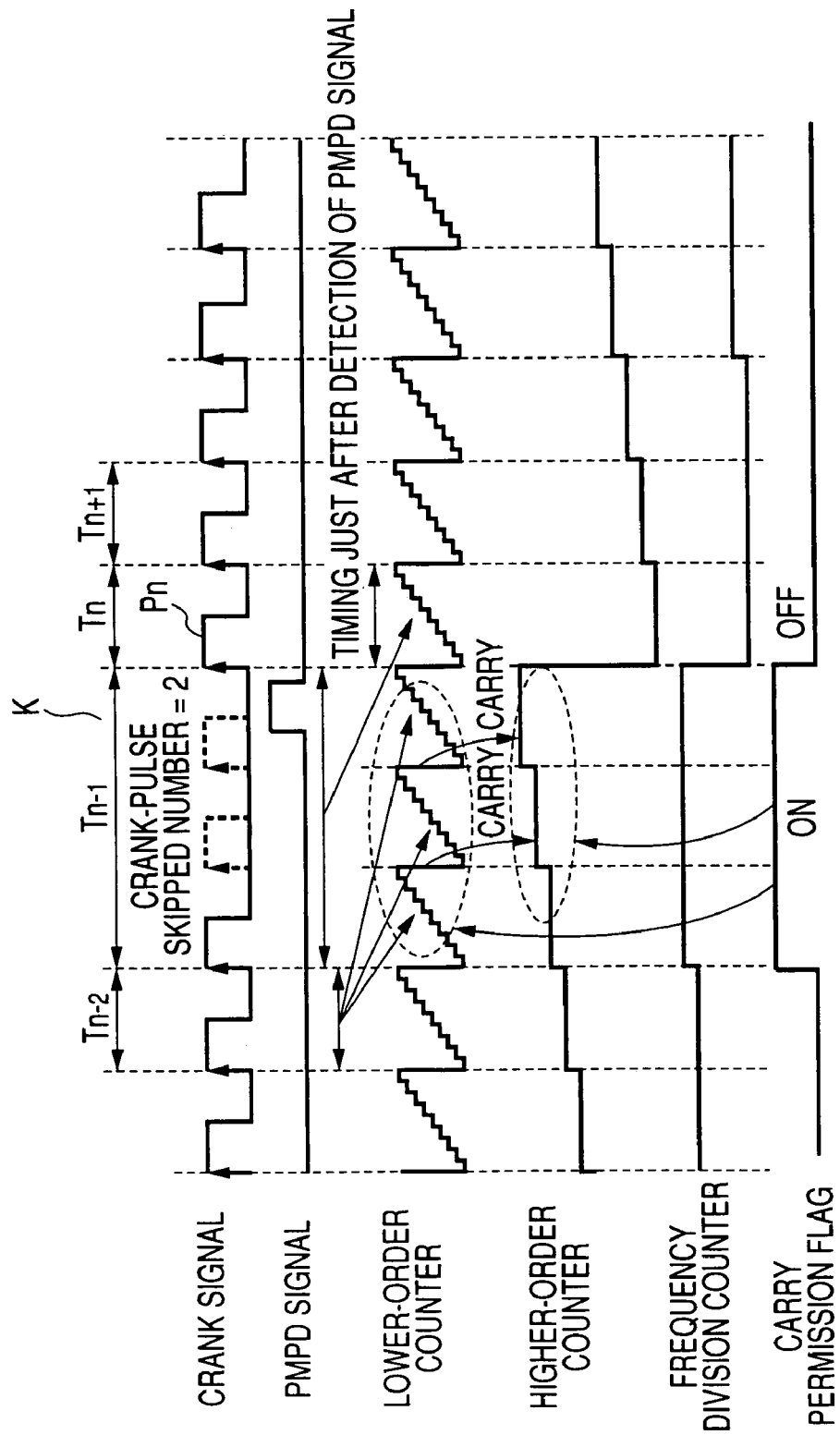

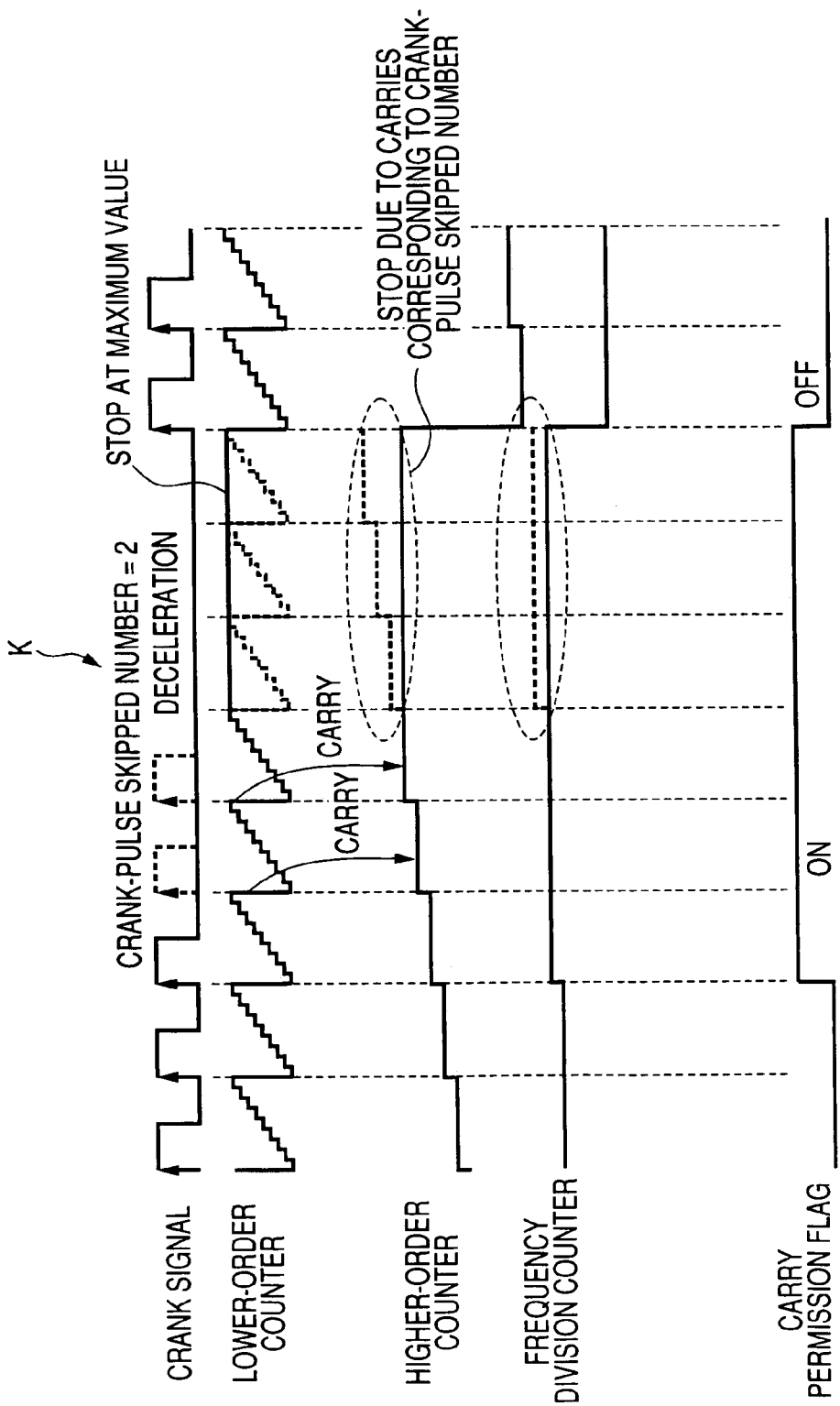

US 7,089,149 B2

METHOD AND APPARATUS FOR DETECTING AN ANGLE OF A ROTATING SHAFT

CROSS REFERENCE TO RELATED APPLICATION

This application is based on Japanese Patent Application 2003-369365 filed on Oct. 29, 2003 and claims the benefit of priority therefrom, so that the descriptions of which are all incorporated herein by reference.

BACKGROUND OF THE INVENTION

1. Field of the Invention

The present invention relates to a method and an apparatus for detecting an angle of a rotating shaft, such as a crankshaft of an engine.

2. Description of the Related Art

Conventional engine control units utilize input signals supplied from various sensors, such as a crankshaft sensor, a coolant temperature sensor, and an air temperature sensor, to perform engine controls, such as fuel injection control and ignition timing control, thereby operating an engine under optimum conditions.

The input signals include a crank signal outputted from the crankshaft sensor. The crank signal consists of a train of crank pulses corresponding to angular positions of a crankshaft as it rotates. The pulse cycle of the pulse train corresponds to a predetermined angular interval of the crankshaft rotation.

One example of the conventional engine control units is disclosed in, for example, U.S. Pat. No. 6,493,628B2 corresponding to Japanese Unexamined Patent Publication No. 2001-271700.

The engine control unit disclosed in the publication is operative to multiply the frequency of the crank signal, thereby generating a multiplication clock signal. For details, the multiplication clock signal consists of a train of clock pulses whose clock cycle is a positive integral submultiple of the pulse cycle of the crank signal. The engine control unit is also operative to increment a crank counter indicative of a rotational position of the crankshaft, in other words, a crank angle thereof, in response to the multiplication clock signal to control the engine based on the count value of the crank counter. That is, the engine control unit is configured to control the engine in synchronization with the engine speed. The configuration makes it possible to grasp the crank angle with a resolution higher than that of the crank signal.

This type of engine control unit determines a guard value for each significant edge of each crank pulse of the crank signal. The guard value represents a value that the crank counter should take at a timing of the next significant edge of each significant edge of each crank pulse of the crank signal. Even if the engine accelerates or decelerates, the engine control unit would accurately determine, based on the guard value, the count value of the crank counter at the timing of the next significant edge of each significant edge of each crank pulse of the crank signal.

An example of the operations of the engine control unit will be explained in FIGS. 30 and 31. In this example, it is assumed that the crank counter is incremented in response to the multiplication clock signal whose frequency is 32 times that of the crank signal, in other words, the number of multiplication of the multiplication clock signal is set to "32". It is also assumed that, as shown in FIG. 30, a part of the crank signal is represented as a train of crank pulses Pm−1, Pm, Pm+1. In this assumption, during a current pulse time interval Tm between the temporally adjacent crank pulses Pm+1 and Pm, the crank counter is incremented every time that is one-thirty second (1/32) of a previous pulse time interval Tm−1 between the temporally adjacent crank pulses Pm and Pm−1.

Assuming that the engine speed is constant, the crank counter is incremented at regular time intervals during any pulse interval in the crank signal. For example, as shown in FIG. 30, when the significant edge of the crank signal, in other words the leading edge, is generated every crank angle (CA) of 10 degrees, the crank counter is incremented with a resolution of the crank angle (CA) of 0.3125 degrees, which corresponds to LSB (Least Significant Bits). This is because the frequency of the multiple clock signal is 32 times that of the crank signal.

When the engine suddenly accelerates so that a pulse time interval of the crank signal becomes short, a next significant edge may be generated before the count value of the crank counter is incremented by 32. This may result in that the count value of the crank counter may be shifted to be small from the value of "32". Similarly, when the engine suddenly decelerates so that a pulse time interval of the crank signal becomes long, the count value of the crank counter may be shifted to be large from the value of "32".

In order to prevent the count value from being shifted from the multiplication value, such as "32", as shown in FIG. 31, the guard value is set every significant edges of the crank signal. The guard value represents a value that the crank counter should take at a timing of each significant edge of each crank pulse of the crank signal.

When the engine suddenly accelerates during, for example, the current pulse time interval "Tm", the count value of the crank counter is forcibly incremented at the next significant edge (the start timing of the next pulse time interval "Tm+1") in response to an internal clock signal whose cycle is short from that of the multiplication clock signal. This allows the count value of the crank counter to be reached up to the guard value set at the current significant edge (the start timing of the current pulse time interval Tn).

It is assumed that the engine suddenly decelerates during, for example, the previous pulse time interval "Tm−1". In this assumption, when the count value of the crank counter gets to the guard value set at the previous significant edge (the start timing of the previous pulse time interval "Tm−1"), the increment of the crank counter is forced to be terminated until the next significant edge (the start timing of the current pulse time interval Tm) is generated.

SUMMARY OF THE INVENTION

The present invention includes preferable embodiments of a method and an apparatus for detecting a rotation angle of a rotating shaft, which preferred embodiments are capable of simplifying configurations and/or processes for accurately detecting the rotation angle of the rotating shaft.

According to an aspect of the present invention, there is provided an apparatus for detecting an angle of a rotating shaft as a train of bits. A first signal including a train of pulses corresponding to angle intervals of a rotation of the rotating shaft is inputted to the apparatus, and a second signal including a train of clock pulses whose clock cycle is a positive integer submultiple of a pulse cycle of the first signal is inputted to the apparatus. In the apparatus, a first counter is indicative of a higher-order of the train of bits and counts up or down in synchronization with the pulse cycle of the first signal. A second counter is indicative of a lower-order of the train of bits, and counts up or down in synchronization with the clock cycle of the second signal. The second counter is cleared in synchronization with the pulse cycle of the first signal.

According to another aspect of the present invention, there is provided an engine control unit for controlling an engine based on a crank angle of a crankshaft represented as a train of bits. A crank signal including a train of crank pulses corresponding to angle intervals of a rotation of the crankshaft is inputted to the engine control unit, and a multiplication clock signal including a train of clock pulses whose clock cycle is a positive integer submultiple of a pulse cycle of the crank signal is inputted to the engine control unit. In the engine control unit, a first counter is indicative of a higher-order of the train of bits, and counts up or down in synchronization with the pulse cycle of the crank signal. A second counter is indicative of a lower-order of the train of bits, and counts up or down in synchronization with the clock cycle of the multiplication clock signal. The second counter is cleared in synchronization with the pulse cycle of the crank signal.

According to a further aspect of the present invention, there is provided a method of detecting an angle of a rotating shaft as a train of bits. In the method, a first signal including a train of pulses corresponding to angle intervals of a rotation of the rotating shaft is received, and a second signal including a train of clock pulses whose clock cycle is a positive integer submultiple of a pulse cycle of the first signal is received. In synchronization with the pulse cycle of the first signal, a first count value representing a higher-order of the train of bits is counted up or down. In synchronization with the clock cycle of the second signal, a second count value representing a lower-order of the train of bit is counted up or down. The second count value is cleared in synchronization with the pulse cycle of the first signal.

BRIEF DESCRIPTION OF THE DRAWINGS

Other objects and aspects of the invention will become apparent from the following description of embodiments with reference to the accompanying drawings in which:

FIG. 4A is an explanation view illustrating count operations of the counter process block with the use of a crank counter shown in FIGS. 1–3 according to the first embodiment;

FIG. 4B is a time chart illustrating the crank signal and operation timings of the crank counter according to the first embodiment;

FIG. 6B is a time chart illustrating the crank signal, a PMPD signal, and operation timings of the higher-order counter and a lower-order counter shown in FIGS. 2–3 and 4A according to the first embodiment;

FIG. 7 is a time chart illustrating count-up operations of the crank counter during a pulse missing portion of the crank signal according to the first embodiment;

FIG. 8 is a time chart illustrating count-up operations of the crank counter during the pulse missing portion of the crank signal according to the first embodiment;

DETAILED DESCRIPTION OF EMBODIMENTS OF THE INVENTION

Embodiments of the present invention will be described hereinafter with reference to the accompanying drawings. In the embodiments, the invention is applied to an engine control unit, and the engine control unit is operative to a four-stroke internal combustion engine installed in a vehicle.

First Embodiment

Figure 1:
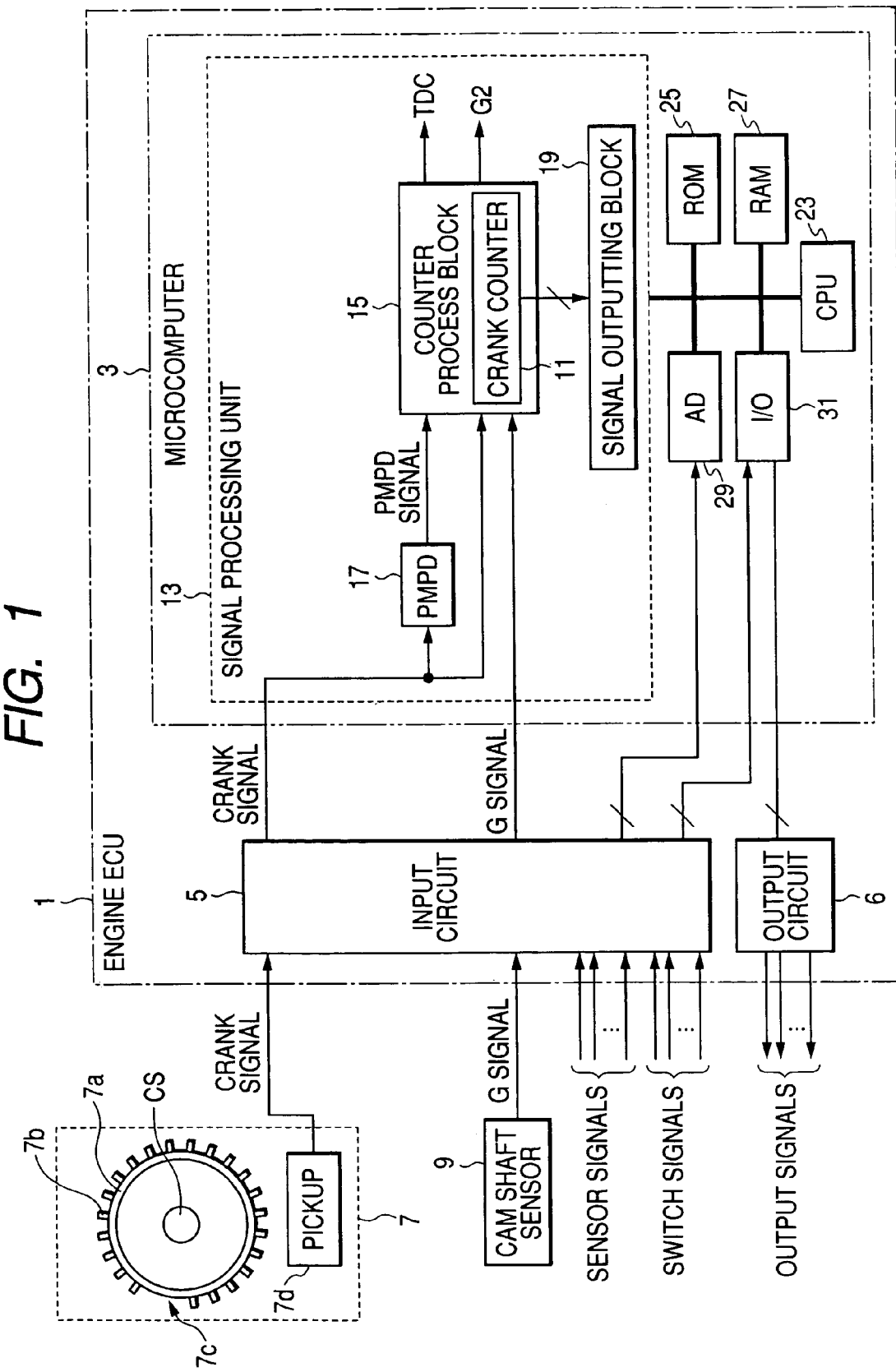
FIG. 1 is a block diagram illustrating a structure of an engine electronic control unit, which is installed in a vehicle according to a first embodiment of the present invention.
Figure 2:
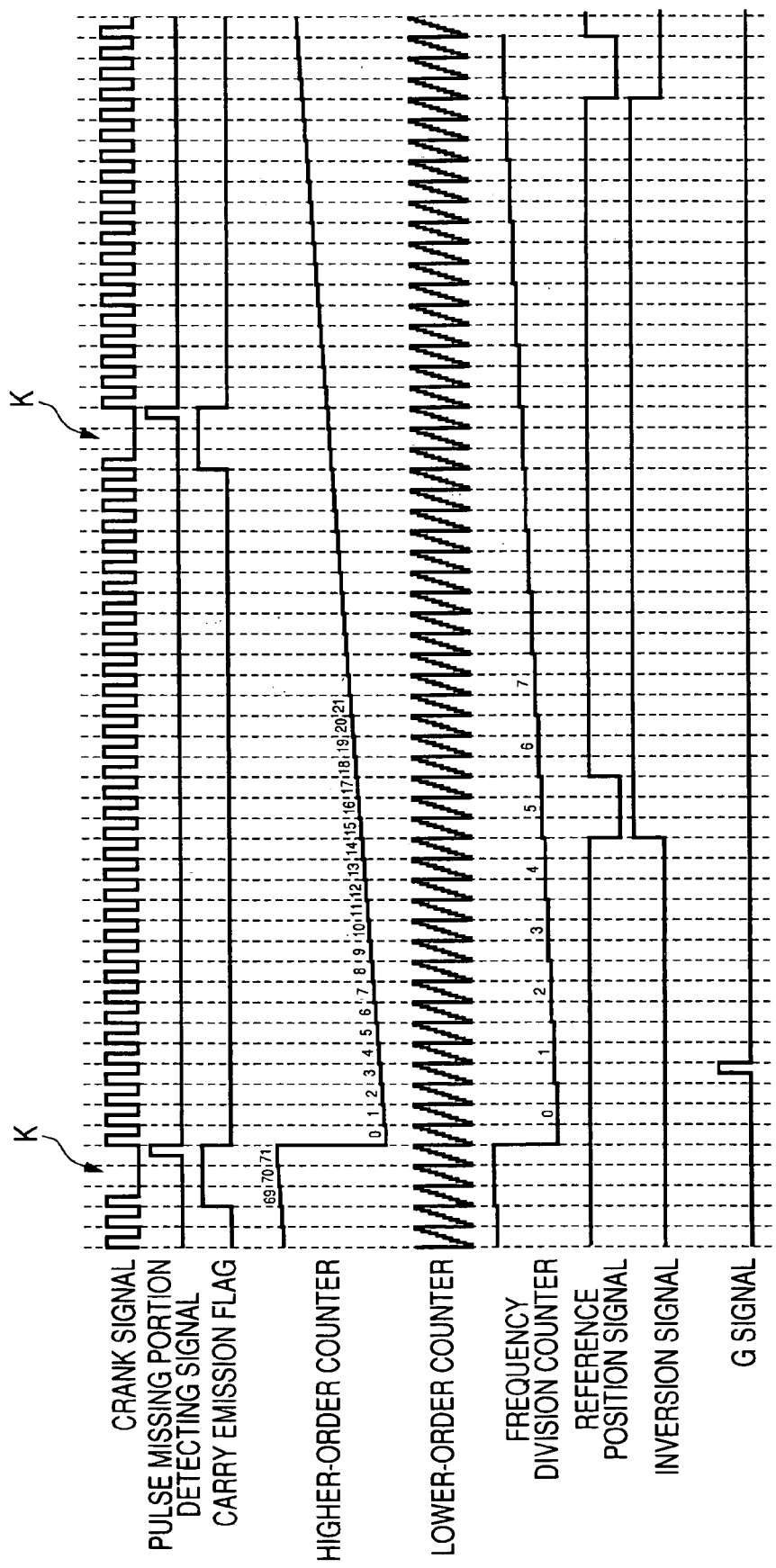
FIG. 2 is a time chart illustrating various signals including a crank signal and operations of the engine ECU 1 according to the first embodiment.

FIG. 1 is a block diagram illustrating a structure of an engine electronic control unit 1, referred to as engine ECU 1, which is installed in a vehicle according to a first embodiment of the present invention. FIG. 2 is a time chart illustrating various signals including a crank signal and operation timings of the engine ECU 1 shown in FIG. 1.

As shown in FIG. 1, the engine ECU 1 according to the first embodiment is provided with a microcomputer 3, an input circuit 5 electrically coupled to the microcomputer 3, and an output circuit 6 electrically coupled to the microcomputer 3. The microcomputer 3 is operative to capture through the input circuit 5 a crank signal outputted from a crankshaft sensor 7, a G signal indicative of the cylinder of the internal combustion engine that is on compression and outputted from a camshaft sensor 9, and other various sensor signals. The various sensor signals are outputted from, for example, a coolant temperature sensor, an air temperature sensor, a throttle position sensor and so on.

The microcomputer 3 is also operative to capture through the input circuit 5 various switch signals outputted from a shift position switch of a transmission of the internal combustion engine and an air-conditioner switch thereof. The microcomputer 3 is further operative to perform controls of the internal combustion engine based on the captured signals in synchronization with the engine speed. The controls of the internal combustion engine include a fuel injection control for outputting a drive signal, such as a fuel injection command signal, to an injector (fuel injection valve) of the internal combustion engine through the output circuit 6. The controls of the internal combustion engine also include an ignition timing control for outputting a drive signal, such as an ignition command signal, to an igniter of the internal combustion engine through the output circuit 6.

Especially, in the first embodiment, the microcomputer 3 has a crank counter 11. The microcomputer 3 is operative to increment the crank counter 11 indicative of a crank angle (rotational position) of a crankshaft CS by a train of bits according to the crank signal, and to utilize the count value of the crank counter 11 to perform the controls of the internal combustion engine in synchronization with the engine speed. For example, the microcomputer 3 is operative to continuously output at least one of the drive signals until the count value of the crank counter 11 changes from a value to another value. Moreover, the microcomputer 3 may be operative to continuously output at least one of the drive signals until a predetermine period of time has passed since the count value of the crank counter becomes a predetermined value.

The crankshaft sensor 7 preferably has a reluctor disc 7a having a plurality of teeth 7b spaced at angle intervals of, for example, 10 degrees around the periphery of the disc 7a. The reluctor disc 7a is mounted on the crankshaft CS. The reluctor disc 7a has, for example, a tooth missing portion 7c composed of, for example, two adjacent teeth missing. The tooth missing portion 7c corresponds to a reference position of the rotational position of the crankshaft CS. The crankshaft sensor 7 preferably has a pickup 7d operative to magnetically detect the teeth 7b of the reluctor disc 7a on the crankshaft CS as it rotates to generate the crank signal based on the detected result.

For details, the crank signal inputted from the crankshaft sensor 7 to the microcomputer 3 consists of a train of crank pulses corresponding to the angle intervals (10 degrees) of the reluctor disc 7a of the crankshaft sensor 7 that represents angular positions of the crankshaft CS as it rotates.

A first period for which the tooth missing portion 7c of the reluctor disk 7a mounted on the crankshaft CS is not detected by the pickup 7d of the crankshaft sensor 7 corresponds to a period for which the rotational position of the crankshaft CS does not reach the reference position.

During the first period, as shown in FIG. 2, the crank signal continuously changes from its low level (base level) to its high level (maximum level) and then to its low level each time the crankshaft CS rotates at the crank angle of 10 degrees.

On the other hand, a second period for which the tooth missing portion 7c of the reluctor disk 7a of the crankshaft sensor 7 is detected by the pickup 7d corresponds to a period for which the rotational position of the crankshaft CS reaches the reference position.

During the second period, the pulse time interval between the leading edges of temporally adjacent crank pulses is an integral multiple of the pulse time interval between the leading edges of temporally adjacent crank pulses during the first period. In the first embodiment, the pulse time interval between the leading edges of temporally adjacent crank pulses during the second period is three times of the pulse time interval between the leading edges of temporally adjacent crank pulses during the first period.

That is, the crank signal is composed of a train of the crank pulses spaced at time intervals each corresponding to the crank angle of 10 degrees during the first period for which the rotational position of the crankshaft does not reach the reference position. The crank signal is also composed of a pulse-missing portion K. The pulse-missing portion K corresponds to the tooth missing portion 7c of the crankshaft sensor 7 in which a predetermined number M of crank pulses, for example two, are skipped in the train of the crank pulses during the second period for which the rotational position of the crankshaft CS reaches the reference position. That is, the pulse time interval between the leading edges of temporally adjacent crank pulses during the second period corresponds to the crank angle of 30 degrees. The pulse-missing portion K appears twice (every the crank angle of 360 degrees) per one engine cycle (the crank angle of 720 degrees).

The camshaft sensor 9 is operative to magnetically detect a reference position of the camshaft as it rotates at one-half speed of the crankshaft CS to generate the G signal based on the detected result.

The G signal inputted from the camshaft sensor 9 to the microcomputer 3 is, as shown in FIG. 2, a signal that changes from its low level (base level) to its high level (maximum level) and then to its low level each time the rotational position of the camshaft reaches the reference position. That is, the leading edge of the G signal is generated every the crank angle of 720 degrees.

The microcomputer 3 is provided with a signal processing unit 13 operative to receive the crank signal and the G signal inputted to the microcomputer 3 to execute signal processing related to the crank counter 11 based on the received crank signal and the G signal. The signal processing unit 13 has a counter process block 15 having a main function of incrementing the crank counter 11. The signal processing unit 13 has a pulse-missing portion determining block 17 represented as PMPD in FIG. 1. The pulse-missing portion determining block 17 is operatively coupled to the counter process block 15 for determining whether each pulse time interval of each crank pulse, such as, each time interval of each leading edge of each crank pulse, corresponds to the pulse-missing portion K.

The signal processing unit 13 has a signal outputting block 19 operatively coupled to the counter process block 15 for outputting signals based on the count value of the crank counter 11.

The microcomputer 3 has a CPU 23, a ROM (Read Only Memory) 25, a RAM (Random Access Memory) 27, an analog to digital converter (AD converter) 29, and an I/O (Input/Output) port 31. The signal processing unit 13, the CPU 23, the ROM 25, the RAM 27, the AD converter 29, and the I/O port 31 are electrically coupled to each other through buses.

The CPU 23 is operative to run programs to execute various processes for controlling the internal combustion engine based on the programs. The programs are stored in, for example, the ROM 25. The RAM 27 is operative to temporarily store therein operation results by the CPU 23 or the like. The AD converter 29 is operative to capture various analog signals inputted through the input circuit 5 to convert them into digital data. The I/O port 31 is operative to capture digital signals (binary signals) each of which has two discrete levels of high level and low level that is lower than the high level. The I/O port 31 is operative to output signals to the exterior of the microcomputer 3.

Next, the elements of the signal processing unit 13 of the microcomputer 3 will be explained.

The pulse-missing portion determining block 17 is designed to execute determining operations, in other words, pulse-missing portion detecting operations.

That is, the pulse-missing portion determining block 17 operates to measure each pulse time interval of the crank signal. The pulse-missing portion determining block 17 also executes, when determining that a currently measured pulse time interval is equal to or larger than a length obtained by multiplying a previous measured pulse time interval previous to the currently measured pulse time interval by a predetermined determining ratio, the following operations. That is, the pulse-missing portion determining block 17 determines that the currently measured pulse time interval corresponds to the pulse-missing portion K to continuously output a pulse-missing portion-determining signal, referred to as "PMPD signal", with a high level during the period of the determination timing to the leading edge of the next crank pulse. That is, the leading edge of the next crank pulse corresponds to the end timing of the pulse-missing portion K.

Figure 3:
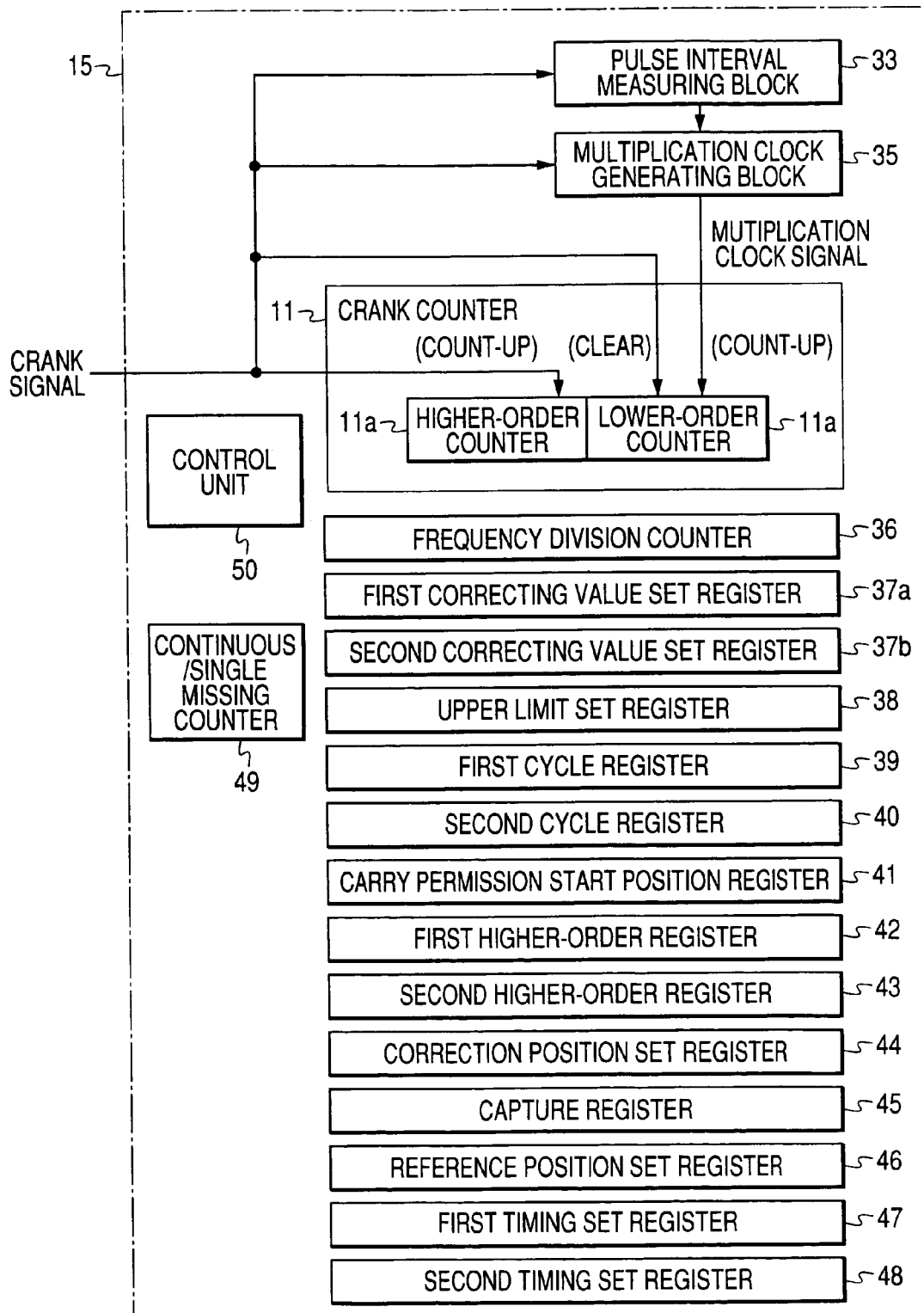
FIG. 3 is a block diagram illustrating main elements of a counter process block shown in FIGS. 1 and 2 according to the first embodiment.

As shown in FIG. 3, the counter process block 15, in addition to the crank counter 11, has a pulse interval measuring block 33 that measures each pulse time interval of the crank signal. The counter process block 15 has a multiplication clock generating block 35 that divides a currently measured pulse time interval by the pulse interval measuring block 33 by a predetermined number (r) of multiplication to obtain a value each time the leading edge occurs in the crank signal. The multiplication clock generating block 35 generates a multiplication clock signal whose cycle is set to a time length corresponding to the obtained value by the division to output it. That is, the multiplication clock signal consists of a train of clock pulses whose clock cycle is (1/r) times of the pulse cycle of the crank signal. Incidentally, r is a positive integer.

The crank counter 11, as shown in FIGS. 3 and 4, is composed of a higher-order counter 11a and a lower-order counter 11b, which are, for example, 8-bit counter, respectively, so that the crank counter 11 serves as "16 (=8+8)"-bit counter. The higher-order counter 11a preferably serves as a first counter in the present invention, and the lower-order counter 11b preferably serves as a second counter in the present invention.

The higher-order counter 11a is configured to count up by 1 in synchronization with the pulse cycle of the crank signal. That is, higher-order counter 11a is incremented by 1 in response to each leading edge (each significant edge) of the crank signal.

For example, when the crankshaft CS rotates so that its crank angle CA reaches to 80 degrees, because the higher-order counter 11a is incremented in response to each leading edge of the crank signal generated every crank angle (CA) of 10 degrees, the count value of the higher-order counter 11a is set to "8" (see FIG. 4A).

The lower-order counter 11b is configured to count up by 1 in synchronization with the clock cycle of the multiplication clock signal. That is, the lower-order counter 11b is configured to be incremented by 1 in response to each leading edge of the multiplication clock signal.

The lower-order counter 11b is configured to be cleared in synchronization with the pulse cycle of the crank signal. That is, the lower-order counter 11b is cleared in response to each leading edge of the crank signal. In other words, the lower-order counter 11b is configured so that the count value of the lower-order counter 11b is initialized back to zero in response to each leading edge of the crank signal.

For example, when the crankshaft CS rotates so that its crank angle CA reaches to 80 degrees, the count value of the lower-order counter 11b is cleared to be zero in synchronization with the leading edge of the crank signal (see FIG. 4A).

Figure 5A:
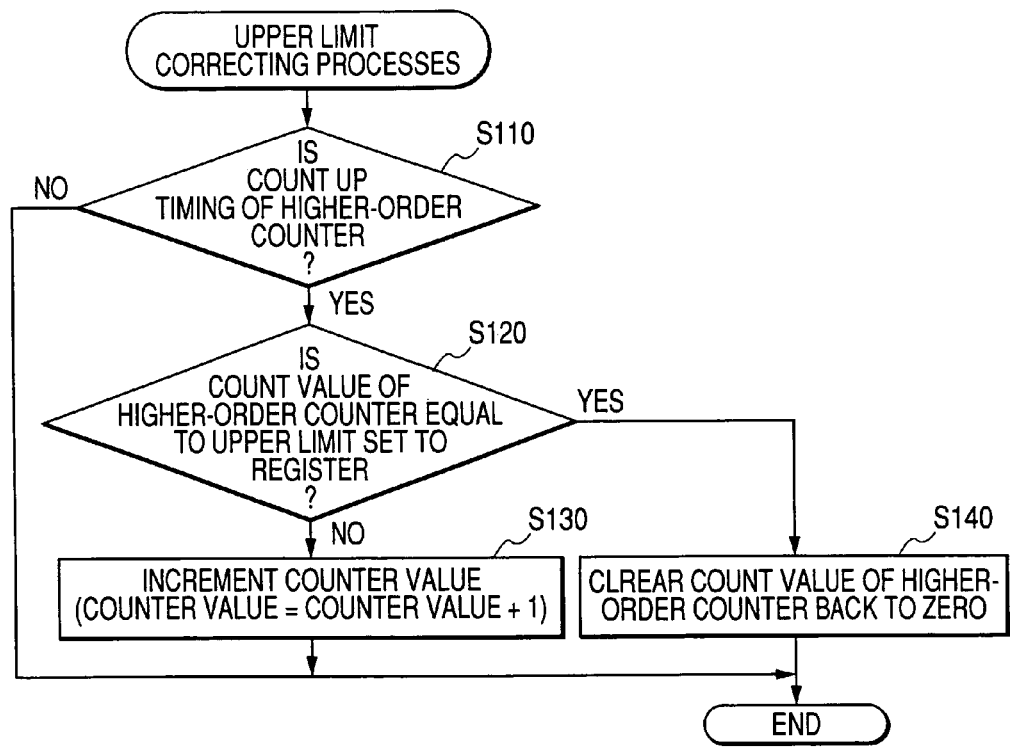
FIG. 5A is a flowchart illustrating the count operations of the crank counter block according to the first embodiment.
Figure 5B:
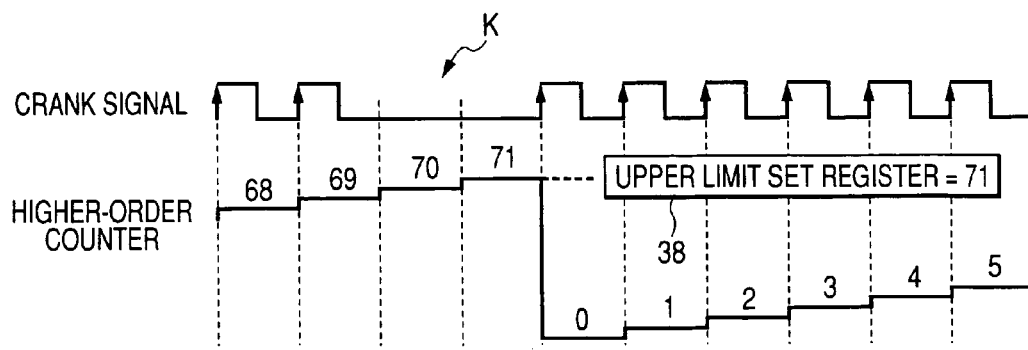
FIG. 5B is a time chart illustrating the crank signal and operation timings of a higher-order counter shown in FIGS. 2–3 and 4A according to the first embodiment.

Incidentally, as shown in FIG. 2, FIGS. 5B and 6B, the higher-order counter 11a is preferably incremented by 1 during the pulse-missing portion K in the crank signal, which will be described hereinafter in detail in accordance with FIGS. 7 to 13.

In the first embodiment, it is assumed that the number r of multiplication is variable. For permitting the variation of the number r of multiplication, the lower-order counter 11b is configured so that, when the number r is set to $2^n$ (n is a positive integer), the n-th bit from the most significant bit is defined to the least significant bit in the count-up operation in response to each leading edge of the multiplication clock signal. This definition allows the higher-order bits from the n-th bit, which includes the n-th bit itself, to be a usable range in the count-up operation. This definition also allows the remaining lower-order bits from the n-th bit to be kept zero.

For example, as shown in FIG. 4A, when the number r of multiplication is set to 32 equal to $2^5$, the 5-th bit from the most significant bit in the usable range is defined to the least significant bit in the count-up operation in response to each leading edge of the multiplication clock signal. This results in that the remaining lower-order 3 bits from the 5-th bit are kept zero. For details, while the crankshaft CS rotates, the count value of the usable range of the lower-order counter 11b is incremented up to the maximum value, such as "31 (11111)", settable by the usable range of n (=5) bits of the lower-order counter 11b. After that, when a leading edge of a next crank pulse is generated, the count value of the usable range of the lower-order counter 11b is cleared to be zero in synchronization with the leading edge of the next crank pulse (see FIG. 4A).

If the number r of multiplication is set to 128 equal to $2^7$, the 7-th bit from the most significant bit is defined to the least significant bit in the count-up operation in response to each leading edge of the multiplication clock signal so that the remaining lower-order 1 bits from the 7-th bit is kept zero. It is assumed that the number r of multiplication is set to the maximum value of 256 settable by the 8-bit counter and equal to $2^8$. In this assumption, the 8-th bit from the most significant bit, that is, the least significant bit of the lower-order counter 11b is defined to the least significant bit in the count-up operation in response to each leading edge of the multiplication clock signal.

That is, the 8-bits of the higher-order counter 11a are flush right and the 8-bits of the lower-order counter 11b are flush left, allowing the crank counter 11 to serve as a fixed-point counter. If the number r of multiplication is a predetermined fixed number, there may be no need to ensure the lower-order bits from the n-th bit. When the number r of multiplication is set to $2^n$, the number of bits of the lower-order counter 11b may be set to n bits. For example, if the number r of multiplication is set to $2^5$, the number of bits of the lower-order counter 11b may be set to 5 bits.

In the engine ECU 1 according to the first embodiment, the CPU 23 of the microcomputer 3 is operative to set a carry permission flag, which serves as a first flag in the present invention, to on during the pulse-missing portion K in the crank signal (see FIGS. 2 and 7). Wrap around operations of the lower-order counter 11b are prevented while the carry permission flag is set to off, in other words, during the first period for which the crank signal continuously changes from its low level to its high level and then to its low level. This prevention of the wrap around operations results in that the count value of the lower-order counter 11b is fixed to the maximum value of the usable range, that is, all bits of the usable range are set to "1".

As shown in FIG. 4B, it is assumed that a part of the crank signal is represented as a train of crank pulses Pr−1, Pr, Pr+1. It is also assumed that a pulse time interval Tr−1 between the leading edges of the temporally adjacent crank pulses Pr−1 and Pr is represented as Tr−1 and a pulse time interval Tr between the leading edges of the temporally adjacent crank pulses Pr and Pr+1 is represented as Tr. Furthermore, it is assumed that a pulse time interval Tr+1 between the leading edges of the temporally adjacent crank pulses Pr+1 and Pr+2 is represented as Tr+1.

In a case where the engine suddenly decelerates, such as during the pulse time interval "Tr−1" (see FIG. 4B), when the count value of the usable range of the lower-order counter 11b reaches the maximum value (31), the count value of the lower-order counter 11b is held to the maximum value until the next crank pulse Pr rises. In response to the rising of the next crank pulse Pr, the count value of the lower-order counter 11b is cleared.

That is, in the engine ECU 1, the crank counter 11 is composed of the higher-order counter 11a and the lower-order counter 11b, and the higher-order counter 11a and the lower-order counter 11b are incremented in such manners set forth above, respectively (see FIGS. 4A and 4B). This allows, when a pulse time interval of the crank signal is changed due to acceleration or a deceleration of the engine, the count value of the crank counter 11 to be set to a correct value in response to a leading edge of a next crank pulse corresponding to the end timing of the pulse time interval. The correct value of the count value of the crank counter 11 represents a value that the crank counter 11 should take at the timing of the leading edge of the next crank pulse corresponding to the end timing of the pulse time interval. This makes it possible to eliminate the need for setting a guard value every leading edges of the crank signal.

For example, as shown in FIG. 4B, it is assumed that the engine suddenly accelerates so that a pulse time interval, such as the pulse time interval "Tr+1", of the crank signal becomes short. In this assumption, the count value of the crank counter 11 is set to a correct value in response to the leading edge of the next crank pulse Pr+2 corresponding to the end timing of the pulse interval Tr+1. The correct value of the count value of the crank counter 11 represents a value that the crank counter 11 should take at the timing of the leading edge of the next crank pulse Pr+2 corresponding to the end timing of the pulse interval Tr+1.

Similarly, in a case where the engine suddenly decelerates so that a pulse time interval, such as the pulse time interval "Tr−1", of the crank signal becomes long, the count value of the crank counter 11 is set to a correct value in response to the leading edge of the next crank pulse Pr. The leasing edge of the next crank pulse Pr corresponds to the end timing of the pulse interval Tr−1. The correct value of the count value of the crank counter 11 represents a value that the crank counter 11 should take at the timing of the leading edge of the next crank pulse Pr corresponding to the end timing of the pulse interval Tr−1.

As described above, the microcomputer 3 of the engine ECU 1 allows configurations and/or processes required for setting a guard value every leading edges of the crank signal to be negated, making it possible to simplify the processes and the configuration of the signal processing unit 13.

In addition, in the first embodiment, the 8-bits of the higher-order counter 11a are flush right and the 8-bits of the lower-order counter 11b are flush left, allowing the crank counter 11 to serve as a fixed-point counter. This enables the weight of the LSB of the crank counter 11 (the LSB of the lower-order counter 11b) to be kept constant even if the number r of multiplication is changed. This makes it possible to ensure the seriality between the count values of the higher-order counter 11a and the lower-order counter 11b and the continuity of the count values of the crank counter 11, thereby efficiently calculating the crank angle CA of the crankshaft CS.

In the first embodiment, as shown in FIG. 3, the counter process block 15 preferably has an upper limit set register 38 preferably serving as a first registering unit in the present invention. The counter process block 15 is preferably operative to perform upper limit correcting processes of the higher-order counter 11a, which are illustrated in FIG. 5A. These upper limit correcting processes allow the higher-order counter 11a not to serve a free-run counter designed to be incremented by one up to the maximum value of 8 bits of "255". These upper limit correcting processes allow the higher-order counter 11a to serve a counter designed that, when the count value reaches an upper limit set to the upper limit set register 38, the count value is cleared back to zero. In the first embodiment, the upper limit is set to "71" corresponding to the crank angle of 720 degrees, for example.

That is, the counter process block 15 determines whether to detect a count up timing of the higher-order counter 11a (step S110). When the counter process block 15 does not detect the count up timing of the higher-order counter 11a, that is, the determination in step S110 is NO, the counter process block 15 terminates the upper limit correcting processes.

On the other hand, when the counter process block 15 detects the count up timing of the higher-order counter 11a, that is, the determination in step S110 is YES, the counter process block 15 determines whether the count value of the higher-order counter 11a coincides with the upper limit set to the upper limit set register 38 (step S120). When the counter process block 15 determines that the count value of the higher-order counter 11a does not coincide with the upper limit set to the upper limit set register 38, the determination in step S120 is NO. After the determination, the counter process block 15 increments the count value of the higher-order counter 11a, terminating the processes (step S130).

When the counter process block 15 determines that the count value of the higher-order counter 11a is equal to the upper limit set to the upper limit set register 38, the determination in step S120 is YES. Subsequently, the counter process block 15 clears the count value of the higher-order counter 11a back to zero (step S140), terminating the processes.

The configuration of the counter process block 15 allows the crank counter 11 to wrap around zero when the count value of the higher-order counter 11a reaches a predetermined value. Especially, even if the angular interval of the crank angle corresponding to the pulse time interval of the crank signal is changed from the crank angle of 10 degrees, setting the predetermined value corresponding to the crank angle of 720 degrees to the upper limit set register 38 allows the crank counter 11 to wrap around zero every engine cycle. Every engine cycle corresponds to every crank angle of 720 degrees. Incidentally, the processes in steps S110 and S140 of the counter process block 15 preferably serve as a first control unit in the present invention.

In addition, as shown in FIG. 3, the counter process block 15 preferably has a first correcting value set register 37a to be used for correcting the count value of the crank counter 11 based on the processes of the CPU 23 in accordance with at least one of the programs (software) stored in the ROM 25.

Figure 6A:
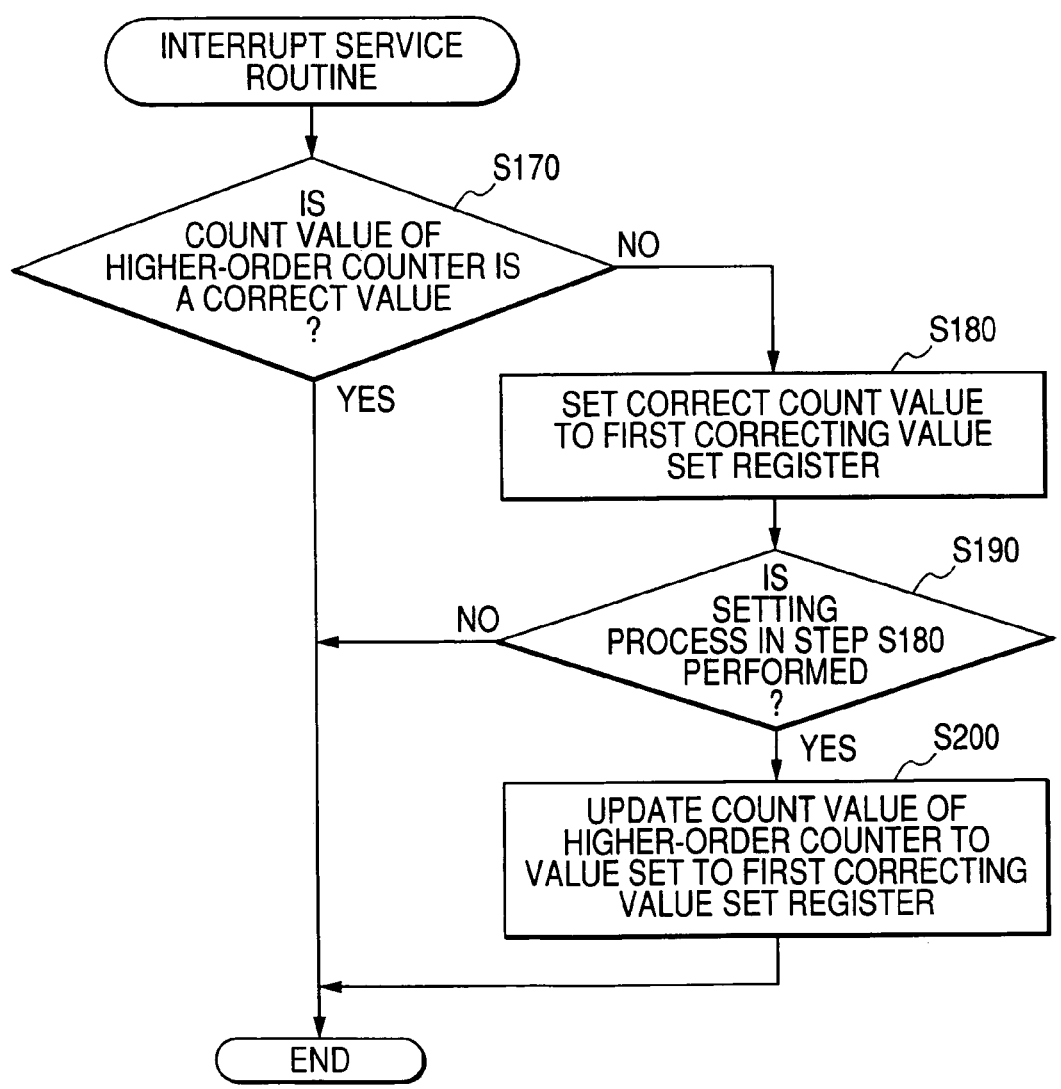
FIG. 6A is a flowchart illustrating correcting operations of the crank counter block with respect to the higher-order counter according to the first embodiment.

That is, when the PMPD signal (pulse-missing portion-determining signal) with the high level occurs, the CPU 23 executes an interrupt service routine to determine whether the count value of the higher-order counter 11a at the occurrence timing of the PMPD signal is a correct value (step S170 of FIG. 6A). The correct value of the count value of the higher-order counter 11a represents a value that the higher-order counter 11a should take at the timing of the occurrence of the PMPD signal.

When determining that the count value of the higher-order counter 11a is the correct value, that is, the determination in step S170 is YES, the CPU 23 terminates the processes.

When determining that the count value of the higher-order counter 11a is not the correct value, that is, the determination in step S170 is NO, the CPU 23 shifts to a process in step S180.

In step S180, the CPU 23 sets, to the first correcting value set register 37a, a correct value that the higher-order counter 11a should take when the crank signal rises for the fourth time after the timing of the negative determination in step S170. In other words, the CPU 23 sets, to the first correcting value set register 37a, the correct value that the higher-order counter 11a should take when the leading edge of the crank pulse corresponding to the crank angle of 30 degrees occurs after the occurrence of the PMPD signal.

The CPU 23, as shown in FIGS. 6A and 6B, determines whether the setting process in step S180 is performed (step S190).

When determining that the setting process in step S180 is not performed, that is, the determination in step S190 is NO, the CPU 23 terminates the processes.

When determining that the setting process in step S180 is performed, that is, the determination in step S190 is YES, the CPU 23 performs a correcting process to update the count vale of the higher-order counter 11a to the correct value set to the first correcting value set register 37a (step S200). For example, in FIG. 6B, the count value of the higher-order counter 11a is updated from the value of "10" to the correct value of "3" that corresponds to the crank angle of 30 degrees after the occurrence of the PMPD signal.

As described above, in the first embodiment, the count value of the higher-order counter 11a is only corrected based on the processes of the CPU 23 in accordance with at least one of the programs (software) stored in the ROM 25. This allows, when there is a delay before the count value is actually corrected (updated) after the timing of the negative determination in step S170, the influence of the delay to decrease.

That is, in FIG. 6B, the timing at which the crank signal rises for fourth time after the rising of the PRPD signal is represented as a time t1. It is assumed that the CPU 23 corrects both the higher-order counter 11a and the lower-order counter 11b. In this assumption, if the correction timing t2 of each of the higher-order counter 11a and the lower-order counter 11b delays from the time t1, the count value of the crank counter 11 would not return to the correct value until a time t3 corresponding to a rising timing of a next crank pulse.

In contrast, in the first embodiment, the count value of the higher-order counter 11a is only corrected. Therefore, even if the correction timing t2 of the higher-order counter 11a delays from the time t1, the count value of the lower-order counter 11b is cleared to be normalized every leading edge of the crank signal, allowing the count value of the crank counter 11 to become the correct value at the correction timing t2. This makes it possible to reduce the influence of the delay of the correction timing. Incidentally, the processes in steps S170, 180, and 190 of the CPU 23 preferably serves as a correcting unit in the present invention.

As illustrated in FIG. 3, the counter process block 15 preferably has a frequency division counter 36, a second correcting value set register 37b, a first cycle register 39, a second cycle register 40, a carry permission start position register 41, a first higher-order set register 42, and a second higher-order set register 43. The counter process block 15 preferably has a correction position set register 44, a capture register 45, a reference position set register 46, a first timing set register 47, a second timing set register 48, and a continuous/single missing counter (down counter) 49.

The frequency division counter 36 is a counter operative to divide the count value of the higher-order counter 11a. As shown in FIG. 2, the frequency division counter 36 is designed so that the count value is incremented by one each time the count value of the higher-order counter 11a is incremented by a predetermined number of, for example, 3. The frequency division counter 36 is designed to make the count value become zero when the count value of the higher-order counter 11a becomes zero. The second correcting value set register 37b is to be used for correcting the count value of the crank counter 11 by hardware. The functions of the registers 37b, 39 to 48 will be described hereinafter.

The counter process block 15 has a control unit 50 operatively coupled to the counters 11, 36, and 49, the registers 37a, 37b, 38 to 48, and blocks 33 and 35, respectively. The counters 11, 36, and 49, the registers 37a, 37b, 38 to 48, and blocks 33 and 35 are operatively coupled to each other.

The control unit 50 is programmed to control the counters 11, 36, and 49, and the registers 37a, 37b, 38 to 48, and blocks 33 and 35. Incidentally, the operations of the control unit 50 based on the counters 11, 36, and 49, and the registers 37a, 37b, 38 to 48, and blocks 33 and 35 can be executed by the computer circuit including the CPU 23, the ROM 25, the RAM 27, and so on.

Operations of incrementing the crank counter 11 (the higher-order counter 11a and the lower-order counter 11b) during the pulse-missing portion K in the crank signal will be described hereinafter.

The CPU 23 of the microcomputer 3 is operative to specify the pulse time interval (pulse-missing portion K) in every pulse intervals of the crank signal and to turn the carrier permission flag on during the specified pulse time interval (pulse-missing portion K) (see FIGS. 2 and 7).

As shown in FIG. 7, during the period Tn-1 of the pulse time interval for which the carry permission flag is kept on, the number of wrap-arounds of the lower-order counter 11b, which is the same as the crank-pulse skipped number of M, is permitted. The count value of the lower-order counter 11b, next to the maximum value of the usable range, such as "31(11111)", is returned back to zero, and the carries generated in the lower-order counter 11b at the return of the count value back to zero allow the higher-order counter 11a to be incremented. As described above, the crank-pulse skipped number M represents the predetermined number M of crank pulses skipped in the train of the crank pulses, providing the pulse-missing portion K.

Specifically, during the period Tn-1 for which the carry permission flag is kept on, the lower-order counter 11b is incremented in response to the multiplication clock signal generated from the pulse time interval Tn-2 temporally just before the turn-on timing of the carry permission flag. In other words, the multiplication clock signal is generated from the pulse time interval Tn-2 temporally just before the pulse-missing portion K. The multiplication clock signal generated from the pulse time interval Tn-2 has a clock cycle that is set to "Tn-2/r".

The control unit 50 allows the lower-order counter 11b to wrap around (overflow) by the crank-pulse skipped number of M. The higher-order counter 11a is incremented by 1 each time the lower-order counter 11b wrap around so that the carry is generated. This permits the count value of the higher-order counter 11a to be incremented by up to the crank-pulse skipped number of M during the period of Tn-1 for which the carry permission flag is kept on. This results in that the count value of the higher-order counter 11a advances by up to the sum of the crank-pulse skipped number of M and 1 (M+1) during the pulse-missing portion K in the crank signal.

The lower-order counter 11b, as shown in FIG. 8, after the wraps around by the crank-pulse skipped number of M, when the count value reaches the maximum value of the usable range, is prevented from wrapping around so that the count operation of the count value of the lower-order counter 11b is stopped. This results in that the count value (maximum value of the usable range) is held.

This permits, even if the engine decelerates during the period Tn-1 of the pulse-missing portion K, the count value of the lower-order counter 11b to be prevented from exceeding the maximum value that the crank counter 11 should take at the end timing of the pulse-missing portion. In other words, the maximum value should be set by the crank counter at the next crank pulse Pn in the next pulse interval Tn-1. That is, the count value of the lower-order counter 11b is held to the maximum value.

In addition, as shown in FIG. 7, the multiplication clock generating block 35 utilizes the pulse time interval Tn-1 measured by the pulse interval measuring block 35 according to the output of the PMPD signal to generate the multiplication clock signal during the pulse time interval Tn. The pulse time interval is just after the output timing of the PMPD signal from the pulse-missing portion determining block 17, in other words, just after the occurrence of the pulse-missing portion K. The multiplication clock signal has a clock cycle that is set to "Tn-1/(M+1)/r". This results in that, in FIG. 7, the lower-order counter 11b is incremented in response to every elapse of the time of "Tn-1/3//r" during the pulse time interval Tn just after the pulse-missing portion K. The configuration of the counter process block 15 allows the lower-order counter 11b to be incremented in response to the multiplication clock signal based on the updated crank signal even just after the pulse-missing portion K occurs in the crank signal.

In contrast, if the engine accelerates during the period Tn-1 of the pulse-missing portion K for which the carry permission flag is kept on, the leading edge of the crank signal may occur before the carries generated in the lower-order counter 11b increments the count value of the higher-order counter 11a. The leading edge of the crank signal during the period Tn-1 may cause the count value of the higher-order counter 11a to be smaller than a correct value that the higher-order counter 11a should take at the acceleration timing of the engine.

In view of this, in this first embodiment, the microcomputer 3 has a function of correcting the count value of the higher-order counter 11a.

That is, in the first embodiment, a value that the higher-order counter 11a should take, in other words, to which the higher-order counter 11*a* should be shifted, at the end timing of the pulse-missing portion K is previously stored in either the first higher-order register 42 or the second higher-order register 43. The first higher-order register 42 or the second higher-order register 43 preferably serves as a second registering unit of the present invention. The storing processes of the value are executed by the CPU 23 based on at least one of the programs (software) stored in the ROM 25.

When recognizing that the turn-on of the carry permission flag and the occurrence of a leading edge of the crank signal, the control unit 50 is configured to update the count value of the higher-order counter 11*a* to the value stored in either the first higher-order register 42 or the second higher-order register 43.

Moreover, when determining that the count value of the higher-order counter 11*a* coincides with a value previously stored in the carry permission start position register 41, the control unit 50 is configured to turn the carry permission flag on by hardware.

The pulse-missing portion K is generated when the count value of the higher-order counter 11*a* reaches a predetermined value. The CPU 23, therefore, sets the predetermined value to the carry permission start position register 41 based on at least one programs (software) stored on the ROM 25 for turning the carry permission flag on at the start timing of the pulse-missing portion K. This allows the carry permission flag to turn on at the leading edge of the crank signal corresponding to the start timing of the pulse-missing portion K.

Moreover, the control unit 50 is basically operative, when detecting a leading edge of the crank signal during the period for which the carry permission flag is on state, to turn the carry mission flag off.

As shown in FIG. 1, the engine ECU 1 of the first embodiment is applied for an engine system having the crankshaft sensor 7 that has the single tooth missing portion 7*c* so that the crank signal outputted from the crankshaft sensor 7 is composed of the single pulse-missing portion K corresponding to the tooth missing portion 7*c*.

Figure 9A:
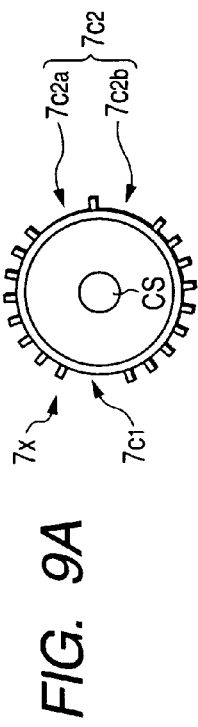
FIG. 9A is a view illustrating a modification of a crankshaft sensor according to the first embodiment.

In addition to the application, the engine ECU 1 of the first embodiment can be applied for another engine system including a crankshaft sensor 7X that has a single tooth missing portion 7*c*1 and a continuous tooth missing portion 7*c*2 (see FIG. 9A). The structure of the crankshaft sensor 7X is disclosed in Japanese Patent Publication No. 3379261.

For example, the single tooth missing portion 7*c*1 is composed of, for example, two adjacent teeth missing. The continuous tooth missing portion 7*c*2 has a first missing portion 7*c*2*a* and a second missing portion 7*c*2*b*, and each of the missing portions 7*c*2*a* and 7*c*2*b* is composed of, for example, two adjacent teeth missing.

In a case where the engine ECU 1 of the first embodiment is applied for another engine system having the crank shaft sensor 7X, operations of the engine ECU 1 will be explained hereinafter.

Figure 9B:
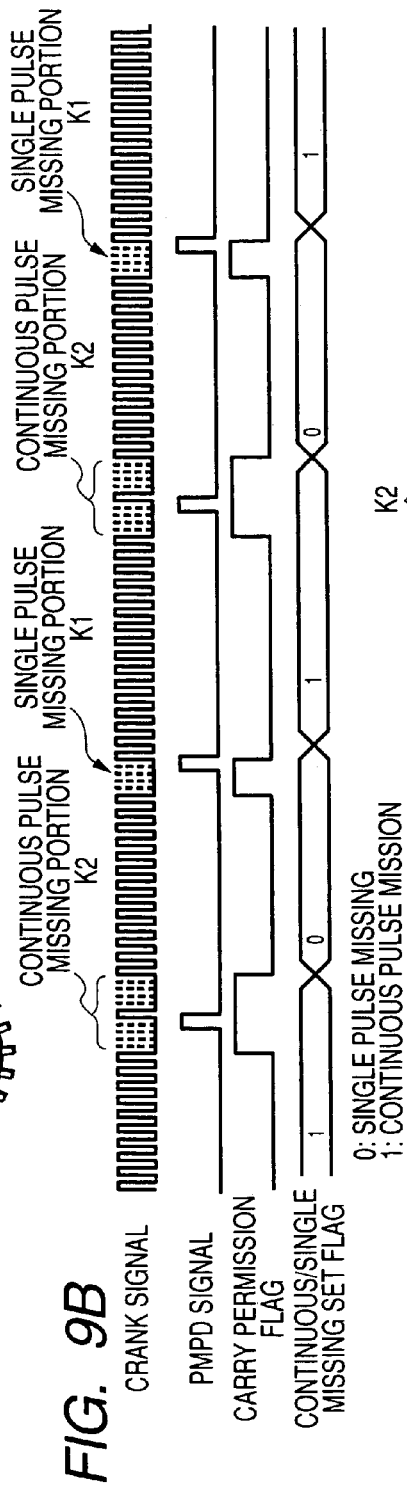
FIG. 9B is a time chart illustrating operations of a CPU in response to detection of the pulse missing portion of the crank signal when using the crankshaft sensor illustrated in FIG. 9A according to the first embodiment.

As shown in FIG. 9B, the crank signal is composed of a train of the crank pulses spaced at time intervals each corresponding to the crank angle of 10 degrees. The crank signal is also composed of a single pulse-missing portion K1 corresponding to the single tooth missing portion 7*c*1 of the crankshaft sensor 7 in which a predetermined number M of crank pulses, for example two, are skipped in the train of the crank pulses.

Furthermore, the crank signal is composed of a continuous pulse-missing portion K2 corresponding to the continuous tooth missing portion 7*c*2 of the crankshaft sensor 7. The continuous pulse-missing portion K2 is composed of a first missing portion K2*a* and a second missing portion K2*b* that correspond to the first missing portion 7*c*2*a* and the second missing portion 7*c*2*b*, respectively, In each of the first and second missing portions K2*a* and K2*b*, for example two continuous pulses are skipped in the train of the crank pulses. The single pulse-missing portion K1 is generated every the crank angle of 360 degrees, and the continuous pulse-missing portion K2 is generated every crank angle of 360 degrees, respectively. The single pulse-missing portion K1 and the continuous pulse-missing portion K2 are alternately generated.

When the continuous pulse-missing portion K2 is generated, the CPU 23 of the microcomputer 3 is operative to turn the carry permission flag on to maintain the on-condition during the first missing portion K2*a*. The CPU 23 is also operative to turn the carry permission flag off in response to the secondary leading edge of the crank signal after the turn-on timing of the carry permission flag.

Next, operations of the CPU 23 for turning the carry permission flag on and off, and operations for updating the higher-order counter 11*a* after the turn-on of the carry emission flag will be specifically explained in accordance with FIGS. 9 to 13. Incidentally, an operation mode of the microcomputer 3 is set to a mode that matches the crank signal having the single pulse-missing portion K1 and the continuous pulse-missing portion K2.

Figure 10:
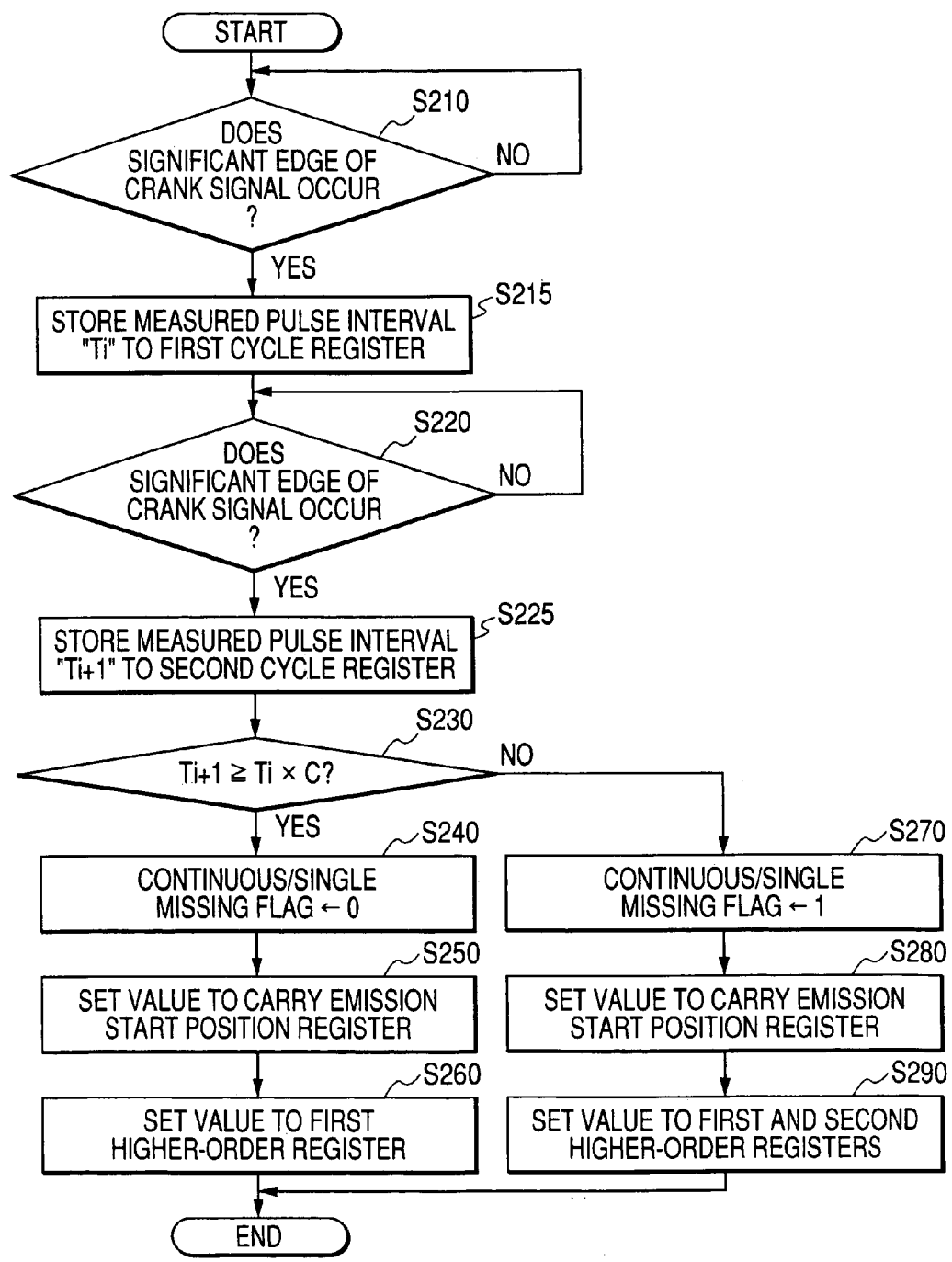
FIG. 10 is a flowchart illustrating the operations of the CPU shown in FIGS. 9B and 9C according to the first embodiment.

When the PMPD signal (pulse-missing portion determining signal) is outputted from the pulse-missing portion determining block 17, in other words, the PMPD signal rises from its low level to its high level, the CPU 23 executes the processes illustrated in FIG. 10.

That is, the CPU 23 starts to determine whether a leading edge of the crank signal as a significant edge occurs in response to the occurrence of the PMPD signal in step S210, and waits until the leading edge of the crank signal after the occurrence of the PMPD signal occurs.

When the leading edge of the crank signal firstly occurs after the occurrence of the PMPD signal, the CPU 23 stores a currently measured pulse time interval "Ti" of the crank signal by the pulse interval measuring block 33 in the first cycle register 39 in step S215.

Next, the CPU 23 waits until a secondary leading edge of the crank signal next to the firstly occurred leading edge occurs in step S220. When the secondary leading edge of the crank signal occurs after the firstly occurred leading edge, the CPU 23 stores a secondary measured pulse time interval "Ti+1" of the crank signal by the pulse interval measuring block 33 in the second cycle register 39 in step S220. Each of the first and second cycle registers preferably serves as a third registering unit in the present invention.

Subsequently, in step S230, the CPU 23 reads the measured pulse intervals "Ti" and "Ti+1" stored in the first and second cycle registers 39 and 40 to determine whether the measured pulse intervals "Ti" and "Ti+1" meet the following relational expression:

$$Ti+1 \geq Ti \times C \qquad [1]$$

where C is constant and, for example, is set to 0.8.

When the measured pulse intervals "Ti" and "Ti+1" meet the relational expression [1], that is, the determination in step S230 is YES, the CPU 23 determines that the continuous pulse-missing portion K2 is generated this time. When the measured pulse intervals "Ti" and "Ti+1" do not satisfy the relational expression [1], that is, the determination in step S230 is NO, the CPU 23 determines that the single pulse-missing portion K1 is generated this time.

When determining that the continuous pulse-missing portion K2 is generated, the CPU 23 determines that the single pulse-missing portion K1 will be generated next time, proceeding to a process in step S240. In step S240, the CPU 23 sets "0" to a continuous/single missing flag. The continuous/single missing flag is used for representing that whichever the single pulse-missing portion K1 and the continuous pulse-missing portion K2 is generated next time. The value "0" represents that the single pulse-missing portion K1 will occur next time.

In next step S250, the CPU 23 sets a predetermined value that the higher-order counter 11a should take at the start timing of the single pulse-missing portion K1, which will be generated next time, to the carry permission start position register 41. Subsequently, the CPU 23 sets a predetermined value that the higher-order counter 11a should take at the end timing of the single pulse-missing portion K1 to the first higher-order register 42 in step S260, terminating the processes.

Specifically, a corresponding relationship between each of the generation timings of each of the pulse-missing portions K1 and K2 and each of the count values of the higher-order counter 11a at each of the generation timings is previously determined. This allows, in step S250, the CPU 23 to obtain, based on a current count value of the higher-order counter 11a, the predetermined value that the higher-order counter 11a should take at the start timing of the single pulse-missing portion K1 generated next time. The CPU 23 sets the obtained value to the carry permission start position register 41. In step S260, the CPU 23 sets, to the first higher-order register 42, a value that advances by up to the sum of the crank-pulse skipped number of M and 1 (M+1) from the predetermined value set to the carry permission start position register 41.

In step S230, when the measured pulse intervals "Ti" and "Ti+1" do not satisfy the relational expression [1], that is, the determination in step S230 is NO, the CPU 23 determines that the single pulse-missing portion K1 is generated this time.

When determining that the single pulse-missing portion K1 is generated this time, the CPU 23 determines that the continuous pulse-missing portion K2 will be generated next time, proceeding a process in step S270. In step S270, the CPU 23 sets "1" representing that the continuous pulse-missing portion K2 occurs next time to the continuous/single missing set flag.

In next step S280, the CPU 23 sets a predetermined value that the higher-order counter 11a should take at the start timing of the first missing portion K2a to the carry permission start position register 41. Subsequently, the CPU 23 sets a predetermined value that the higher-order counter 11a should take at the end timing of the first missing portion K2a to the second higher-order register 43. Next, the CPU 23 sets a predetermined value that the higher-order counter 11a should take at the end timing of the second missing portion K2b to the first higher-order register 42, terminating the processes.

Specifically, in step S280, as with step S250, the CPU 23 obtains, based on a current count value of the higher-order counter 11a, the predetermined value that the higher-order counter 11a should take at the start timing of the first missing portion K2a generated next time. The CPU 23 sets the obtained value to the carry permission start position register 41. In step S290, the CPU 23 sets, to the second higher-order register 43, a value that advances by up to the sum of the crank-pulse skipped number of M and 1 (M+1) from the predetermined value set to the carry permission start position register 41. In step S290, the CPU 23 sets, to the first higher-order register 42, a value that advances by up to the sum of the crank-pulse skipped number of M and 1 (M+1) from the predetermined value set to the second higher-order register 43.

Figure 9C:
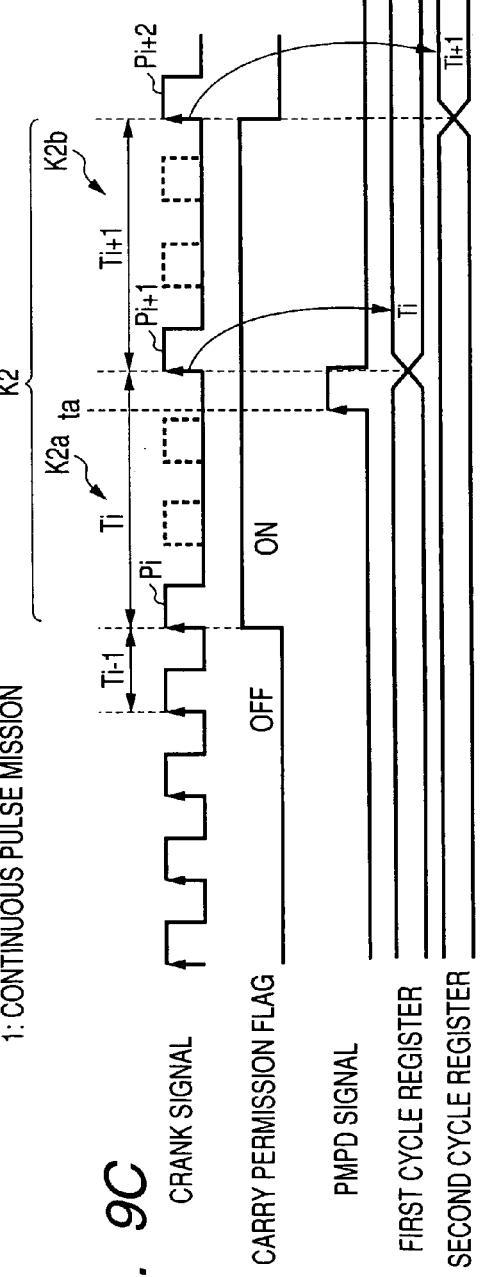
FIG. 9C is a time chart illustrating operations of the CPU in response to the detection of the pulse missing portion of the crank signal when using the crankshaft sensor illustrated in FIG. 9A according to the first embodiment.

It is assumed that the PMPD signal rises at a time ta (see FIG. 9C). In this assumption, the measured pulse interval Ti including the crank pulse Pi determined by the PMPD block 17 as the pulse-missing portion is stored in the first cycle register 39 in response to the rising timing of the next crank pulse Pi+1 of the crank signal based on the process in step S215 of the CPU 23. In response to the rising timing of the next crank pulse Pi+2 of the crank signal, the measured pulse interval Ti+1 is stored in the second cycle register 40 based on the process in step S225 of the CPU 23. The measured pulse interval Ti+1 includes the crank pulse Pi+1 that determined by the pulse-missing portion determining block 17 as the pulse-missing portion.

In the example shown in FIG. 9C, because the continuous pulse-missing portion K2 is generated this time, the affirmative determination representing that the measured pulse intervals "Ti" and "Ti+1" satisfy the relational expression [1] is performed by the CPU 23 in step S230. As a result, the value of "0" is set to the continuous/single missing set flag based on the process of the CPU 23 in step S240, which is shown in FIG. 9B just after the continuous pulse-missing portion K2 is generated.

After the set of "0" to the continuous/single missing set flag, the predetermined value that the higher-order counter 11a should take at the start timing of the single pulse-missing portion K1, which is generated next time, is set to the carry permission start position register 41. Subsequently, the predetermined value that the higher-order counter 11a should take at the end timing of the next single pulse-missing portion K1 is set to the first higher-order register 42.

If the single pulse-missing portion K1 is generated this time, because the pulse time interval "Ti+1" is approximately one third of the pulse time interval "Ti", the negative determination representing that the measured pulse intervals "Ti" and "Ti+1" do not satisfy the relational expression [1] is performed by the CPU 23 in step S230. As a result, the value of "1" is set to the continuous/single missing set flag based on the process of the CPU 23 in step S270, which is shown in FIG. 9B just after the single pulse-missing portion K1 is generated.

After the set of "1" to the continuous/single missing set flag, the predetermined value that the higher-order counter 11a should take at the start timing of the next first missing portion K2a is set to the carry permission start position register 41. Subsequently, the predetermined value that the higher-order counter 11a should take at the end timing of the first missing portion K2a is set to the second higher-order register 43. The predetermined value that the higher-order counter 11a should take at the end timing of the second missing portion K2b is set to the first higher-order register 42.

Figure 11A:
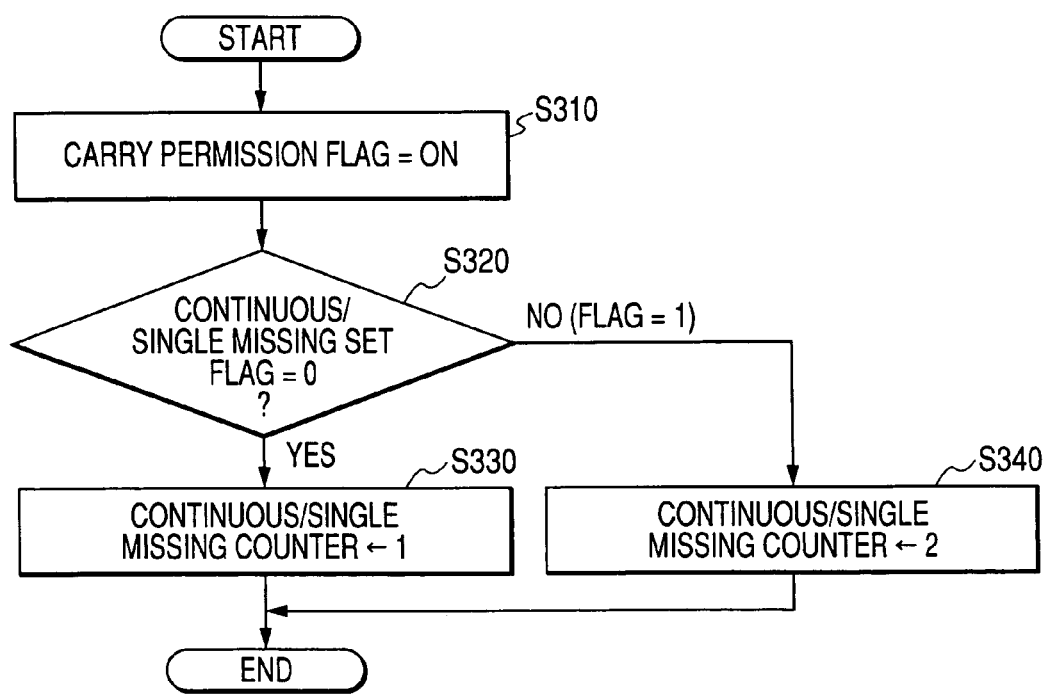
FIG. 11A is a flowchart illustrating operations of the counter process block according to the first embodiment.

When the count value of the higher-order counter 11a coincides with the value of the carry permission start position register 41, the control unit 50 executes the processes illustrated in FIG. 11A.

That is, the control unit 50 turns the carry permission flag on (step S310). The control unit 50 determines whether the continuous/single missing set flag is set to "0" (step S320).

When determining that the continuous/single missing set flag is set to "0" (the determination in step S320 is YES), the control unit 50 sets "1" to the continuous/single missing counter 49 (step S330). When determining that the continuous/single missing set flag is set to "1" (the determination in step S320 is NO), the control unit 50 sets "2" to the continuous/single missing counter 49 (step S340).

Figure 11B:
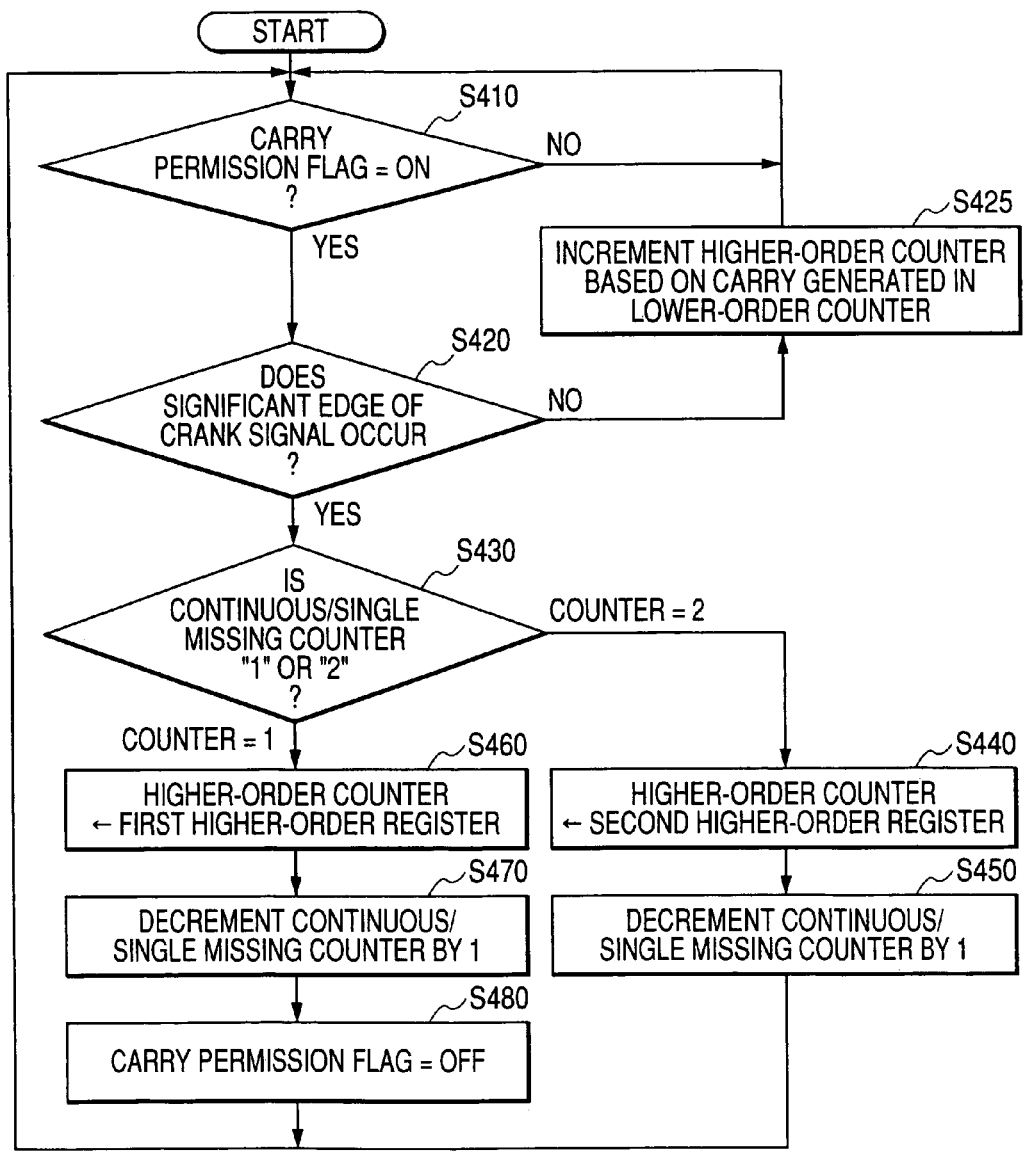
FIG. 11B is a flowchart illustrating operations of the counter process block according to the first embodiment.

Moreover, the control unit 50 of the counter process block 15 executes processes illustrated in FIG. 11B.

The control unit 50 determines whether the carry permission flag is kept on (step S410). When the carry permission flag is kept on, that is, the determination in step S410 is YES, the control unit 50 determines whether the leading edge of the crank signal occurs in the crank signal (step S420). When determining that the leading edge of the crank signal occurs, that is, the determination in step S420 is YES, the control unit 50 identifies that the value of the continuous/single missing counter 49 is "1" or "2" (step S430). When identifying that the value of the value of the counter 49 is "2", the control unit 50 updates the count value of the higher-order counter 11a to the value set to the second higher-order register 43 (step S440), and decrements the continuous/single missing counter 49 by 1 (step S450).

On the other hand, when identifying that the value of the value of the counter 49 is "1", the control unit 50 updates the count value of the higher-order counter 11a to the value set to the first higher-order counter 42 (step S460), and decrements the continuous/single missing counter 49 by 1 (step S470). Subsequently, the control unit 50 turns the carry emission flag off (step S480).

When the carry permission flag is kept on (the determination in step S410 is YES), and no leading edge occurs in the crank signal (the determination in step S420 is NO), the control unit 50 increments the higher-order counter 11a based on the carries generated in the lower-order counter 11b (see FIGS. 7 and 8) (step S425).

The operations of the control unit 50 of the counter process block 15 and the processes of the CPU 23 shown in FIG. 10 allow the carry permission flag to turn on during each of the pulse-missing portions K1 and K2. The operations of the control unit 50 of the counter process block 15 and the processes of the CPU 23 shown in FIG. 10 also permit correction of the count value of the higher-order counter 11a in response to the leading edge of the crank signal during the turn-on of the carry permission flag. The correction causes the count value to become the correct value. The leading edge of the crank signal during the turn-on of the carry permission flag corresponds to the end timing of each of the pulse-missing portions K1 and K2.

Figure 12:
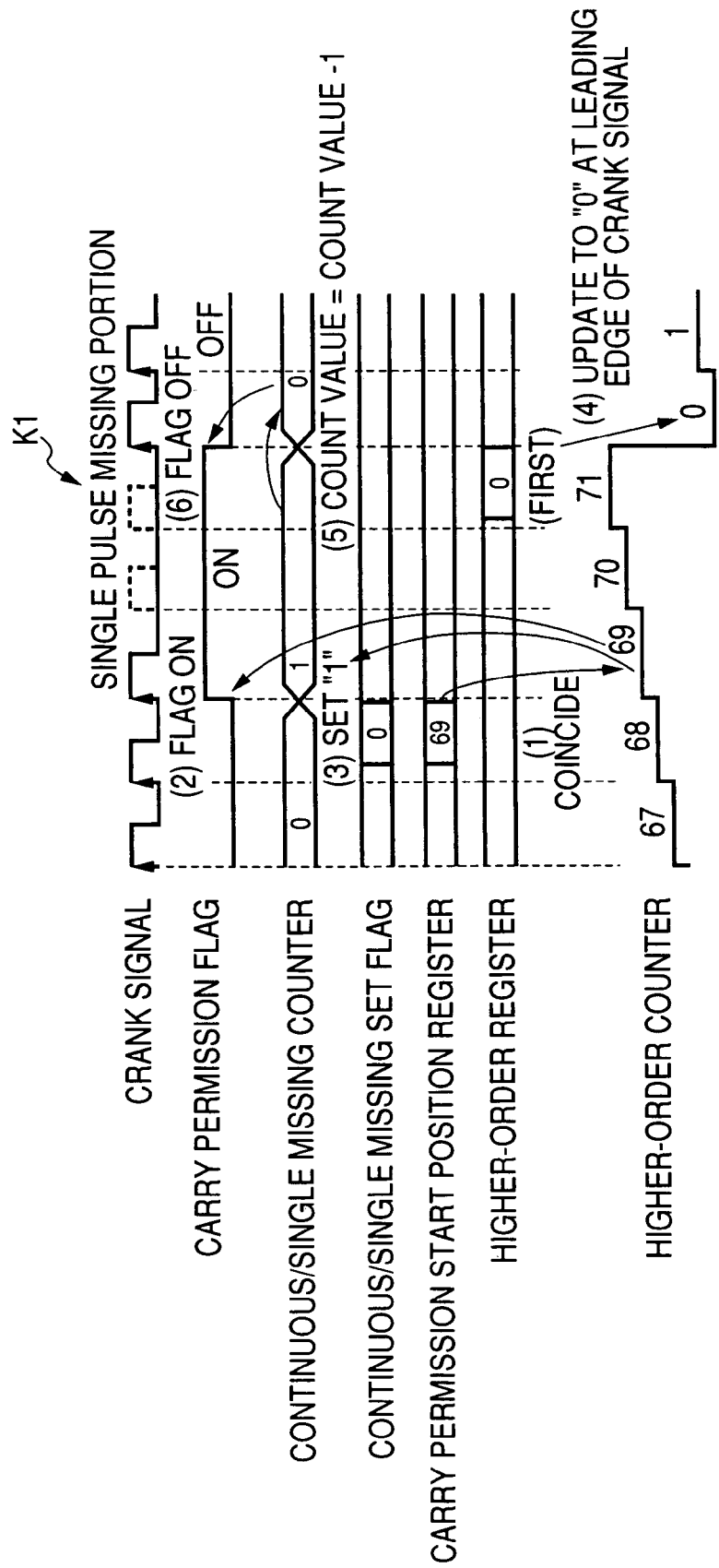
FIG. 12 is a time chart illustrating operations of the counter process block when a single pulse missing portion is generated according to the first embodiment.
Figure 13:
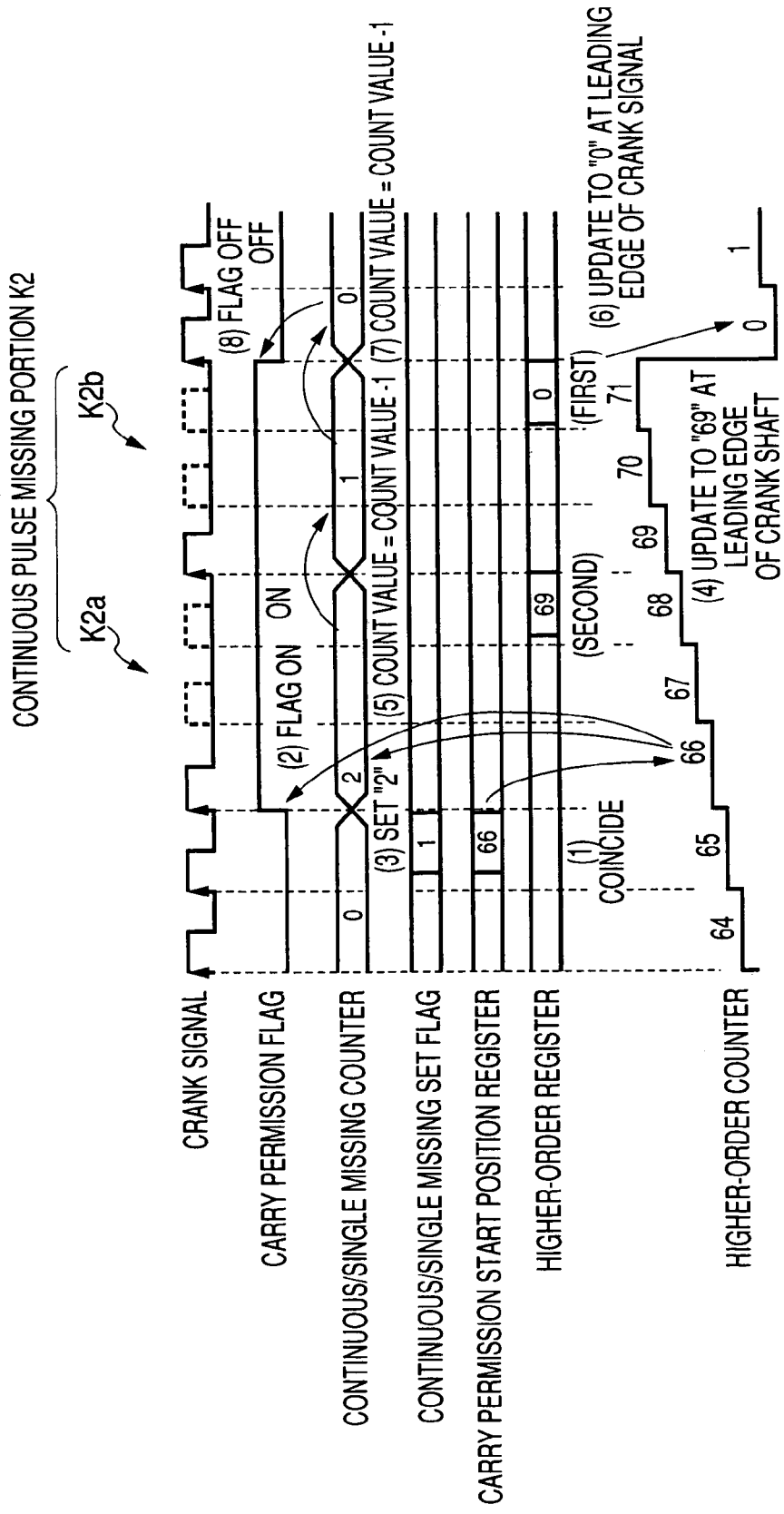
FIG. 13 is a time chart illustrating operations of the counter process block when a continuous pulse missing portion is generated according to the first embodiment.

On the other hand, the operation mode of the microcomputer 3 is set to a mode that matches the crank signal having only the single pulse-missing portion K, the CPU 23 performs the processes in steps S240 to S260 without performing other processes in FIG. 9. Therefore, the operations of the count process block 15, which are illustrated, for example in FIG. 13, are not executed so that the operations of the count process block 15, which are shown in FIG. 12, are repeatedly performed every occurrences of the pulse-missing portion K in the crank signal.

When the operation mode of the microcomputer 3 is set to the mode that matches the crank signal having the pulse-missing portions K1 and K2 in the first embodiment, the pulse-missing portion determining block 17, the processes in steps S210 to S250, S270, and S280 of the CPU 23, the processes in steps S310 to S340, S410 to S430, S450, S470, and S480 of the control unit 50 preferably serve as a detecting unit in the present invention.

In the first embodiment, the multiplication clock generating block 35 utilizes one pulse time interval of the crank signal measured by the pulse interval measuring block 33 to generate the multiplication clock signal. The multiplication clock generating block 35 may utilize N ($\geq 2$) crank pulse time intervals, in other words, N periods of the crank signal, to average the N crank pulse time intervals, thereby obtaining one averaged pulse interval. The multiplication clock generating block 35 may generate a multiplication clock signal based on the averaged pulse interval.

Figure 14:
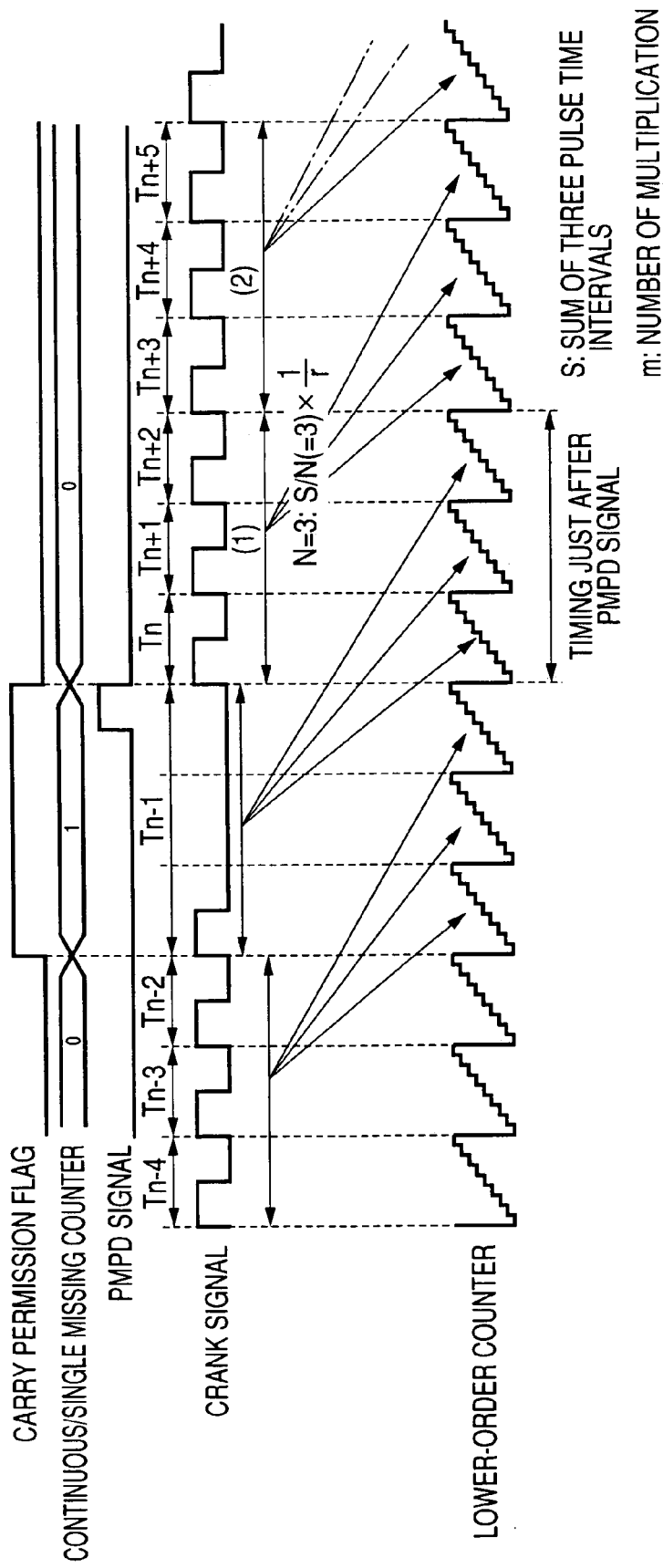
FIG. 14 is a time chart illustrating operations of generating a multiplication clock signal based on cycles of the crank signal according to the first embodiment.

For example, as shown by character references (1) and (2) in FIG. 14, the multiplication clock generating block 35 calculates, for example, a sum of three temporally adjacent pulse time intervals to divide the sum S of the three pulse time intervals by 3. The multiplication clock generating block 35 multiplies the value of "S/3" by (1/r) to generate a multiplication clock signal whose clock cycle is "S/3/r", where r is the number of multiplication. This configuration makes it possible, even if the pulse width of any one crank pulse is abnormally long or short, to reduce the influence of the abnormality of the pulse width of any one crank pulse.

Figure 15:
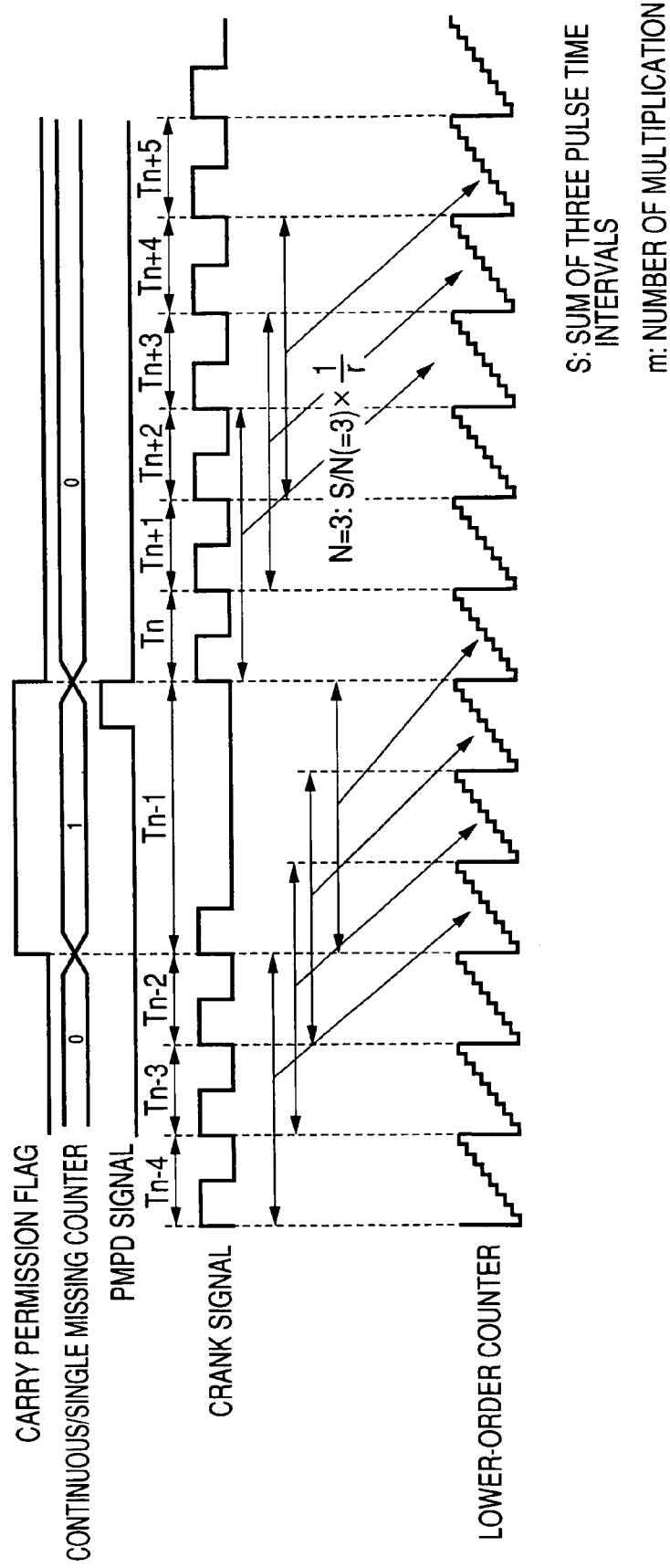
FIG. 15 is a time chart illustrating operations of generating the multiplication clock signal based on the cycles of the crank signal according to the first embodiment.

As shown in FIG. 15, the multiplication clock generating block 35 automatically calculates a sum of three temporally adjacent pulse time intervals of a currently up-to-date crank pulse, a first previous crank pulse previous to the currently up-to-date crank pulse, and a second previous crank pulse previous to the first previous crank pulse. The multiplication clock generating block 35 divides the sum S of the three pulse time intervals by 3. The multiplication clock generating block 35 multiplies the value of "S/3" by (1/r) to generate a multiplication clock signal whose clock cycle is "S/3/r", where r is the number of multiplication. This configuration makes it possible to generate the multiplication clock signal based on a currently up-to-date crank pulse.

In any examples illustrated in FIGS. 14 and 15, at a timing just after the occurrence of the PMPD signal, the multiplication clock signal is generated based on the pulse time interval of corresponding one of the pulse-missing portions K1, K2a, and K2b. In any examples illustrated in FIGS. 14 and 15, the multiplication clock generating block 35 divides the pulse time interval Tn−1 of the single pulse-missing portion by 3, and multiplies the value of "Tn−1/3" by (1/r) to generate a multiplication clock signal whose clock cycle is "Tn−1/3/r". That is, at the timing just after the occurrence of the PMPD signal, the multiplication clock generating block 35 directly uses the pulse time interval of corresponding pulse-missing portion to multiply it by 3, thereby generating the multiplication clock signal based on the division result. It is preferable, therefore, that the number "N" is set to "the sum of the pulse skipped number of M and 1", represented as "M+1". This allows the calculations of generating the multiplication clock signal independently of any timings including the timing just after the pulse-missing portion.

Next, functions of the microcomputer 3 using the crank counter 11 will be described hereinafter in accordance with FIGS. 16 to 21.

A first function of the signal outputting block 19 installed in the signal processing unit 13 will be described hereinafter.

Figure 16A:
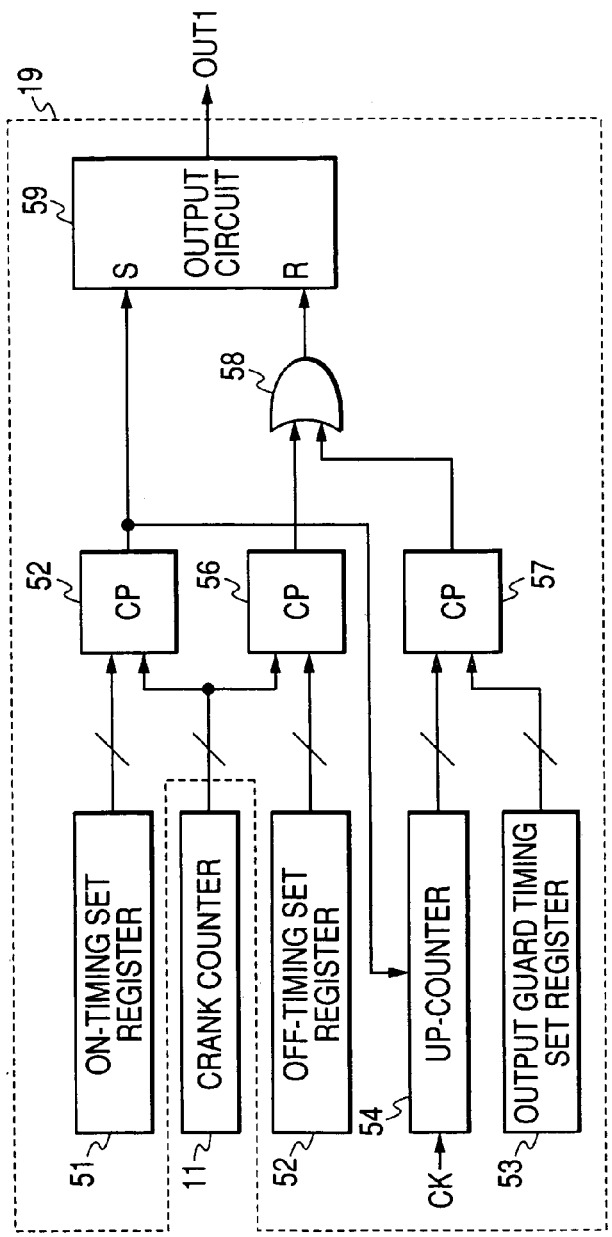
FIG. 16A is a block diagram illustrating elements of a signal outputting block illustrated in FIG. 1 for realizing a first function according to the first embodiment.

As shown in FIG. 16A, the signal outputting block 19 has an on-timing set register 51 in which a value indicative of an output start timing of a signal OUT1 is stored. The signal OUT1 preferably corresponds to a first signal in the present invention. The signal outputting block 19 has an off-timing set register 52 in which a value indicative of a stop timing of the output of the signal OUT1 is stored. The signal outputting block 19 also has an output guard timing set register 53 in which a value indicative of timing of forcibly stopping the output of the signal OUT1 is stored, and an up-counter 54 for incrementing its count value in response to an internal clock signal CK of the microcomputer 3 whose frequency is constant. The registers 51 to 53 preferably serve as fourth to sixth registering units in the present invention, respectively.

The signal outputting block 19 has first to third comparing circuits (CPs) 55 to 57. The first comparing circuit 55 is electrically connected to the on-timing set register 51 and the crank counter 11. An output of the first comparing circuit 55 is electrically connected to the up-counter 54. The second comparing circuit 56 is electrically connected to the crank counter 11 and the off-timing set register 52. The third comparing circuit 57 is electrically connected to the up-counter 54 and the output guard timing set register 53. The signal outputting block 19 has an OR gate 58 whose inputs are outputs of the second and third comparing circuits 56 and 57. The signal outputting block 19 has an output circuit 59 with a set terminal S and a reset terminal R. The set terminal of the output circuit 59 is electrically connected to the output of the first comparing circuit 55, and the reset terminal of the output circuit 59 is electrically connected to an output of the OR gate 58. The output circuit 59 is operative to output the signal OUT1. Incidentally, the signal OUT1 may serve as a signal usable inside of the microcomputer 3 or a signal to be outputted outside of the microcomputer 3 through the I/O port 31.

The first comparing circuit 55 is operative to receive the value set to the on-timing set register 51 and the count value of the crank counter 11 to compare the count value with the value set to the on-timing set register 51. The first comparing circuit 55 is operative to, when the count value is equal to or more than the value set to the on-timing set register 51, output a signal with an active level, such as a high level.

The second comparing circuit 56 is operative to receive the value set to the off-timing set register 52 and the count value of the crank counter 11 to compare the count value with the value set to the off-timing set register 52. The second comparing circuit 56 is operative to, when the count value is equal to or more than the value set to the off-timing set register 52, output a signal with a high level.

The up-counter 54 is operative to start to the increment operation when the output of the first comparing circuit 55 is turned to the high level. That is, the up-counter 54 is operative to increment the count value from 0 by 1 every cycle of the internal clock signal CK.

The third comparing circuit 57 is operative to receive the value set to the output guard timing set register 53 and the count value of the up-counter 54 to compare the count value with the value set to the output guard timing set register 53. The third comparing circuit 57 is operative to, when the count value of the up-counter 54 is equal to the value set to the output guard timing set register 53, output a signal with a high level.

The OR gate 58 is a logic gate whose output level is low when all of the output signals from the second and third comparing circuits 56 and 57 are low levels, and otherwise it is high.

The output circuit 59 is operative to, when the high level signal is inputted to the set terminal (S) from the first comparing circuit 55, start to output the signal OUT1, in other words, turn the output level of the signal OUT1 to a high level. The output circuit 59 is operative to, when the high level signal is inputted to the reset terminal (R) from the OR gate 58, stop the output of the signal OUT1, in other words, turn the output level of the signal OUT1 to a low level.

In the signal outputting block 19, when the count value of the crank counter 11 is equal to or more than the value set to the on-timing set register 51, the high level signal is inputted from the first comparing circuit 55 to the set terminal of the output circuit 59. This allows the output circuit 59 to start to output the signal OUT1. When the count value of the crank counter 11 is equal to or more than the value set to the off-timing set register 52, the high level signal is inputted from the second comparing circuit 56 to the reset terminal of the output circuit 59. This allows the output circuit 59 to stop the output of the signal OUT1.

Especially, when the count value of the up-counter 54 is equal to the value set to the output guard timing set register 53, the high level signal is outputted from the third comparing circuit 57 through the OR gate 58 to the reset terminal of the output circuit 59 even if the count value of the crank counter 11 is lower than the value set to the off-timing set register 52. This allows the output of the output circuit 59 to be forcibly stopped.

In the signal outputting block 19, setting arbitrary values to the registers 51 and 52 by the processes of the CPU 23 based on the programs (software) permits the signal OUT1 to be outputted within a desirable crank angle range corresponding to the values set to the registers 51 and 52.

Figure 16B:
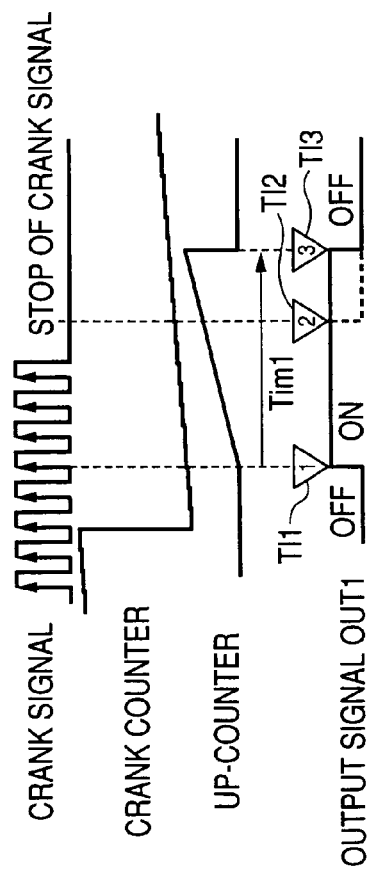
FIG. 16B is a time chart illustrating the operations of the elements of the signal outputting block required to realize the first function according to the first embodiment.

As shown in FIG. 16B, it is assumed that the crank signal is stopped due to the shutdown of the engine before the count value of the crank counter 11 is equal to or more than the value set to the off-timing set register 52 from the start of the output signal OUT1. In this assumption, when the count value of the up-counter 54 is equal to the value set to the output guard timing set register 53, the output of the signal OUT1 from the output circuit 59 can be forcibly stopped. This prevents the signal OUT1 from being outputted irrespective of the stop of the crank signal.

To the output guard timing set register 53, the value corresponding to a guard time Tim1 from the start of the signal OUT1 to the forcible stop thereof is set by the processes of the CPU 23 based on the programs (software). For detail, as the guard time Tim1, a time obtained by dividing the guard time Tim1 by the cycle of the internal clock signal CK is used.

In FIG. 16B, a reference character "V" inside which "1" is added, assigned to TI1, shows the output start timing of the signal OUT1. A reference character "V" inside which "2" is added, assigned to TI2, shows the stop timing of the signal OUT 1, which is obtained by the comparing of the count value of the crank counter 11 with the value set to the off-timing set register 52. A reference character "V" inside which "3" is added, assigned to TI3, shows the forcible stop timing of the signal OUT 1, which is obtained by the coincidence between the count value of the up-counter 54 and the value set to the output guard timing set register 53.

The configuration of the signal outputting block 19 causes the output of the signal OUT1 to be forcibly stopped when the count value of the up-counter 54 and the value set to the output guard timing set register 53. This configuration permits the guard time Tim1 to be reset even if the output of the signal OUT1 is started.

That is, if using a down-counter in place of the up-counter for counting the guard time Tim1, the down-counter would be designed so that a value corresponding to the guard time Tim would be set at the start timing of the output of the signal OUT1 and the down-counter would be started. When the count value of the down-counter reaches 0, the output of the signal OUT1 would be forcibly stopped.

In the construction using the down-counter, resetting another value corresponding to another guard time to the down-counter after starting the down-counter once would cause an actual guard time to be longer than the reset guard time. In contrast, the configuration of the signal outputting block illustrated in FIG. 16A allows the reset of the guard time. Incidentally, the first to third comparing circuits 55 to 57, the OR gate 58, and the output circuit 59 preferably serve as a third control unit in the present invention.

A second function of the signal outputting block 19 installed in the signal processing unit 13 will be described hereinafter.

Figure 17A:
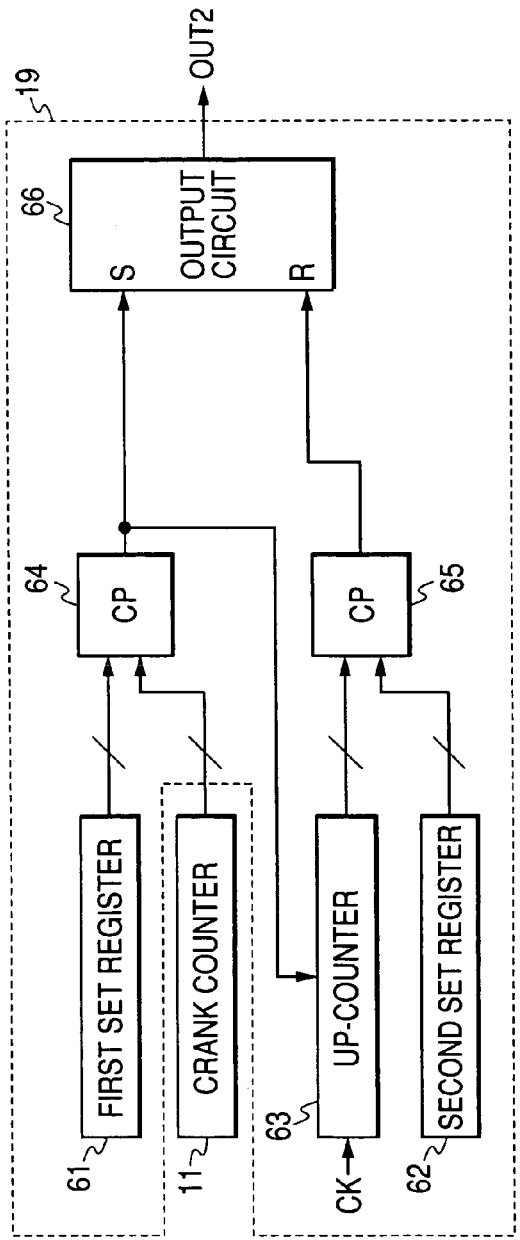
FIG. 17A is a block diagram illustrating elements of a signal outputting block illustrated in FIG. 1 for realizing a second function according to the first embodiment.

As shown in FIG. 17A, the signal outputting block 19, in addition to the configuration shown in FIG. 16A, has a first set register 61 in which a value indicative of an output start timing of a signal OUT2, which serves as a second signal in the present invention, is stored. The signal outputting block 19 also has a second set register 62 in which a value indicative of a stop timing of the output of the signal OUT2 is stored. The first and second registers 61 and 62 preferably serve as seventh and eighth registering units.

The signal outputting block 19 also has an up-counter 63 for incrementing its count value in response to an internal clock signal CK of the microcomputer 3 whose frequency is constant.

The signal outputting block 19 has fourth and fifth comparing circuits (CPs) 64 and 65. The fourth comparing circuit 64 is electrically connected to the first set register 61 and the crank counter 11. An output of the fourth comparing circuit 64 is electrically connected to the up-counter 63. The fifth comparing circuit 65 is electrically connected to the crank counter 11 and the second set register 62. The signal outputting block 19 has an output circuit 66 with a set terminal S and a reset terminal R. The set terminal of the output circuit 66 is electrically connected to the output of the fourth comparing circuit 64, and the reset terminal of the output circuit 66 is electrically connected to an output of the fifth comparing circuit 65. The output circuit 66 is operative to output the signal OUT2. Incidentally, the signal OUT2 may serve as a signal usable inside of the microcomputer 3 or a signal to be outputted outside of the microcomputer 3 through the I/O port 31.

The fourth comparing circuit 64 is operative to receive the value set to the first set register 61 and the count value of the crank counter 11 to compare the count value with the value set to the first set register 61. The fourth comparing circuit 64 is operative to, when the count value is equal to or more than the value set to the first set register 61, output a signal with a high level.

The up-counter 63 is operative to start to the increment operation when the output of the fourth comparing circuit 64 is turned to the high level. That is, the up-counter 63 is operative to increment the count value from 0 by 1 every cycle of the internal clock signal CK.

The fifth comparing circuit 65 is operative to receive the value set to the second set register 62 and the count value of the up-counter 63 to compare the count value with the value set to the second set register 62. The fifth comparing circuit 65 is operative to, when the count value of the up-counter 63 is equal to the value set to the second set register 62, output a signal with a high level.

The output circuit 66 is operative to, when the high level signal is inputted to the set terminal (S) from the fourth comparing circuit 64, start to output the signal OUT2, in other words, turn the output level of the signal OUT2 to a high level. The output circuit 66 is operative to, when the high level signal is inputted to the reset terminal (R) from the fifth comparing circuit 65, stop the output of the signal OUT2, in other words, turn the output level of the signal OUT2 to a low level.

In the signal outputting block 19, when the count value of the crank counter 11 is equal to or more than the value set to the first set register 61, the high level signal is inputted from the fourth comparing circuit 64 to the set terminal of the output circuit 66. This allows the output circuit 59 to start to output the signal OUT2 (see FIG. 17B).

Elapse of a time Tim2 corresponding to the value set to the second set register 62 after the start timing of the output of the signal OUT2 allows the count value of the up-counter 63 to be equal to the value set to the second set register 62. For detail, as the time Tim2, a time obtained by dividing the time Tim2 by the cycle of the internal clock signal CK is used.

Figure 17B:
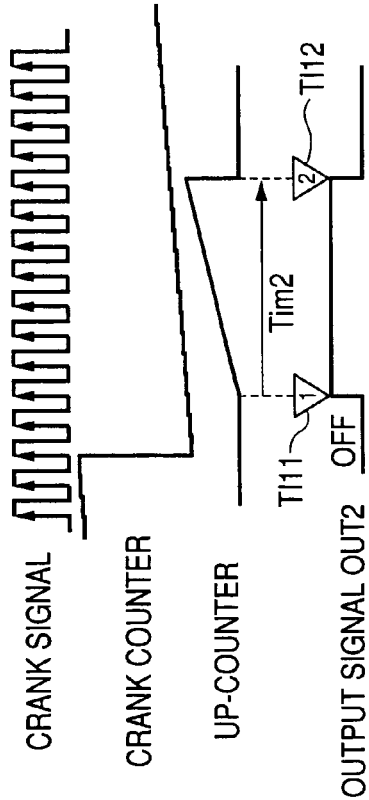
FIG. 17B is a time chart illustrating operations of the elements of the signal outputting block required to realize the second function according to the first embodiment.

The coincidence of the count value of the up-counter 63 and the value set to the second set register 62 permits the high level signal to be outputted from the fifth comparing circuit 65 to the reset terminal of the output circuit 66, which causes the output of the signal OUT2 to be stopped. In FIG. 17B, a reference character "V" inside which "1" is added, assigned to TI11, shows the output start timing of the signal OUT2. A reference character "V" inside which "2" is added, assigned to TI12, shows the stop timing of the signal OUT 2.

In the signal outputting block 19, setting an arbitrary value to the first set register 61 by the processes of the CPU 23 based on the programs (software) permits the output of the signal OUT1 to be started at a desirable crank angle corresponding to the arbitrary value set to the first set register 61. Similarly, setting an arbitrary value to the second set register 62 by the processes of the CPU 23 based on the programs (software) permits the time Tim2 from the start of the output of the signal OUT2 to the stop thereof to be desirably changed.

In the configuration of the signal outputting block 19 illustrated in FIG. 17A, coincidence of the count value of the up-counter 63 and the value set to the second set register 62 allows the output of the signal OUT2 from the output circuit 66 to be stopped. This permits resetting the time Tim2 even if the output of the signal OUT2 is started. Incidentally, the fourth and fifth comparing circuits 64 and 65, and the output circuit 66 preferably serve as a fourth control unit in the present invention.

Second Embodiment

Next, another function of the counter process block in the microcomputer 3 for outputting a reference position signal TDC and an inversion signal G2 with the use of the crank counter 11 according to a second embodiment of the present invention will be described hereinafter in accordance with FIGS. 18 and 19. Incidentally, in the second embodiment, different points of the microcomputer 3 according to the second embodiment as compared with that of the first embodiment will be mainly described hereinafter, and therefore, other functions of the microcomputer 3 are the same as those of the first embodiment.

The reference position signal TDC is a signal for representing that the crank angle reaches a specific reference angle, such as a top dead center, to the CPU 23 and the like. In the first embodiment, as shown in FIG. 2, the reference position signal TDC turns to its low level during the period corresponding the crank angle of 30 degrees every crank angle of 360 degrees. The inversion signal G2 serves as identifying which cylinder is on which stroke, and the level of the inversion signal G2 is inversed between their high and low levels every crank angle of 360 degrees. The CPU 23 is operative to identify which cylinder is on which stroke based on the combination of the inversion signal G2 and the reference position signal TDC. Incidentally, the cylinder identifying techniques set forth above have already known in the art. For example, U.S. Pat. No. 6,341,253 corresponding to Japanese non-Examined Patent Publication No. 2001-90600 teaches the techniques set forth above, the disclosure of which is incorporated totally herein by reference.

Figure 18:
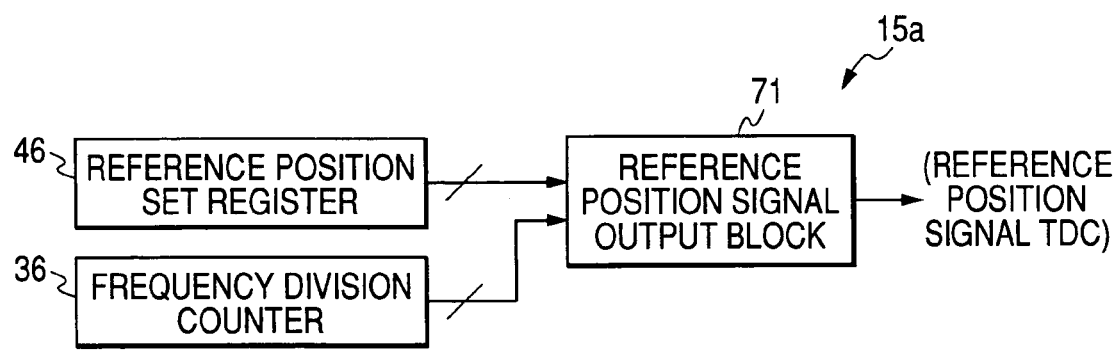
FIG. 18 is a block diagram illustrating elements of a counter process block for realizing another function according to a second embodiment.

As shown in FIG. 18, the counter process block 15a according to the second embodiment of the present invention has a reference-position signal output block 71 operatively coupled to the frequency division counter 36 and the reference position set register 46 and configured to output the reference position signal TDC. In the reference position set register 46, a value indicative of the output timing of the reference position signal TDC is previously stored. The reference position set register 46 preferably serves as a ninth registering unit or a tenth registering unit in the present invention. The frequency division counter 36 preferably serves as a third or fourth counter in the present invention.

The reference-position signal output block 71 is operative to receive the count value of the frequency division counter 36 and the value set to the reference position set register 46 to compare the count value with the value set to the reference position set register 46. The reference-position signal output block 71 preferably serves as a sixth control unit in the present invention.

Figure 19:
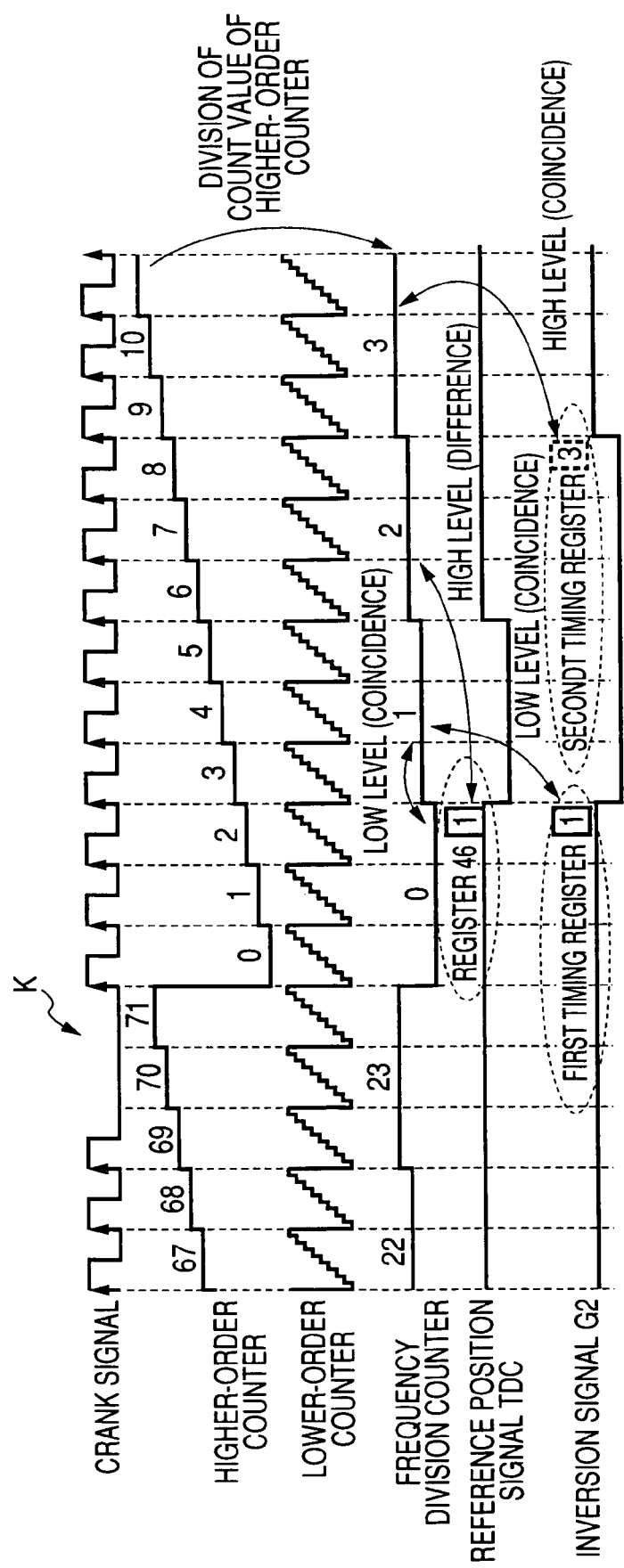
FIG. 19 is a time chart illustrating operations for realizing another function and a further function according to the second embodiment and a third embodiment.

Incidentally, FIG. 19 shows operations of the reference position signal output block 71 when the high level of "1" is set to the reference position set register 46.

As shown in FIG. 19, the reference-position signal output block 71 operates to, while the count value of the frequency division counter 36 is equal to the value set to the reference position set register 46, continuously output the reference position signal TDC with its low level.

On the contrary, the reference-position signal output block 71 operates to, while the count value of the frequency division counter 36 is different from the value set to the reference position set register 46, continuously output the reference position signal TDC with its high level.

In the configuration of the counter process block 15a, changing the value set to the reference position set register 46 allows the period for which the reference position signal TDC is kept to the low level to be desirably set. This feature makes it possible to apply the microcomputer 3 related to the second embodiment to various engine systems having different periods each for which the reference position signal TDC is kept to the low level.

To the reference position set register 46, the value can be set by an initializing process executed by the CPU 23 after the boot thereof.

To the reference-position signal output block 71, the count value of the higher-order counter 11a may be inputted in place of the count value of the frequency division counter 36. In this modification, while the count value of the higher-order counter 11a is equal to the value set to the reference position set register 46, the reference position signal TDC is kept to the low level. While the count value of the higher-order counter 11a is different from the value set to the reference position set register 46, the reference position signal TDC is kept to the high level.

The output levels of the reference-position signal output block 71 may be reversed as compared with the descriptions set forth above.

Third Embodiment

Next, a further function of the counter process block in the microcomputer 3 for outputting a reference position signal TDC and an inversion signal G2 with the use of the crank counter 11 according to a third embodiment of the present invention will be described hereinafter in accordance with FIGS. 19 and 20. Incidentally, in the third embodiment, different points of the microcomputer 3 according to the third embodiment as compared with that of the first embodiment or second embodiment will be mainly described hereinafter, and therefore, other functions of the microcomputer 3 are the same as those of the first embodiment or second embodiment.

Figure 20:
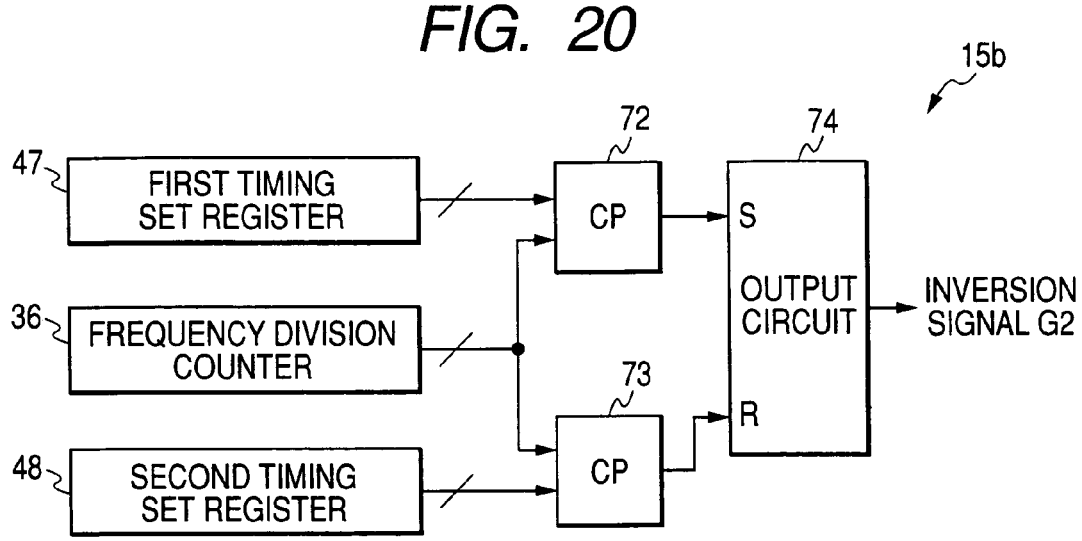
FIG. 20 is a block diagram illustrating elements of a counter process block for realizing the further function according to a third embodiment.

As shown in FIG. 20, the counter process block 15b according to the third embodiment of the present invention has sixth and seventh comparing circuits (CPs) 72 and 73. The sixth comparing circuit 72 is electrically connected to the first timing set register 47 and the frequency division counter 36. The seventh comparing circuit 73 is electrically connected to the frequency division counter 36 and the second timing set register 48. The first timing set register 47 preferably serves as an eleventh registering unit or a thirteenth registering unit in the present invention. The second timing set register 48 preferably serves as a twelfth registering unit or a fourteenth registering unit in the present invention.

The counter processing block 15b has an output circuit 74 with a set terminal S and a reset terminal R. The set terminal of the output circuit 74 is electrically connected to the output of the sixth comparing circuit 72, and the reset terminal of the output circuit 74 is electrically connected to an output of the seventh comparing circuit 73. The output circuit 74 is operative to output the inversion signal G2.

In the first timing set register 47 and the second timing set register 48, different values each individually representing an inversion timing of the inversion signal G2 are previously stored, respectively.

The sixth comparing circuit 72 is operative to receive the value set to the first timing set register 47 and the count value of the frequency division counter 36 to compare the count value with the value set to the first timing set register 47. The sixth comparing circuit 72 is operative to, when the count value is equal to the value set to the first timing set register 47, output a signal with a high level.

Similarly, the seventh comparing circuit 73 is operative to receive the value set to the second timing set register 48 and the count value of the frequency division counter 36 to compare the count value with the value set to the second timing set register 48. The seventh comparing circuit 73 is operative to, when the count value is equal to the value set to the second timing set register 48, output a signal with a high level.

The output circuit 74 is operative to, when the high level signal is inputted to the set terminal (S) from the sixth comparing circuit 72, turn the output level of the inversion signal G2 to the low level. The output circuit 74 is operative to, when the high level signal is inputted to the reset terminal (R) from the seventh comparing circuit 73, turn the output level of the inversion signal G2 to the high level. Incidentally, the sixth comparing circuit 72, the seventh comparing circuit 73, and the output circuit 74 preferably serve as a seventh control unit in the present invention.

Incidentally, FIG. 19 set forth above also shows operations of the counter process block 15b when the value of "1" is set to the first timing set register 47 and the value of "3" is set to the second timing register 48.

That is, as shown in FIG. 19, the counter process block 15b operates to, when the count value of the frequency division counter 36 is equal to the value set to the first set register 47, output the inversion signal G2 with the low level.

On the contrary, the counter process block 15b operates 74 to, when the count value of the frequency division counter 36 is equal to the value set to the second set register 48, output the inversion signal G2 with the high level.

In the configuration of the counter process block 15b, changing the values to be set to the first and second timing set registers 47 and 48 allows the inversion timings of the inversion signal G2 to be set to desirable crank angles, respectively. This feature makes it possible to apply the microcomputer 3 related to the third embodiment to various engine systems having different inversion timings of the inversion signal G2.

To the first and second timing set registers 47 and 48, similar to the reference position set register 46, the values can be set by the initializing process executed by the CPU 23 after the boot thereof.

To the first and second comparing circuits 72 and 73, the count value of the higher-order counter 11a may be inputted in place of the count value of the frequency division counter 36. In this modification, while the count value of the higher-order counter 11a is equal to the value set to the first timing set register 47, the inversion signal G2 is kept to the low level. While the count value of the higher-order counter 11a is equal to the value set to the second timing set register 48, the inversion signal G2 is kept to the high level.

The output levels of the output circuit 74 may be reversed as compared with the descriptions set forth above.

Fourth Embodiment

Next, another function of the signal processing unit in the microcomputer 3 according to a fourth embodiment of the present invention will be described hereinafter in accordance with FIG. 21. Incidentally, in the fourth embodiment, different points of the microcomputer 3 according to the fourth embodiment as compared with that of the first to third embodiments will be mainly described hereinafter, and therefore, other functions of the microcomputer 3 are the same as those of the first to third embodiments.

Figure 21:
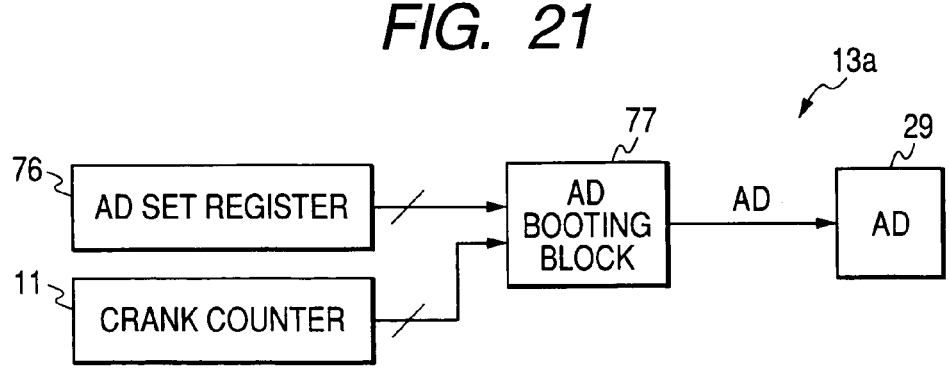
FIG. 21 is a block diagram illustrating elements of a signal processing unit shown in FIG. 1 for booting an A/D converter with the use of the crank counter according to a fourth embodiment.

As shown in FIG. 21, the signal processing circuit 13a according to the fourth embodiment of the present invention has an AD set register 76 preferably serving as an analog to digital set registering unit in the present invention and an AD booting block 77 preferably serving as an eighth control unit in the present invention. The AD booting block 77 is electrically connected to the AD set register 76 and the crank counter 11. An output of the AD booting block 77 is electrically connected to the AD converter 29.

In the AD set register 76, a value representing a booting timing of the AD converter 29 is previously stored.

The AD booting block 77 is operative to receive the value set to the AD set register 76 and the count value of the crank counter 11 to compare the count value with the value set to the AD set register 76. The AD booting block 77 is operative to boot the AD converter 29 when the count value reaches the value set to the AD set register 76.

In the configuration of the signal processing circuit 13a, changing the value to be set to the AD set register 76 allows the boot timing of the AD converter 29 to be set to a timing corresponding to a desirable crank angle.

Fifth Embodiment

Next, an engine unit 1A according to a fifth embodiment of the present invention will be described hereinafter in accordance with FIGS. 22 to 28. Incidentally, in the fifth embodiment, different points of the engine ECU 1A according to the fifth embodiment as compared with that of the first to fourth embodiments will be mainly described hereinafter, and therefore, other functions of the engine ECU 1A are the same as those of the first to fourth embodiments.

Figure 22:
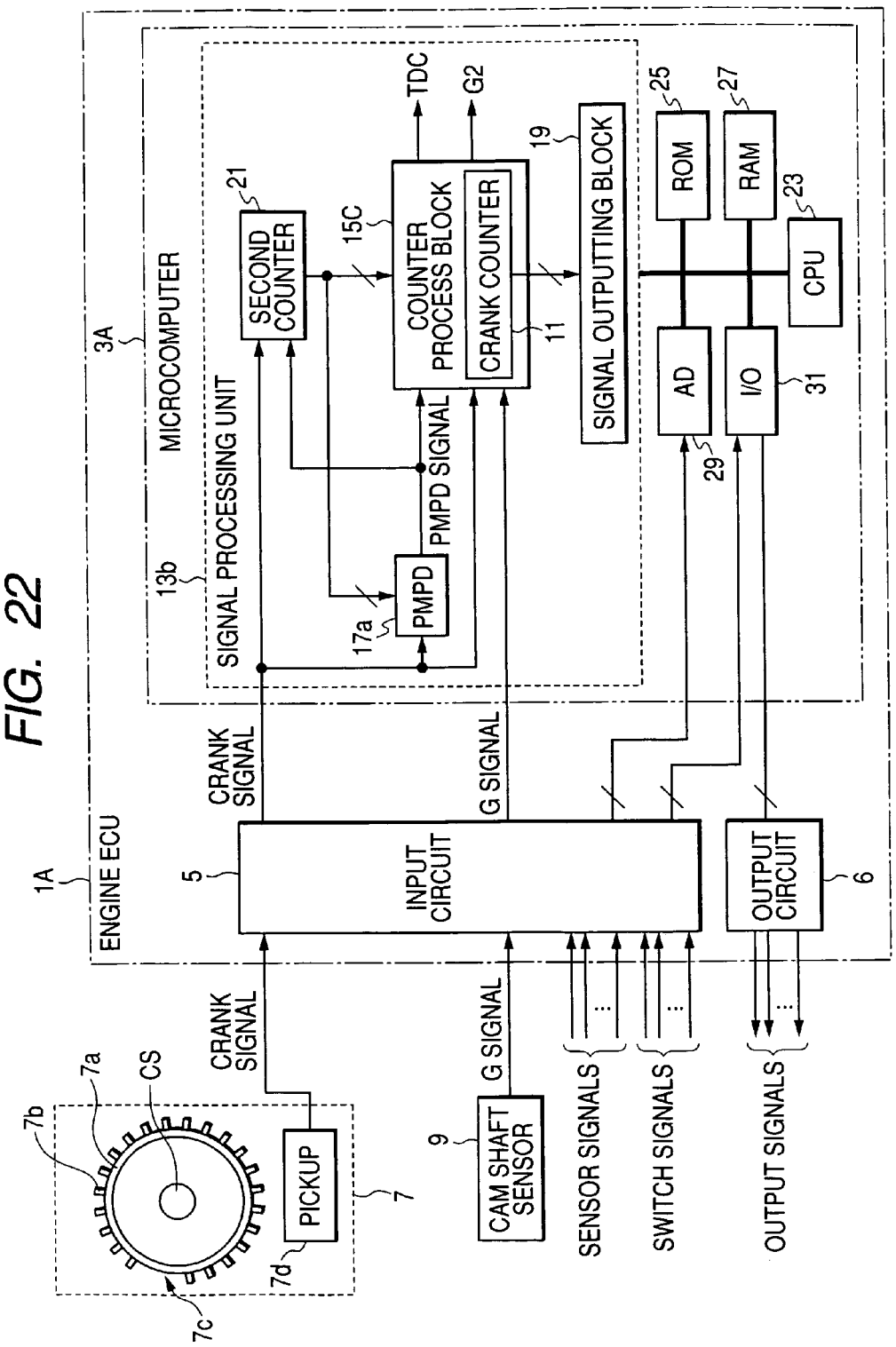
FIG. 22 is a block diagram illustrating a structure of an engine electronic control unit, which is installed in a vehicle according to a fifth embodiment of the present invention.

A signal processing unit 13b of a microcomputer 3A installed in an engine ECU 1A according to the fifth embodiment, as shown in FIG. 22, has a second counter 21 operatively coupled to a counter process block 15c and the pulse-missing portion determining block 17. The second counter 21 is designed to be incremented by one in response to the crank signal. The second counter 21 preferably serves as a fifth counter in the present invention.

Figure 23:
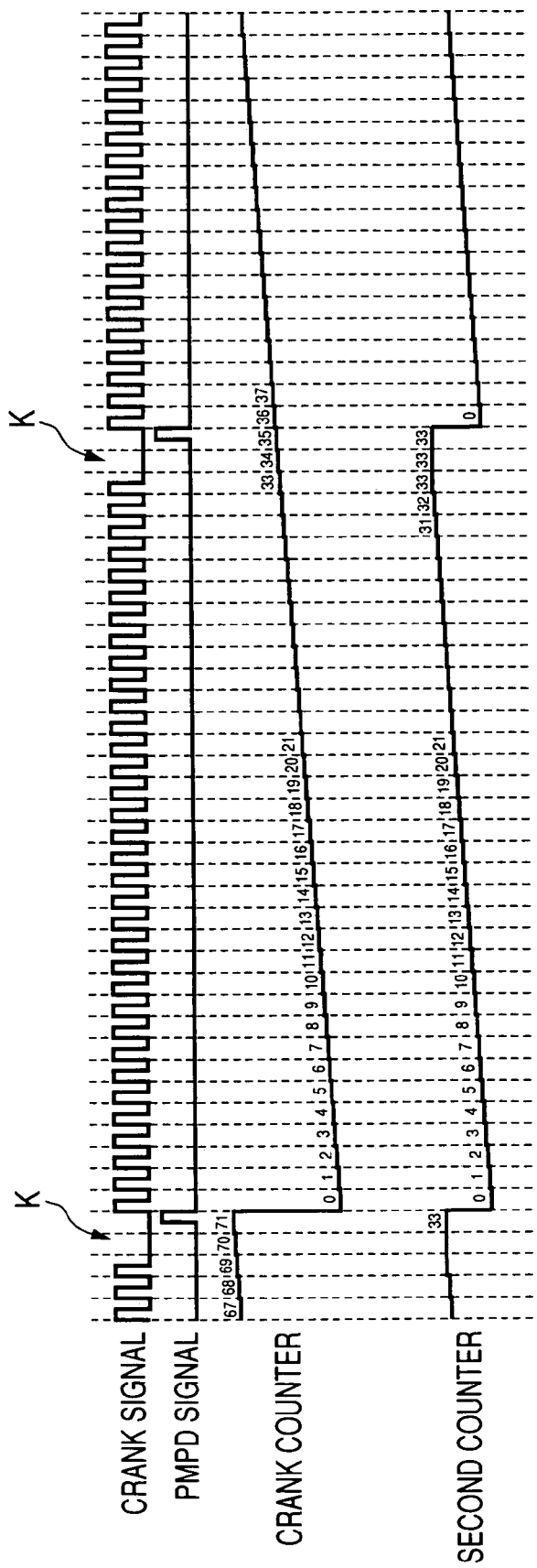
FIG. 23 is a time chart illustrating count operations of the engine electronic control unit according to the fifth embodiment.

As shown in FIG. 23, the count value of the second counter 21 is cleared for each leading edge of the crank signal that is generated just after each occurrence of the PMPD signal from the pulse-missing portion determining block 17, in other words, each end timing of each pulse-missing portion K. The second counter 21 is incremented in response to each leading edge of the crank signal except for each leading just after each occurrence of the PMPD signal.

Figure 24:
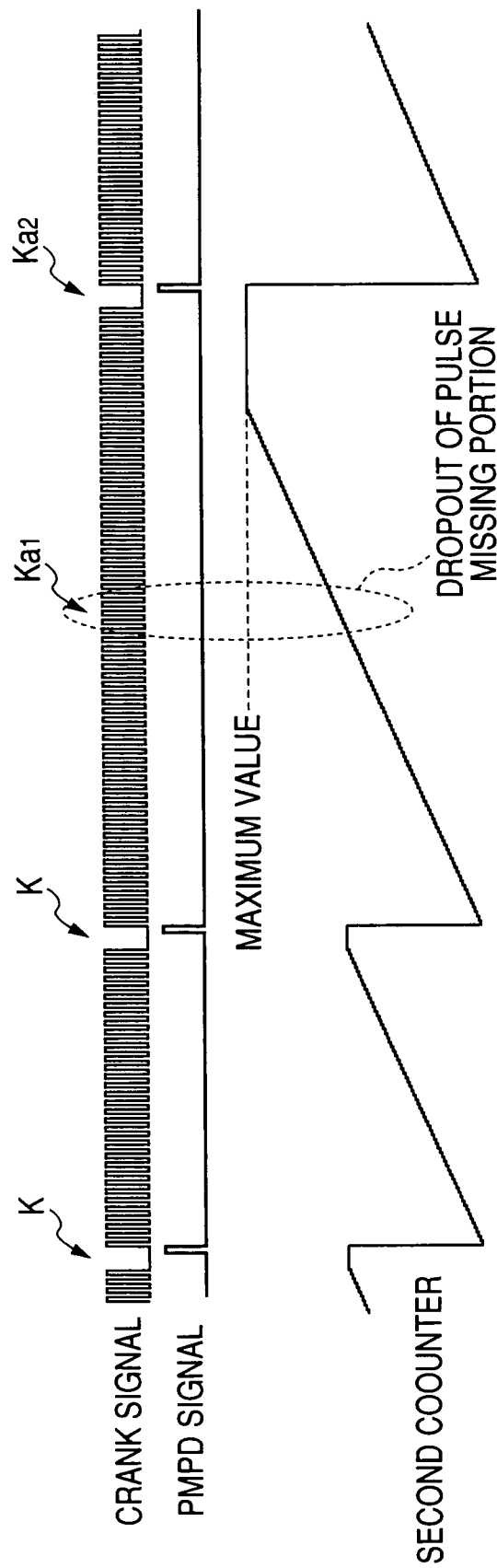
FIG. 24 is a time chart illustrating count operations of a second counter of a signal processing unit according to the fifth embodiment.

The second counter 21, as shown in FIG. 24, does not wrap around so that, when the count value of the second counter 21 reaches a predetermined maximum value, the count operation of the second counter 21 is stopped and the count value is fixed to the maximum value.

This allows, even if a pulse-missing portion Ka1 is not detected by the PMPD block 17 (see dotted ellipse in FIG. 24), the count value of the second counter 21 is fixed to the maximum value and cleared when the next pulse-missing portion Ka2 next to the pulse-missing portion Ka1 is detected by the PMPD block 17.

Functions of the microcomputer 3A with the use of the second counter 21 will be described hereinafter in accordance with FIGS. 25 to 28.

In the microcomputer 3A, the second counter 21 allows the crank counter 11 (in the fifth embodiment, the higher-order counter 11a) to be corrected at any timing in response to the count value of the second counter 21. That is, the second counter 21 is capable of specifying a correct value that the crank counter 11 should take at any timing, making it possible to correct the crank counter 11 when the count value of the second counter 21 reaches a desirable value.

Figure 25:
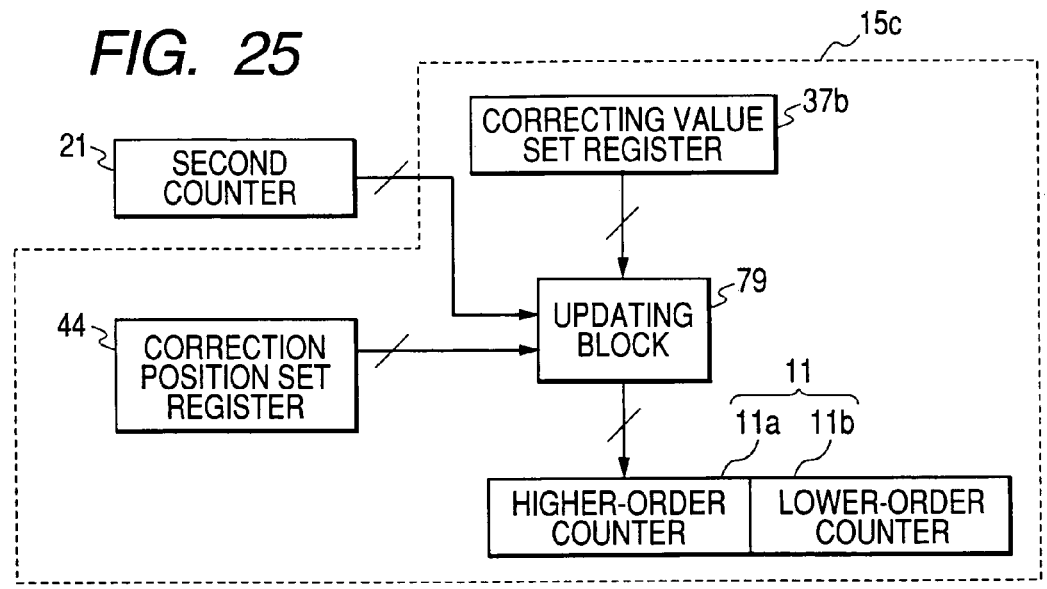
FIG. 25 is a block diagram illustrating a structure of a counter process block for correcting a count value of a higher-order counter according to the fifth embodiment.

As shown in FIG. 25, the crank counter 15c has an updating block 79 electrically coupled to the second correcting value set register 37b and the correction position register 44 and designed to correct the count value of the higher-order counter 11a of the crank counter 11 on hardware. The second correcting value set register 37b and the correction position set register 44 preferably serve as a fifteenth registering unit and a sixteenth registering unit in the present invention, respectively.

The updating block 79 is operative to, when the count value of the second counter 21 coincides with a value set to the correction position set register 44, update the count value of the higher-order counter 11a to a value set to the correcting value set register 37b. Incidentally, the number of bits of the second counter 21 and the correction position set register 44 are preferably determined to 6 bits, respectively.

In the configuration of the counter process block 15c, changing the value set to the correction position set register 44 allows the timing of the correction of the count value of the higher-order counter 11a to be desirably determined. In the correcting value set register 37b, the value that the higher-order counter 11a should take at the timing determined by the correction position set register 44 is stored. In the registers 37b and 44, desirable values can be stored by the processes of the CPU 23 on the programs (software).

Even if a dropout of a pulse-missing portion occurs, as described above with the use of FIG. 24, the count value of the second counter 21 is fixed to the maximum value so that it does not wrap around 0 at a wrong timing to be cleared at the correctly end timing of the next pulse-missing portion. This makes it possible to prevent the updating block 79 from performing the correction of the higher-order counter 11a at a wrong crank angle.

In addition, as shown in FIG. 16A, the counter process block 15c has a capture control block 81 and a capture presence/absence flag 82. The capture register 45 preferably serves as a seventeenth registering unit in the present invention.

Figure 26A:
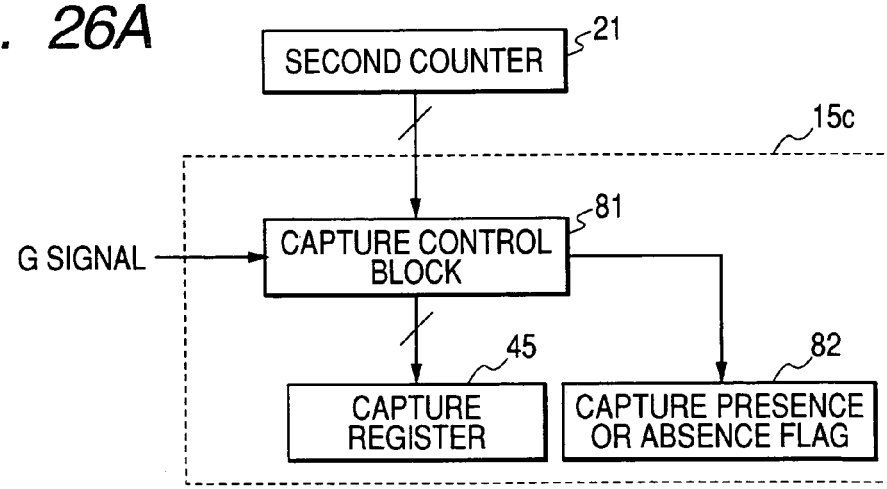
FIG. 26A is a block diagram illustrating a structure of the counter process block for capturing a count value of the second counter according to the fifth embodiment.
Figure 26B:
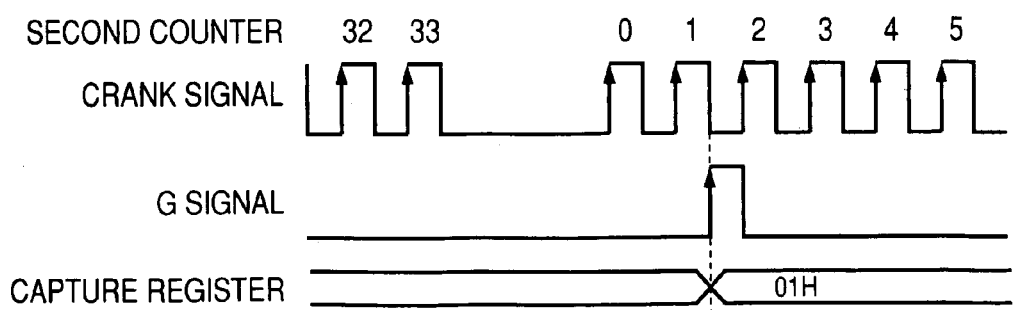
FIG. 26B is a block diagram illustrating capturing operations of the counter process block according to the fifth embodiment.

The capture control block 81 is operatively coupled to the second counter 21, the capture register 45, and the capture presence/absence flag 82, respectively. The capture control block 81, as shown in FIG. 26B, transfers the count value of the second counter 21 to store (capture) it therein, and after that, updates "0" set to the capture presence/absence flag 82 and indicative of the absence of capture to "1" indicative of the presence of capture.

Figure 27:
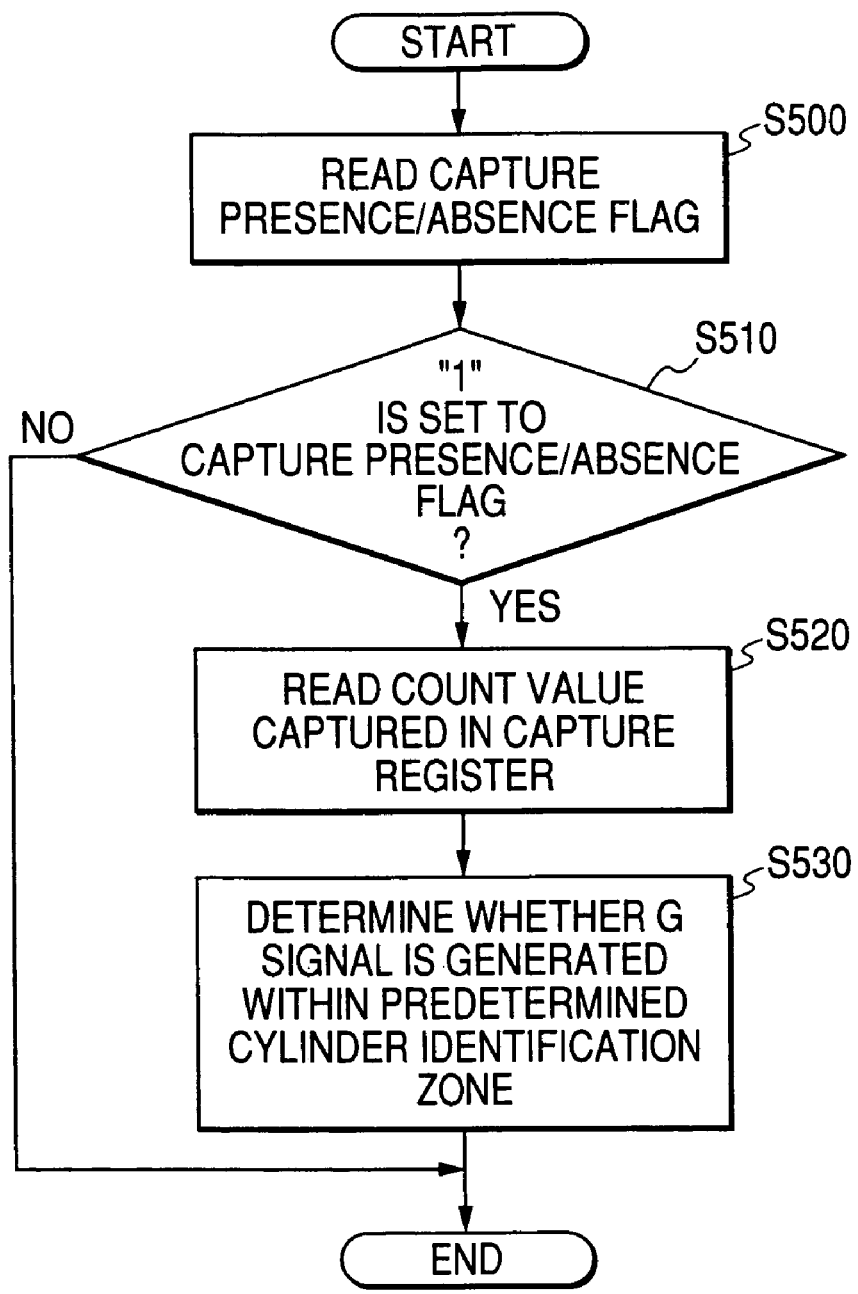
FIG. 27 is a flowchart illustrating the capturing operations of a CPU according to the fifth embodiment.

In the configuration, as shown in FIG. 27, the CPU 23 reads the capture presence/absence flag 82 (step S500 in FIG. 28) and determines whether the "1" is set to the flag 82 (step S510). When determining that the "1" is set to the flag 82 (the determination in step S510 is YES), the CPU 23 reads the count value captured in the capture register 45 (step S520).

The CPU 23 determines whether the G signal is generated within a predetermined cylinder identification zone based on the read count value representing the count value of the second counter 21 at which the G signal is generated (step S530). That is, as shown in FIG. 2, the G signal is generated within a predetermined crank angle corresponding to the predetermined cylinder identification zone with respect to the end of any one of pulse-missing portion K. Therefore, when the count value captured in the capture register 45 is within a predetermined value corresponding to the predetermined crank angle, the CPU 23 determines that the G signal is generated within the cylinder identification zone. Incidentally, the capture control block 81, the capture presence or absence flag 82, and the processes in steps S500 to S530 of the CPU 23 preferably serve as a determining unit in the present invention.

The configuration allows the CPU 23 to accurately simply determine whether the G signal is generated within the predetermined cylinder identification zone.

That is, a conventional method of determining the G signal within a predetermined cylinder identification zone has a step of setting the cylinder identification zone defined between temporally adjacent start and eng timings that are synchronized with the crank signal. The conventional method has a step of enabling a storage circuit to cause the storage circuit to detect an occurrence of the G signal, thereby storing it therein as data. The conventional method has a step of reading what data is stored in the storage circuit at the end timing of the cylinder identification zone, and a step of determining whether the data corresponding to the occurrence of the G signal is stored in the storage circuit. The conventional method has a step of, when the determining step determines that the data corresponding to the occurrence of the G signal is stored in the storage circuit, determining that the G signal occurs within the predetermined cylinder identification zone.

In the conventional method, however, if the reading timing is delayed with respect to the actual end timing of the cylinder identification zone, it would be difficult to determine whether the G signal occurs within the predetermined cylinder identification zone.

In contrast, in the fifth embodiment of the present invention, even if the CPU 23 reads the value captured in the capture register 45 after an actual cylinder identification zone, the CPU 23 accurately determines whether the G signal is generated within the predetermined cylinder identification zone based on the read captured count value. Incidentally, if determining that the G signal is not generated within the cylinder identification zone, the CPU 23 determines that some kind of abnormality occurs to perform a fail safe process required for safely running the vehicle. The CPU 23, after reading the "1" set to the capture presence/absence flag 82, sets the "0" indicative of the absence of capture to the flag 82 to clear the "1".

In addition, as set forth above, a pulse-missing portion determining block 17a according to the fifth embodiment of the present invention determines whether a currently measured pulse time interval is equal to or larger than a length obtained by multiplying a previous measured pulse time interval previous to the currently measured pulse time interval by a predetermined pulse-missing determining ratio. When determining that the currently measured pulse time interval is equal to or larger than the length obtained by multiplying the previous measured pulse time interval by the predetermined determining ratio, the pulse-missing portion determining block 17a determines that the currently measured pulse time interval corresponds to the pulse-missing portion K.

Figure 28:
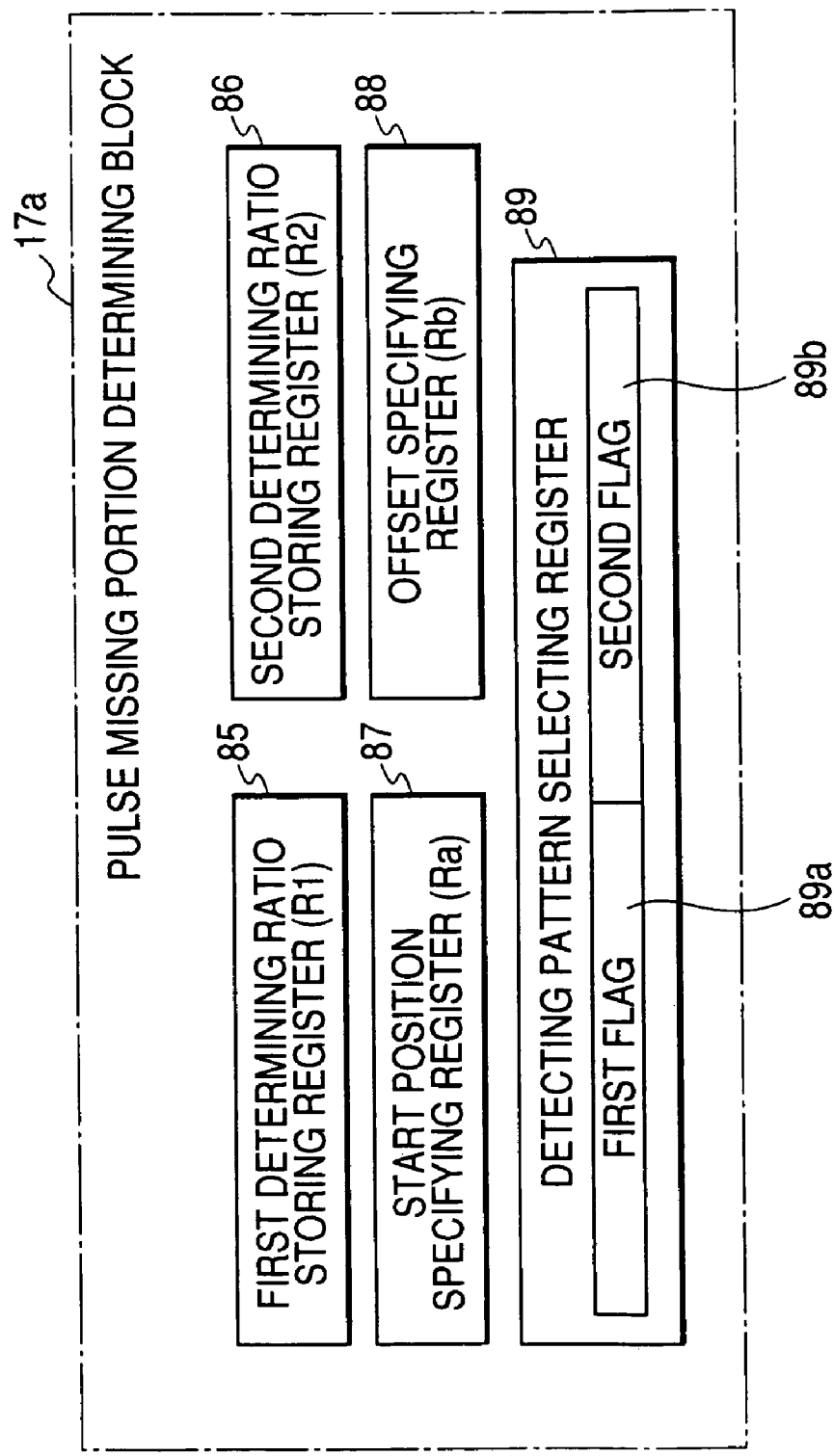
FIG. 28 is a block diagram illustrating registers installed in a pulse missing portion determining block shown in FIG. 22 according to the fifth embodiment.

In the fifth embodiment, as shown in FIG. 28, the pulse-missing portion determining block 17a has first and second determining ratio storing registers 85 and 86 in which candidate values R1 and R2 usable for the pulse-missing determining ratio are stored, respectively. The pulse-missing portion determining block 17a has a start position specifying register 87 and an offset specifying register 88. The register 87 serves as setting a first period during which the candidate value stored in the first determining ratio storing register 85 is used as the pulse-missing determining ratio. The register 88 serves as setting a second period during which the candidate value stored in the second determining ratio storing register 86 is used as the pulse-missing determining ratio. The registers 87 and 88 preferably serve as an eighteenth registering unit and a nineteenth registering unit in the present invention, respectively.

The pulse-missing portion determining block 17a has a pulse-missing detecting pattern selecting register 89 for selecting one of patterns of the block 17a for detecting the pulse-missing portion. The detecting pattern selecting register 89, as shown in FIGS. 27 and 28, is composed of a 2-bit storage area. The higher-order bit area is a first flag 89a for determining whether a second period for the specified zone is provided. The lower-order bit area is a second flag 89b for determining whether a detection of the pulse-missing portion during the second period is inhibited. The pulse-missing portion determining block 17a and the detecting pattern selecting register 89 preferably serve as a pulse-missing portion determining unit in the present invention.

The count value of the second register 21, which corresponds to the start timing of the second period, that is, the timing through which the first period is changed to the second period, is previously stored in the start position specifying register 87 as the value Ra. The number of crank pulses, which are generated from the start timing of the second period to the end timing thereof, in other words, from the start timing of the second period to the start timing of the first period, is stored in the offset specifying register 88. That is, offset data from the start timing of the second period is stored in the offset specifying register 88 as the value Rb.

Figure 29:
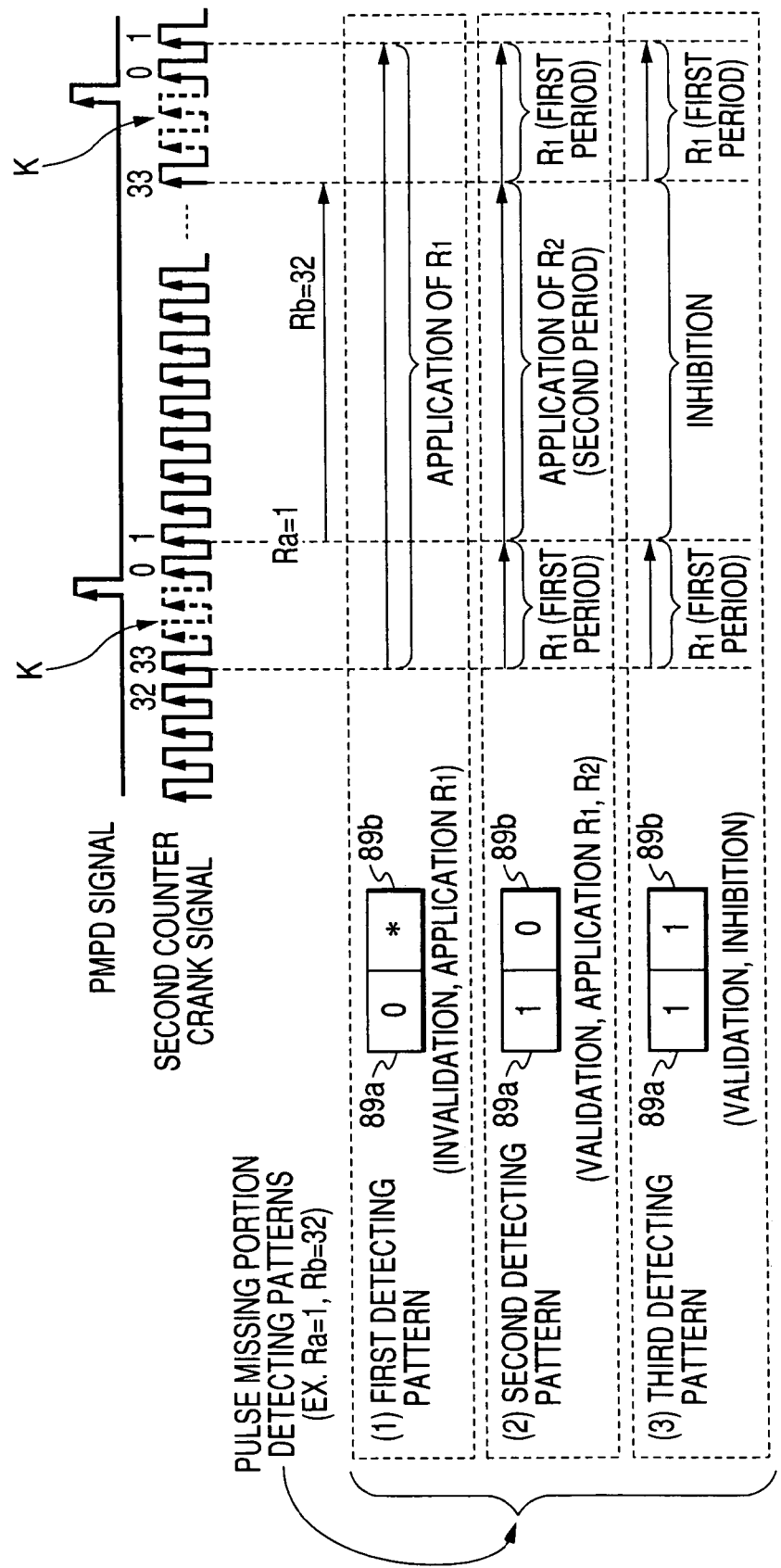
FIG. 29 is a time chart illustrating functions of the registers and operations of the pulse missing portion determining block according to the fifth embodiment.
Figure 30:
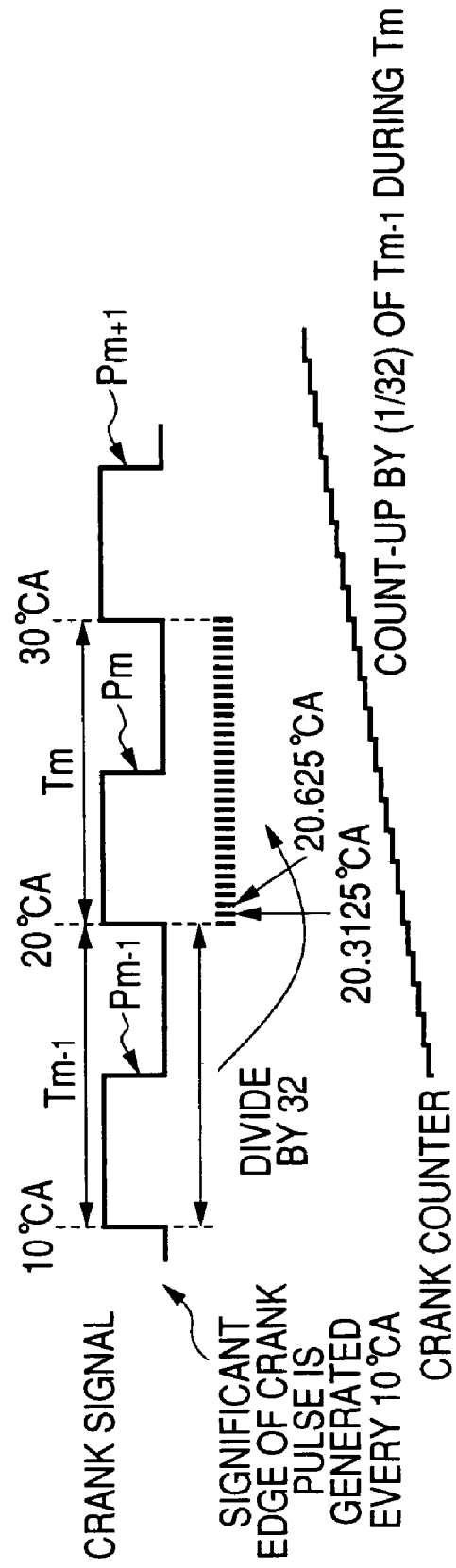
FIG. 30 is a view illustrating operations of an engine control unit with the use of a crank counter.
Figure 31:
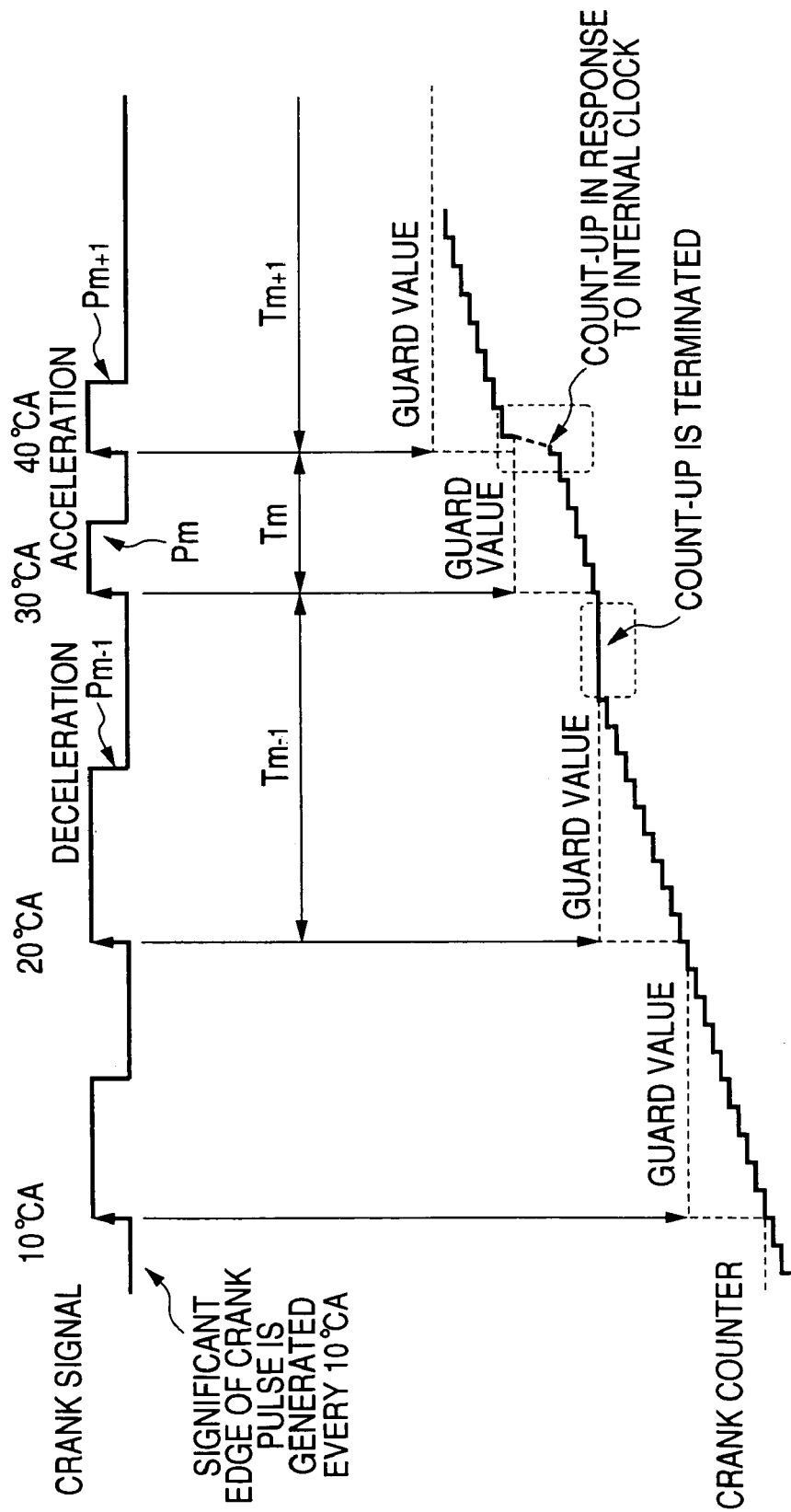
FIG. 31 is a view illustrating the operations of the engine control unit with the use of the crank counter shown in FIG. 30.

As shown by a first detecting pattern (1) in FIG. 29, it is assumed that the first flag 89*a* that is the higher-order bit of the detecting patter selecting register 89 is set to "0" indicative of "invalidation". In this assumption, the pulse-missing portion determining block 17 performs the pulse-missing portion determining operations set forth above with the use of the value R1 stored in the first determining ratio storing register 85 as the pulse-missing portion determining ratio. That is, the first period is only set without setting the second period.

As shown by a second detecting pattern (2) in FIG. 29, it is assumed that the first flag 89*a* that is the higher-order bit of the detecting pattern selecting register 89 is set to "1" indicative of "validation", and the second flag 89*b* that is the lower-order bit thereof is set to "0" indicative of "non-inhibition". In this assumption, the pulse-missing portion determining block 17 performs the pulse-missing portion determining operations set forth above with the use of the values R1 and R2 stored in the first and second determining ratio storing registers 86 and 87 each as the pulse-missing portion determining ratio. The determining operations using the value R2 are performed from which the count value of the second counter 21 coincides with the count value Ra set to the register 87 up to which the number of leading edges of the crank signal generated therefrom reaches the value Rb set to the register 88. After the number of leading edges of the crank signal generated therefrom reaches the value Rb, the determining operations using the value R1 are performed up to which the count value of the second counter 21 coincides with the count value Ra set to the register 87.

That is, a period from which the count value of the second counter 21 coincides with the value Ra of the register 87 up to which the number of leading edges of the crank signal reaches the value Rb set to the register 88 is set to the second period, and the remaining period is set to the first period.

As shown by a third detecting pattern (3) in FIG. 29, it is assumed that the first flag 89*a* that is the higher-order bit of the detecting pattern selecting register 89 is set to "1" indicative of "validation", and the second flag 89*b* that is the lower-order bit thereof is set to "1" indicative of "inhibition". In this assumption, the determining block 17 does not perform the pulse-missing portion determining operations from which the count value of the second counter 21 coincides with the count value Ra set to the register 87 up to which the number of leading edges of the crank signal reaches the value Rb set to the register 88.

In response to the reach of the number of leading edges of the crank signal to the value Rb, the pulse-missing portion determining block 17 performs the pulse-missing portion determining operations set forth above with the use of the value R1 stored in the first determining ratio storing register 85 as the pulse-missing portion determining ratio. The determining operations using the value R1 are performed up to which the count value of the second counter 21 coincides with the count value Ra stored in the register 87.

That is, during a period from which the count value of the second counter 21 coincides with the value Ra of the register 87 up to which the number of leading edges of the crank signal generated therefrom reaches the value Rb set to the register 88, the pulse-missing portion determining operations are inhibited.

In the engine ECU 1A of the fifth embodiment, the value R2 set to the second determining ratio storing register 86 is larger than the value R1 set to the first determining ratio storing register 85. This results in that the pulse-missing portion determining block 17 is more difficult to determine the pulse-missing portion with the use of the value R2 as the pulse-missing portion determining ratio, as compared with the use of the value R1 as the pulse-missing portion determining ratio.

Moreover, in the engine ECU 1A of the fifth embodiment, as shown by the second detecting pattern (2) in FIG. 29, the first flag 89*a* is set to "1", and the second flag 89*b* is set to "0". In addition, in the engine ECU 1A, values Ra and Rb are set to the start position specifying register 87 and the offset specifying register 88, respectively, so that a period close to the pulse-missing portion K, which includes the pulse-missing portion K, is determined to the first period, and the remaining period is determined to the second period. In the fifth embodiment, for example, "1" is set to the value Ra of the start position specifying register 87, and "32" is set to the value Rb of the offset specifying register 88 (see FIG. 29).

This set permits the pulse-missing determining ratio R1 during the first period close to the pulse-missing portion K to be smaller than the pulse-missing ratio R2 during the second period that is the remaining period except for the first period. When the engine suddenly accelerates or decelerates during the second period, it is possible to effectively prevent erroneous determination that determines a normal pulse interval of the crank signal as the pulse-missing portion. Incidentally, to the registers 85 to 89, the values individually corresponding to the registers 85 to 89 are set, respectively, by the initializing process executed by the CPU 23 after the boot thereof.

In the fifth embodiment, the first period and the second period can be desirably set to the start position specifying register 87 and the offset specifying register 88, respectively. In the fifth embodiment, as the length of the second period, the offset data from the start of the second period is specified. For example, during the second period after the count value of the second counter 21 coincides with the Ra set to the register 87, even if the count value of the second counter 21 returns to 0 due to the erroneous determination, it is possible to terminate the second period at a suitable timing independently of the erroneous determination.

If the end timing of the second period is set by a count value of the second counter 21, which corresponds to the end timing, the set value of the second counter 21 corresponding to the start timing and the set value thereof corresponding to the end timing of the second period would be reversed. This would need to add, to the pulse-missing portion determining block 17, means for avoiding the reverse of the set value corresponding to the start timing of the second period and that corresponding to the end timing thereof. However, the configuration of the signal processing unit 13*b* according to the fifth embodiment has no use for such means, making it possible to simplify the structure of the pulse-missing portion determining block 17 and the signal processing unit 13.

On the other hand, in the engine ECU 1A of the fifth embodiment, as shown by the third detecting pattern (3) in FIG. 29, the first flag 89*a* is set to "1", and the second flag 89*b* is set to "1". This setting prevents the determining block 17 from performing the pulse-missing portion determining operations during a period from which the count value of the second counter 21 coincides with the count value Ra set to the register 87 up to which the number of leading edges of the crank signal reaches the value Rb set to the register 88. This feature makes it possible to still further avoid the erroneous determination.

When determining the pulse-missing portion without changing the pulse-missing determining ratio, as shown by the first detecting pattern (1) in FIG. 29, the first flag 89a is set to "0".

In addition, in the engine ECU 1A, to the start position specifying register 87 and the offset specifying register 88, values Ra and Rb are preferably set so that a period close to the pulse-missing portion K, which includes the pulse-missing portion K and a plurality of crank pulses, is determined to the first period. For example, in the unlikely event that a few leading edges on the crank signal collapse due to noises, it is possible to terminate the second period before the pulse-missing portion appears. This feature makes it possible to use the value R1, which can easily determine the pulse-missing portion as compared with the value R2, stored in the first determining ratio storing register 85 as the pulse-missing determining ratio during the pulse-missing portion.

In the fifth embodiment, until a period has elapsed since the boot of the engine ECU 1 so that the pulse-missing portion is firstly determined, it is preferable not to change the pulse-missing determining ratio, thereby using only the value R1 set to the first determining ratio storing register 85. Until the pulse-missing portion is firstly determined, it is difficult to accurately predict which timing the pulse-missing portion K is generated so that the changing timing of the pulse-missing determining ratio is hardly set to a suitable timing.

In each of the first to fifth embodiments, the AD converter 29 serves as capturing analog signals inputted from the input circuit 5 into the microcomputer 3 to convert them into digital data. However, the AD converter 29 may serve as capturing analog signals, such as power source voltage and so on, which are generated in the engine ECU 1, to convert them into digital data.

In each of the first to fifth embodiments, the present invention is applied to an engine control unit having a crankshaft and is configured to detect the crank angle of the crankshaft, but the present invention is not limited to the structure. That is, the present invention can be applied to another control unit for controlling a mechanism including a rotating shaft and a unit for detecting a rotation angle of a rotating shaft.

In each of the first to fifth embodiments, the higher-order counter and the lower-order counter are designed to be incremented, but may be designed to be decremented.

In each of the first to fifth embodiments, the higher-order counter and the lower-order counter are installed in the microcomputer, but the higher-order counter and the lower-order counter according to the present invention may be independent electronic devices designed to count either up or down. In addition, the present invention includes a modification such that the higher-order counter and the lower-order counter according to each of the first to fifth embodiments are implemented in at least one of various electronic devices as hardware. The present invention also includes a modification such that the higher-order counter and the lower-order counter according to each of the first to fifth embodiments are implemented in various electronic devices as counting functions based on software.

In each of the first to fifth embodiments, various registers are installed in the microcomputer, but various registers according to the present invention may be independent electronic devices each designed to store data. In addition, the present invention includes a modification such that at least one of the registers according to each of the first to fifth embodiments is implemented in at least one of various electronic devices as hardware. The present invention also includes a modification such that at least one of the registers according to each of the first to fifth embodiments is implemented in at least one of various electronic devices as a storing function based on software.

While there has been described what is at present considered to be these embodiments and modifications of the present invention, it will be understood that various modifications which are not described yet may be made therein, and it is intended to cover in the appended claims all such modifications as fall within the true spirit and scope of the invention.

What is claimed is:

1. An apparatus for detecting an angle of a rotating shaft as a train of bits, wherein a first signal including a train of pulses corresponding to angle intervals of a rotation of the rotating shaft is inputted to the apparatus, and a second signal including a train of clock pulses whose clock cycle is a positive integer submultiple of a pulse cycle of the first signal is inputted to the apparatus, the apparatus comprising:
   a first counter indicative of a higher-order of the train of bits, the first counter counting up or down in synchronization with the pulse cycle of the first signal; and
   a second counter indicative of a lower-order of the train of bits, the second counter counting up or down in synchronization with the clock cycle of the second signal and being cleared in synchronization with the pulse cycle of the first signal.

2. An engine control unit for controlling an engine based on a crank angle of a crankshaft represented as a train of bits, wherein a crank signal including a train of crank pulses corresponding to angle intervals of a rotation of the crankshaft is inputted to the engine control unit, and a multiplication clock signal including a train of clock pulses whose clock cycle is a positive integer submultiple of a pulse cycle of the crank signal is inputted to the engine control unit, the engine control unit comprising:
   a first counter indicative of a higher-order of the train of bits, the first counter counting up or down in synchronization with the pulse cycle of the crank signal; and
   a second counter indicative of a lower-order of the train of bits, the second counter counting up or down in synchronization with the clock cycle of the multiplication clock signal and being cleared in synchronization with the pulse cycle of the crank signal.

3. An engine control unit according to claim 2, wherein, when a frequency of the multiplication clock signal is a predetermined multiplication number times of a frequency of the crank signal, the predetermined multiplication number is $2^n$ (n is a positive integer) and the second counter is designed to an n-bit counter.

4. An engine control unit according to claim 2, wherein, when a frequency of the multiplication clock signal is a predetermined multiplication number times of a frequency of the crank signal, the first and the second counters are designed to count up, respectively, the predetermined multiplication number is $2^n$ (n is a positive integer), and an n-th bit from a most significant bit of the second counter is defined to a least significant bit in the count-up operation of the second counter in response to the multiplication clock signal.

5. An engine control unit according to claim 2, further comprising a correcting unit configured to correct a count value of the first counter.

6. An engine control unit according to claim 2, wherein the first counter is designed so that, when a count value of the first counter reaches a predetermined limit value, the count value is cleared back to zero.

7. An engine control unit according to claim 6, further comprising:
a first registering unit configured to store therein the predetermined limit value; and
a first control unit configured to:
determine whether the count value of the first counter coincides with the predetermined limit value; and
clear the count value of the first counter back to zero when the count value of the first counter is determined to coincide with the predetermined limit value.

8. An engine control unit according to claim 2, wherein the crank signal comprises a pulse-missing portion corresponding to a pulse interval in which a predetermined number of crank pulses are skipped, further comprising:
a detecting unit configured to receive the crank signal to detect the pulse-missing portion based on the received crank signal; and
a correcting unit configured to:
determine whether the count value of the first counter is correct in response to a detection timing of the detection unit; and
correct the count value of the first counter based on the crank pulses of the crank signal when the count value of the first counter is determined to be incorrect.

9. An engine control unit according to claim 2, wherein the crank signal comprises a pulse-missing portion corresponding to a pulse interval in which a predetermined number of crank pulses are skipped, and the first and the second counters are designed to count up, respectively, further comprising:
a detecting unit configured to receive the crank signal to detect the pulse interval corresponding to the pulse-missing portion based on the received crank signal; and
a second control unit configured to allow the second counter to wrap around during the pulse interval of the pulse-missing portion, the first counter counting up by a carry during the pulse interval of the pulse-missing portion, the carry being generated in the second counter by the wrap around.

10. An engine control unit according to claim 9, wherein the second control unit is configured to prevent the second counter from wrapping around during a pulse interval except for the pulse interval corresponding to the pulse-missing portion so that a count value of the second counter is stopped at a predetermined maximum value.

11. An engine control unit according to claim 9, further comprising:
a second registering unit configured to store therein a value that the first counter should take at an end timing of the pulse interval corresponding to the pulse missing portion; and
an updating unit configured to update a count value of the first counter to the value stored in the second registering unit.

12. An engine control unit according to claim 11, wherein the updating unit is configured to turn a first flag on during the pulse interval corresponding to the pulse missing portion and to, when a significant edge of the crank signal is generated while the first flag is kept on, update the count value of the first counter to the value stored in the second registering unit.

13. An engine control unit according to claim 12, wherein the pulse missing portion includes a single pulse missing portion corresponding to a first pulse interval in which a predetermined number of crank pulses are skipped and a continuous pulse missing portion corresponding to continuous second and third pulse intervals in each of which a predetermined number of crank pulses are skipped, and the updating unit is configured to turn the first flag off in response to a secondary significant edge of the crank signal after a turn-on timing of the first flag.

14. An engine control unit according to claim 13, wherein the detecting unit comprises:
a third registering unit;
a storing unit configured to store the detected pulse interval in the third registering unit as a value Ti and to store a next pulse interval next to the pulse interval in the third registering unit as a value Ti+1; and
a first determining unit configured to determine whether the stored values Ti and Ti+1 meet the following expression:

$$Ti \geq Ti+1 \times C$$

where C is a constant; and
a second determining unit configured to determine whether the next pulse interval corresponds to the first pulse interval or the continuous second and third pulse intervals based on a result of determination by the first determining unit.

15. An engine control unit according to claim 2, further comprising a generating unit configured to generate the multiplication clock signal with a use of N cycles of the crank signal, the N being an integer larger than 1.

16. An engine control unit according to claim 15, wherein the N cycles of the crank signal are update N cycles of the crank signal.

17. An engine control unit according to claim 9, wherein a frequency of the multiplication clock signal is r times of a frequency of the crank signal, the r being a positive integer, the predetermined number of crank pulses corresponding to the pulse-missing portion is M that is a positive integer, further comprising a generating unit configured to generate the multiplication clock signal so that, just after the pulse-missing portion is detected, a clock cycle C of the multiplication clock signal is set to meet the following expression:

$$C = Tk/(M+1)/r$$

where Tk is the pulse interval of the pulse missing portion.

18. An engine control unit according to claim 2, further comprising:
an output circuit configured to output a first signal based on a crank count value corresponding to the train of bits of the crank angle, the output circuit comprising:
a fourth registering unit in which a value indicative of a start timing of an output of the first signal is stored;
a fifth registering unit in which a value indicative of a stop timing of the output of the first signal is stored;
a sixth registering unit in which a value indicative of a timing for forcibly stopping the output of the first signal is stored;
an up-counter configured to count up every predetermined time; and
a third control unit configured to:
start the output of the first signal when the crank count value is equal to or more than the value set to the fourth registering unit;
stop the output of the first signal when the crank count value is equal to or more than the value set to the fifth registering unit; and forcibly stop the output of the first signal when a count value of the up-counter is equal to the value set to the sixth registering unit independently of the crank count value.

19. An engine control unit according to claim 2, further comprising:
an output circuit configured to output a second signal based on a crank count value corresponding to the train of bits of the crank angle, the output circuit comprising:
a seventh registering unit in which a value indicative of a start timing of an output of the second signal is stored;
an eighth registering unit in which a value indicative of a stop timing of the output of the second signal is stored;
an up-counter configured to count up every predetermined time; and
a fourth control unit configured to:
start the output of the second signal when the crank count value is equal to or more than the value set to the seventh registering unit; and
stop the output of the second signal when a count value of the up-counter is equal to the value set to the eighth registering unit.

20. An engine control unit according to claim 2, further comprising
a ninth registering unit in which a value indicative of an output timing of a reference position signal changeable between a high level and a low level is stored; and
a sixth control unit configured to:
output the reference position signal having any one of the high and low levels as a predetermined level while a count value of the first counter is equal to the value set to the ninth registering unit; and
output the reference position signal having a level inversed from the predetermined level while the count value of the first counter is different from the value set to the ninth registering unit.

21. An engine control unit according to claim 2, further comprising
a tenth registering unit in which a value indicative of an output timing of a reference position signal changeable between a high level and a low level is stored;
a third counter configured to divide a count value of the first counter; and
a sixth control unit configured to:
output the reference position signal having any one of the high and low levels as a predetermined level while a count value of the third counter is equal to the value set to the tenth registering unit; and
output the reference position signal having a level inversed from the predetermined level while the count value of the third counter is different from the value set to the tenth registering unit.

22. An engine control unit according to claim 2, further comprising:
an eleventh registering unit in which a value indicative of a first inversion timing of an output signal changeable between a high level and a low level is stored;
a twelfth registering unit in which a value indicative of a second inversion timing of the output signal is stored; and
a seventh control unit configured to:
output the output signal having any one of the high and low levels as a predetermined level while a count value of the first counter is equal to the value set to the eleventh registering unit; and
output the output signal having a level inversed from the predetermined level while the count value of the first counter is equal to the value set to the twelfth registering unit.

23. An engine control unit according to claim 2, further comprising:
a thirteenth registering unit in which a value indicative of a first inversion timing of an output signal changeable between a high level and a low level is stored;
a fourteenth registering unit in which a value indicative of a second inversion timing of the output signal is stored;
a fourth counter configured to divide a count value of the first counter; and
a seventh control unit configured to:
output the output signal having any one of the high and low levels as a predetermined level while a count value of the fourth counter is equal to the value set to the thirteenth registering unit; and
output the output signal having a level inversed from the predetermined level while the count value of the fourth counter is equal to the value set to the fourteenth registering unit.

24. An engine control unit according to claim 2, further comprising:
an analog to digital converter;
an analog to digital set registering unit in which a boot timing of the analog to digital converter is stored; and
an eighth control unit configured to boot the analog to digital converter when a crank count value corresponding to the train of bits of the crank angle reaches the value set to the analog to digital set registering unit.

25. An engine control unit according to claim 2, wherein the crank signal comprises a pulse-missing portion corresponding to a pulse interval in which a predetermined number of crank pulses are skipped, and the first and the second counters are designed to count up, respectively, further comprising:
a detecting unit configured to receive the crank signal to detect the pulse interval corresponding to the pulse-missing portion based on the received crank signal; and
a fifth counter counting up in synchronization with the clock cycle of the multiplication clock signal and being cleared in response to an end timing of the pulse interval corresponding to the pulse-missing portion.

26. An engine control unit according to claim 25, further comprising:
a fifteenth registering unit configured to store therein a predetermined correcting timing;
a sixteenth registering unit configured to store therein a value that the first counter should take at the predetermined correcting timing; and
an updating unit configured to update a count value of the first counter to the value stored in the sixteenth registering unit when a count value of the fifth counter coincides with the value stored in the fifteenth registering unit.

27. An engine control unit according to claim 25, wherein the fifth counter is designed so that a wrap-around operation is inhibited and that a count value of the fifth counter is stopped at a predetermined maximum value.

28. An engine control unit according to claim 25, wherein a cylinder-identifying signal generated when a rotating position of a camshaft reaches a predetermined reference position is inputted to the engine control unit, further comprising:

a seventeenth registering unit configured to store a count value of the fifth counter when the cylinder-identifying signal is generated; and a determining unit configured to determine whether the cylinder-identifying signal is generated within a predetermined zone based on the count value stored in the seventeenth registering unit.

29. An engine control unit according to claim 25, wherein the detecting unit comprises:

a pulse-missing portion determining unit configured to detect temporally adjacent previous and current pulse intervals of the crank signal, to determine whether the current pulse interval is larger than a predetermined length, the predetermined length being obtained by multiplying the previous pulse interval by a predetermined determining ratio, and to determine the current pulse interval is the pulse interval corresponding to the pulse-missing portion when the current pulse interval is larger than the predetermined length;

a first set register in which a first value to be used as the predetermined determining ratio is stored;

a second set register in which a second value to be used as the predetermined determining ratio is stored, said second value being larger than the first value, and wherein the pulse-missing portion determining unit is configured to use the first value as the predetermined determining ratio during a first period close to the pulse-missing portion and to use the second value as the predetermined determining ratio during a second period except for the first period.

30. An engine control unit according to claim 29, wherein the detecting unit comprises:

an eighteenth registering unit in which a value indicative of a start timing of the second period is stored; and a nineteenth registering unit in which a value indicative of a number of significant edges of the crank signal between the start timing of the second period and an end timing of the second period, wherein a period from which the count value of the fifth counter coincides with the value stored in the eighteenth registering unit up to which a number of significant edges of the crank signal corresponding to the value stored in the nineteenth registering unit is generated is set to the second period, and a period except for the second period is set to the first period.

31. An engine control unit according to claim 29, wherein the pulse-missing portion determining unit is configured to inhibit a determination of whether the current pulse interval is larger than the predetermined length in place of using the second value.

32. A method of detecting an angle of a rotating shaft as a train of bits, the method comprising:

receiving a first signal including a train of pulses corresponding to angle intervals of a rotation of the rotating shaft;

receiving a second signal including a train of clock pulses whose clock cycle is a positive integer submultiple of a pulse cycle of the first signal;

counting up or down in synchronization with the pulse cycle of the first signal, a first count value of the counting representing a higher-order of the train of bits;

counting up or down in synchronization with the clock cycle of the second signal, a second count value of the counting representing a lower-order of the train of bit; and clearing the second count value in synchronization with the pulse cycle of the first signal.

* * * * *